US012544436B2

(12) United States Patent
Moore et al.

(10) Patent No.: US 12,544,436 B2
(45) Date of Patent: Feb. 10, 2026

(54) CHIMERIC RSV AND HMPV F PROTEINS, IMMUNOGENIC COMPOSITIONS, AND METHODS OF USE

(71) Applicants: EMORY UNIVERSITY, Atlanta, GA (US); CHILDREN'S HEALTHCARE OF ATLANTA, INC., Atlanta, GA (US)

(72) Inventors: Martin L. Moore, South San Francisco, CA (US); Sean Todd, Atlanta, GA (US); Christopher C. Stobart, Indianapolis, IN (US)

(73) Assignees: Emory University, Atlanta, GA (US); Children's Healthcare of Atlanta, Inc., Atlanta, GA (US)

( * ) Notice: Subject to any disclaimer, the term of this patent is extended or adjusted under 35 U.S.C. 154(b) by 909 days.

(21) Appl. No.: 17/429,792

(22) PCT Filed: Feb. 11, 2020

(86) PCT No.: PCT/US2020/017727
§ 371 (c)(1),
(2) Date: Aug. 10, 2021

(87) PCT Pub. No.: WO2020/167813
PCT Pub. Date: Aug. 20, 2020

(65) Prior Publication Data
US 2022/0125909 A1     Apr. 28, 2022

Related U.S. Application Data

(60) Provisional application No. 62/804,005, filed on Feb. 11, 2019.

(51) Int. Cl.
*A61K 39/12* (2006.01)
*A61P 31/14* (2006.01)
*C12N 7/00* (2006.01)

(52) U.S. Cl.
CPC .............. *A61K 39/12* (2013.01); *A61P 31/14* (2018.01); *C12N 7/00* (2013.01)

(58) Field of Classification Search
CPC ............ A61K 39/12; A61P 31/14; C12N 7/00
See application file for complete search history.

(56) References Cited

U.S. PATENT DOCUMENTS

| 5,618,682 A | 4/1997 | Scheirer |
| 5,674,713 A | 10/1997 | McElroy et al. |
| 5,922,326 A | 7/1999 | Murphy et al. |
| 5,976,796 A | 11/1999 | Szalay et al. |
| 6,074,859 A | 6/2000 | Hirokawa et al. |
| 6,790,449 B2 | 9/2004 | Collins |
| 7,449,324 B2 * | 11/2008 | Fouchier ................. A61P 11/06 |
| | | 435/239 |
| 8,889,146 B2 * | 11/2014 | Vassilev .................. A61P 11/00 |
| | | 435/5 |
| 10,022,437 B2 * | 7/2018 | Pushko .................... A61P 31/12 |
| 12,357,684 B2 * | 7/2025 | Pushko ................ C07K 14/005 |
| 2004/0241188 A1 * | 12/2004 | Collins ................. A61K 39/155 |
| | | 435/235.1 |
| 2008/0131450 A1 * | 6/2008 | Libon .................. C07K 14/005 |
| | | 424/185.1 |
| 2012/0264217 A1 | 10/2012 | Moore et al. |
| 2016/0030549 A1 | 2/2016 | Moore et al. |

FOREIGN PATENT DOCUMENTS

| WO | 2005014626 A2 | 2/2005 | |
| WO | 2006/042156 | 4/2006 | |
| WO | 2008/121992 | 10/2008 | |
| WO | 2014/152534 | 9/2014 | |
| WO | WO-2017040387 A2 * | 3/2017 | ............. A61K 39/12 |
| WO | 2017/075125 | 5/2017 | |

OTHER PUBLICATIONS

Extended European Search Report issued in EP 20755020.3, mailed Jan. 19, 2023.
Baviskar, Pradyumna S., et al. "The respiratory syncytial virus fusion protein targets to the perimeter of inclusion bodies and facilitates filament formation by a cytoplasmic tail-dependent mechanism." Journal of Virology 87.19 (2013): 10730-10741.
Buchholz, Ursula J., Stefan Finke, and Karl-Klaus Conzelmann. "Generation of bovine respiratory syncytial virus (BRSV) from cDNA: BRSV NS2 is not essential for virus replication in tissue culture, and the human RSV leader region acts as a functional BRSV genome promoter." Journal of virology 73.1 (1999): 251-259.
Burns, Cara Carthel, et al. "Modulation of poliovirus replicative fitness in HeLa cells by deoptimization of synonymous codon usage in the capsid region." Journal of virology 80.7 (2006): 3259-3272.
Collins, Peter L., et al. "Gene overlap and site-specific attenuation of transcription of the viral polymerase L gene of human respiratory syncytial virus." Proceedings of the National Academy of Sciences 84.15 (1987): 5134-5138.
Collins, Peter L., et al. "Nucleotide sequences for the gene junctions of human respiratory syncytial virus reveal distinctive features of intergenic structure and gene order." Proceedings of the National Academy of Sciences 83.13 (1986): 4594-4598.
Collins, Peter L., et al. "Production of infectious human respiratory syncytial virus from cloned cDNA confirms an essential role for the transcription elongation factor from the 5'proximal open reading frame of the M2 mRNA in gene expression and provides a capability for vaccine development." Proceedings of the National Academy of Sciences 92.25 (1995): 11563-11567.

(Continued)

*Primary Examiner* — Janet L Andres
*Assistant Examiner* — Carey Alexander Stuart
(74) *Attorney, Agent, or Firm* — Emory Patent Group

(57) ABSTRACT

This disclosure describes a chimeric respiratory syncytial virus encoding a chimeric RSV and hMPV F protein and uses of the chimeric virus or components therein in a vaccine. In certain embodiments, this disclosure describes a live attenuated vaccine comprising an RSV backbone substituting the F proteins of RSV, for a chimeric RSV and hMPV F protein.

20 Claims, 12 Drawing Sheets

Specification includes a Sequence Listing.

(56) References Cited

OTHER PUBLICATIONS

Collins, Peter L., Yung T. Huang, and Gail W. Wertz. "Nucleotide sequence of the gene encoding the fusion (F) glycoprotein of human respiratory syncytial virus." Proceedings of the National Academy of Sciences 81.24 (1984): 7683-7687.
De Wet, Jeffrey R., et al. "Firefly luciferase gene: structure and expression in mammalian cells." Molecular and cellular biology 7.2 (1987): 725-737.
Glenn, Gregory M., et al. "A randomized, blinded, controlled, dose-ranging study of a respiratory syncytial virus recombinant fusion (F) nanoparticle vaccine in healthy women of childbearing age." The Journal of infectious diseases 213.3 (2016): 411-422.
Hein, Jotun. "An algorithm for statistical alignment of sequences related by a binary tree." Biocomputing 2001. 2000. 179-190.
Hotard, Anne L., et al. "A stabilized respiratory syncytial virus reverse genetics system amenable to recombination-mediated mutagenesis." Virology 434.1 (2012): 129-136.
Hotard, Anne L., et al. "Identification of residues in the human respiratory syncytial virus fusion protein that modulate fusion activity and pathogenesis." Journal of virology 89.1 (2015): 512-522.
Iyer, Vidyashankara, et al. "Impact of formulation and particle size on stability and immunogenicity of oil-in-water emulsion adjuvants." Human vaccines & immunotherapeutics 11.7 (2015): 1853-1864.
Karron, Ruth A., et al. "Identification of a recombinant live attenuated respiratory syncytial virus vaccine candidate that is highly attenuated in infants." The Journal of infectious diseases 191.7 (2005): 1093-1104.
Kim, Hyun Wha, et al. "Safety and antigenicity of temperature sensitive (TS) mutant respiratory syncytial virus (RSV) in infants and children." Pediatrics 52.1 (1973): 56-63.
Liang, Bo, et al. "Packaging and prefusion stabilization separately and additively increase the quantity and quality of respiratory syncytial virus (RSV)-neutralizing antibodies induced by an RSV fusion protein expressed by a parainfluenza virus vector." Journal of virology 90.21 (2016): 10022-10038.
Maniatis, Tom, Stephen Goodbourn, and Janice A. Fischer. "Regulation of inducible and tissue-specific gene expression." Science 236.4806 (1987): 1237-1245.
Meng, Jia, et al. "Refining the balance of attenuation and immunogenicity of respiratory syncytial virus by targeted codon deoptimization of virulence genes." MBio 5.5 (2014): e01704-14.
Meng, Jia, et al. "Respiratory syncytial virus attachment glycoprotein contribution to infection depends on the specific fusion protein." Journal of virology 90.1 (2015): 245-253.
Merzlyak, Ekaterina M., et al. "Bright monomeric red fluorescent protein with an extended fluorescence lifetime." Nature methods 4.7 (2007): 555-557.
Mueller, Steffen, et al. "Live attenuated influenza virus vaccines by computer-aided rational design." Nature biotechnology 28.7 (2010): 723-726.
Mueller, Steffen, et al. "Reduction of the rate of poliovirus protein synthesis through large-scale codon deoptimization causes attenuation of viral virulence by lowering specific infectivity." Journal of virology 80.19 (2006): 9687-9696.
Murphy, Brian R., et al. "Enhanced pulmonary histopathology is observed in cotton rats immunized with formalin-inactivated respiratory syncytial virus (RSV) or purified F glycoprotein and challenged with RSV 3-6 months after immunization." Vaccine 8.5 (1990): 497-502.
Needleman, Saul B., and Christian D. Wunsch. "A general method applicable to the search for similarities in the amino acid sequence of two proteins." Journal of molecular biology 48.3 (1970): 443-453.
Olmedillas, Eduardo, et al. "Chimeric Pneumoviridae fusion proteins as immunogens to induce cross-neutralizing antibody responses." EMBO molecular medicine 10.2 (2018): e201708078, 175-187.
Pearson and Lipman, Proc. Natl. Acad. Sci. (U.S.) 85:2444 (1988).
Quan, Fu-Shi, et al. "Viruslike particle vaccine induces protection against respiratory syncytial virus infection in mice." Journal of Infectious Diseases 204.7 (2011): 987-995.
Randhawa, J. S., et al. "Nucleotide sequences of the genes encoding the putative attachment glycoprotein (G) of mouse and tissue culture-passaged strains of pneumonia virus of mice." Virology 207.1 (1995): 240-245.
Rostad, Christina A., et al. "Enhancing the thermostability and immunogenicity of a respiratory syncytial virus (RSV) live-attenuated vaccine by incorporating unique RSV Line19F protein residues." Journal of Virology 92.6 (2018): e01568-17.
Shcherbo, Dmitry, et al. "Far-red fluorescent tags for protein imaging in living tissues." Biochemical journal 418.3 (2009): 567-574.
Smith, Temple F., and Michael S. Waterman. "Comparison of biosequences." Advances in applied mathematics 2.4 (1981): 482-489.
Stobart, Christopher C., et al. "A live RSV vaccine with engineered thermostability is immunogenic in cotton rats despite high attenuation." Nature communications 7.1 (2016): 13916, 1-12.
Stobart, Christopher C., et al. "Reverse genetics of respiratory syncytial virus." Human Respiratory Syncytial Virus. Humana Press, New York, NY, 2016. 141-153.
Voss, Stephan D., Uwe Schlokat, and Peter Gruss. "The role of enhancers in the regulation of cell-type-specific transcriptional control." Trends in Biochemical Sciences 11.7 (1986): 287-289.
Walsh, Edward E., et al. "Immunization with glycoprotein subunits of respiratory syncytial virus to protect cotton rats against viral infection." Journal of Infectious Diseases 155.6 (1987): 1198-1204.
Williams, John V., et al. "The role of human metapneumovirus in upper respiratory tract infections in children: a 20-year experience." The Journal of infectious diseases 193.3 (2006): 387-395.
Wright, Peter F., et al. "Administration of a highly attenuated, live respiratory syncytial virus vaccine to adults and children." Infection and immunity 37.1 (1982): 397-400.
Wright, Peter F., et al. "Evaluation of a live, attenuated respiratory syncytial virus vaccine in infants." The Journal of pediatrics 88.6 (1976): 931-936.
Zhang, Yu, et al. "Development and optimization of a direct plaque assay for human and avian metapneumoviruses." Journal of virological methods 185.1 (2012): 61-68.
Zhang, Yu, et al. "Rational design of human metapneumovirus live attenuated vaccine candidates by inhibiting viral mRNA cap methyltransferase." Journal of virology 88.19 (2014): 11411-11429.
International Search Report and Written Opinion issued in PCT/US2020/017727, mailed May 1, 2020 (4 pages).

* cited by examiner

FIG. 1

```
MSWKVVIIFS  LLITPQHGLK  ESYLEESCST  ITEGYLSVLR  TGWYTNVFTL
..........  ..........  ..........  ..........  ..........
**********  **********  **********  **********  **********

REEQIENPRQ  SRFVLGAIAL  GVATAAAVTA  GVAIAKTIRL  ESEVTAIKNA
..........  .R........  ..........  ..........  ..........
**********  *R********  **********  **********  **********

KCDIDDLKMA  VSFSQFNRRF  LNVVRQFSDN  AGITPAISLD  LMTDAELARA
..........  ..........  ..........  ..........  ..........
**********  **********  **********  **********  **********

VQLPIFGVID  TPCWIVKAAP  SCSKKKGNYA  CLLREDQGWY  CQNAGSTVYY
..........  ..........  ..........  ..........  ..........
**********  **********  **********  **********  **********

CKVSTGRHPI  SMVALSPLGA  LVACYKGVSC  SIGSNRVGII  KQLNKGCSYI
..........  ..........  ..........  ..........  ..........
**********  **********  **********  **********  **********

FPEDQFNVAL  DQVFENIENS  QALVDQSNRI  LSSAEKGNTG  FI-IVIILIA
..........  ..........  ..........  ..........  .I...M.TTI..V.I
**********  **********  **********  ..........  **********
```

FIG. 5

```
EVGDVENLTC ADGPSLIKTE LELTKSALRE LKTVSADQLA
.......... .......... .......... ..........
********** ********** ********** **********

LKKTNEAVST LGNGVRVLAT AVRELKDFVS KNLTRAINKN
.......... .......... .......... ..........
********** ********** ********** **********

VSNMPTSAGQ IKLMLENRAM VRRKGFGILI GVYGSSVIYM
.......... .......... .......... ..........
********** ********** ********** **********

PNEKDCETRG DHVFCDTAAG INVAEQSKEC NINISTTNYP
.......... .......... .......... ..........
********** ********** ********** **********

TNQDADTVTI DNTVYQLSKV EGEQHVIKGR PVSSSFDPVK
.......... .......... .......... ..........
********** ********** ********** **********

VLGSSMILVS IFIIIKKTKK QTGAPPELSG VTNNGFIPHS    SEQ ID NO: 1
.ILL.L.A.G LLLYC.ARST PVTLSKDQLS GI..IAFSN-
*         *          *              **        SEQ ID NO: 5
```

FIG. 5 CONT.

|          | MSWKVVXIFS | LLITPQHGLK | ESYLEESCST | ITEGYLSVLR |
|----------|------------|------------|------------|------------|
| SEQ ID 6 | MSWKVVXIFS | LLITPQHGLK | ESYLEESCST | ITEGYLSVLR |
| SEQ ID 20 | .......I. | .......... | .......... | ..........* |
| SEQ ID 21 | .......I. | .......... | .......... | ..........* |
| SEQ ID 22 | ....MI..I. | .......... | .......... | ..........* |
| SEQ ID 23 | ....MI..I. | .......... | .......... | ..........* |
| SEQ ID 24 | .......I. | .......... | .......... | ..........* |
| SEQ ID 25 | .......I. | .......... | .......... | ..........* |
| SEQ ID 26 | .......I. | .......... | .......... | ..........* |
| SEQ ID 27 | ......V.. | .......... | .......... | ..........* |
| SEQ ID 28 | .......I. | .......... | .......... | ..........* |
| SEQ ID 29 | .......... | .......... | .......... | ..........* |
| SEQ ID 30 | .......... | .......... | .......... | ..........* |

|          | REEQIENPRX | XRFVLGAIAX | GVATAAAVTA | GXAIAKTIRL |
|----------|------------|------------|------------|------------|
| SEQ ID 6 | REEQIENPRX | XRFVLGAIAX | GVATAAAVTA | GXAIAKTIRL |
| SEQ ID 20 | ...Q....QS | .........L | .......... | .V........* |
| SEQ ID 21 | ...Q....QS | .........L | .......... | .V........* |
| SEQ ID 22 | ...Q....QS | .........L | .......... | .I........* |
| SEQ ID 23 | ...Q....QS | .........L | .......... | .V........* |
| SEQ ID 24 | ...Q....QS | .........L | .......... | .V........* |
| SEQ ID 25 | ...Q....QS | .........L | .......... | .V........* |
| SEQ ID 26 | ...Q....QS | .........L | .......... | .V........* |
| SEQ ID 27 | ...Q....QS | .........L | .......... | .V........* |
| SEQ ID 28 | ...Q....QS | .........F | .......... | .V........* |
| SEQ ID 29 | ...Q....QS | .........L | .......... | ..........* |
| SEQ ID 30 | .......... | .......... | .......... | ..........* |

```
         CKVSTGRHPI SMVALSPLGA LVACYKGVSC SIGSNRVGII
SEQ ID 6                                            
SEQ ID 20 .......... .......... .......... ..........*
SEQ ID 21 .......... .......... .......... ..........*
SEQ ID 22 ...G...... .......... .......... ..........*
SEQ ID 23 .......... .......... .......... ..........*
SEQ ID 24 .......... .......... .......... ..........*
SEQ ID 25 .......... .......... .......... ..........*
SEQ ID 26 .......... .......... .......... ..........*
SEQ ID 27 .......... .......... .......... ..........*
SEQ ID 28 .......... .......... .......... ..........*
SEQ ID 29 .......... .......... .......... ..........*
SEQ ID 30 .......... .......... .......... ..........*

FPEDQFNVAL DQVFENIENX QALVDQSNRI LXSAEKGNT-
SEQ ID 6                                            
SEQ ID 20 .......... .........S .......... ..S......G*
SEQ ID 21 .......... ..S......S .......... ..S......G*
SEQ ID 22 .......... ..S......S .......... ..N......G*
SEQ ID 23 .......... ..S......S .......K.. ..N......G*
SEQ ID 24 .......... .........S .......... ..S......G*
SEQ ID 25 .......... .........S .......... ..S......G*
SEQ ID 26 .......... .........S .......... ..S......G*
SEQ ID 27 .......... .........S .......... ..S......G*
SEQ ID 28 .......... .........S .......... ..S......G*
SEQ ID 29 .......... .......... .......... ..........*
SEQ ID 30 .......... .......... .......... ..........*
```

FIG. 6C

```
          KQLXKGCSYI TNQDADTVTI DNTVYQLSKV EGEQHVIKGR PVSXSFDPXX
          .N........ .......... .......... .......... .S....VK
          .N........ .......... .......... .......... .S....IR
          .P........ .......... .......... .......... .S....IR
          .P........ .......... .......... .......... .S....VK
          .N........ .......... .......... .......... .S....VK
          .N........ .......... .......... .......... .N....VK
          .N........ .......... .......... .......... .S....VK
          .N........ .......... .......... .......... .S....VK
          .N........ .......... .......... .......... .S....VK
          .S........ .......... .......... .......... ......VK
          .......... .......... .......... .......... .......*
          .......... .......... .......... .......... .......*
```

```
  : FIIVILIAV LGSSMILVSI FIIIKKTKKQ TGAPPELSGV TNNGFIPHS
  : FIIVILTAV LGSSMILVSI FIIIKKTKKP TGAPPELSGV TNNGFIPHN
  : FIIVILVAV LGSSMILVSV FIIIKKTKKP TGAPPELNGV TNNGFIPHS
  : FIIVIILIAV LGSSMILVSI FIIIKKTKKP TGAPPELNGV TNNGFIPHS
  : FIIVIILIAV LGSSMILVSI FIIIKKTKKQ TGAPPELSGV TNNGFIPHS
  : FIIVIILIAV LGSSMILVSV FIIIKKTKKP TGAPPELSGV TNNGFIPHS
  : FIIVIILIAV LGSSMILVSI FIIIKKTKKP TGAPPELSGV TNNGFIPHS
  : FIIVIILIAV LGSSMILVSI FIIIKKTKKP TGAPPELSGV TNNGFIPHS
  : FIIVIILIAV LGSSMILVSI FIIIKKTKKP TGAPPELSGV TNNGFIPHS
  : FIIVIILIAV LGSSMILVSI FIIIKKTKKP TGAPPELSGV TNNGFIPHS
```

FIG. 6C CONT.

CHIMERIC RSV AND HMPV F PROTEINS, IMMUNOGENIC COMPOSITIONS, AND METHODS OF USE

This application is a national stage application filed under 35 U.S.C. § 371 of PCT/US2020/017727 filed Feb. 11, 2020, which claims the benefit of U.S. Provisional Application No. 62/804,005, filed on Feb. 11, 2019, which are incorporated herein by reference in their entireties.

BACKGROUND

Human Metapneumovirus (hMPV) is a respiratory viral pathogen that causes a spectrum of illnesses that range from asymptomatic infection to severe bronchiolitis. hMPV is a negative single-stranded RNA virus of the family Pneumoviridae which includes respiratory syncytial virus (RSV). hMPV is seasonal, roughly following a similar seasonal distribution to that of flu. By the age of 5 almost all children will have been exposed to hMPV, and reinfections commonly occur. While in most, the infections symptoms are mild, in young, immunocompromised or elderly patients, the infection can result in hospitalization or even death if it is compounded with a secondary condition such as asthma. Currently there are no approved vaccines or antivirals to address hMPV. Thus, there is a need to identify methods for preventing and treating hMPV infections.

Vaccines may be killed (inactivated) or weakened (attenuated) versions of a live viral strain. Zhang et al. report human metapneumovirus live attenuated vaccine candidates by inhibiting viral mRNA cap methyltransferase. J Virol, 2014, 88 (19): 11411-29. Olmedillas et al. report chimeric pneumoviridae fusion proteins as immunogens to induce cross-neutralizing antibody responses. EMBO Mol Med. 2017, e201708078.

Liang et al. report RSV fusion protein expressed by a parainfluenza virus vector. J Virol. 2016, 90 (21): 10022-10038. Stobart et al. report a live RSV vaccine with engineered thermostability that is immunogenic in cotton rats. Nature Communications, 7, Article number: 13916 (2016). See also WO 2017/075125 and WO 2014/152534.

References cited herein are not an admission of prior art.

SUMMARY

This disclosure relates to the discovery that adding the transmembrane domain and/or cytoplasmic tail of an RSV F protein to an hMPV F protein can successfully be used in a chimeric RSV-hMPV virus to generate a vaccine. Without wishing to be bound by the theory, the cytoplasmic tail of the RSV F protein is believed to promote viral assembly, leading to increased virus production. Accordingly, the disclosure relates to a chimeric respiratory syncytial virus encoding a chimeric RSV and hMPV F protein and uses of the chimeric virus or components therein in a vaccine. In certain embodiments, this disclosure relates to a live attenuated vaccine comprising an RSV backbone substituting the F proteins of RSV, for a chimeric RSV and hMPV F protein.

In certain aspects, the disclosure relates to a chimeric RSV and hMPV F protein comprising an hMPV F protein ectodomain and an RSV F protein cytoplasmic tail. In certain embodiments, the chimeric RSV and hMPV F protein also includes an RSV F protein transmembrane domain, wherein the chimeric RSV and hMPV F protein comprises, in an N- to C-terminal direction, the hMPV F protein ectodomain, the RSV F protein transmembrane domain, and the RSV F protein cytoplasmic tail.

In certain embodiments, this disclosure relates to an immunogenic composition comprising live chimeric virus having a nucleic acid encoding a chimeric RSV and hMPV F protein. In certain embodiments, the live chimeric virus comprises a nucleic acid encoding SEQ ID NO: 1 or variants thereof, e.g., a variant thereof having at least about 85% sequence identity to SEQ ID NO: 1. In certain embodiments, the nucleic acid encoding SEQ ID NO: 1 comprises SEQ ID NO: 2 or variants thereof, e.g., a variant thereof having at least about 85% sequence identity to SEQ ID NO: 2. In certain embodiments, the live chimeric virus does not contain a gene that encodes respiratory syncytial virus SH protein.

In certain embodiments, the disclosure contemplates fusion proteins and chimeric particles comprising a chimeric hMPV and RSV F protein having SEQ ID NO: 1 or variants thereof or variants with greater than 50, 60, 70, 80, 90, 91, 92, 93, 94, 95, 96, 97, 98, or 99% sequence identity. In certain embodiments, the variant comprises one, two, three, four, five, six, seven, eight, nine, ten, or more amino acid substitutions or conserved amino acid substitutions.

In certain embodiments, the chimeric hMPV and RSV F protein has an N-terminal hMPV sequence of SEQ ID NO: 6, MSWKVVX$^1$IFSLLITPQHGLKESYLEESCSTITEGYLSVLRTGWYTNVF
TLEVGDVENLTCX$^2$DGPSLIKTELX$^3$LTKSALRELKTVSADQLAREEQI
ENPRX$^4$X$^5$RFVLGAIAX$^6$GVATAAAVTAGX$^7$AIAKTIRLESEVX$^8$AIKX$^9$A
LKKTNEAVSTLGNGVRVLATAVRELKX$^{10}$FVSKNLTX$^{11}$AINKNKCDIX$^{12}$
DLKMAVSFSQFNRRFLNVVRQFSDNAGITPAISLDLMTDAELARAVSX$^{13}$
MPTSAGQIKLMLENRAMVRRKGFGILIGVYGSSVIYMVQLPIFGVIDTP
CWIX$^{14}$KAAPSCSX$^{15}$KX$^{16}$GNYACLLREDQGWYCX$^{17}$NAGSTVYYPNEKDC
ETRGDHVFCDTAAGINVAEQSX$^{18}$ECNINISTTNYPCKVSTGRHPISMVA
LSPLGALVACYKGVSCSIGSNRVGIIKQLX$^{19}$KGCSYITNQDADTVTIDN
TVYQLSKVEGEQHVIKGRPVSX$^{20}$SFDPX$^{21}$X$^{22}$FPEDQFNVALDQVFENI
ENX$^{23}$QALVDQSNRILX$^{24}$SAEKGNT, wherein X$^1$ is I or V, X$^2$ is A or T, X$^3$ is E or D, X$^4$ is R or Q, X$^5$ is R or S, X$^6$ is L or F, X$^7$ is V or I, X$^8$ is T or N, X$^9$ is N or G, X$^{10}$ is E or D, X$^{11}$ is R or S, X$^{12}$ is A or D, X$^{13}$ is V or Y, X$^{14}$ is V or I, X$^{15}$ is K or E, X$^{16}$ is K or R, X$^{17}$ is Q or K, X$^{18}$ is K or R, X$^{19}$ is N or S, X$^{20}$ is S or N, X$^{21}$ is V or I, X$^{22}$ is K or R, X$^{23}$ is N or S, and/or X$^{24}$ is S or N, such as those provided for in F [Human metapneumovirus] GenBank® accession numbers:

AEK26895.1,
(SEQ ID NO: 20)
MSWKVVIIFSLLITPQHGLKESYLEESCSTITEGYLSVLRTGWYTNVFT
LEVGDVENLTCADGPSLIKTELELTKSALRELKTVSADQLAREEQIENP
RQSRFVLGAIALGVATAAAVTAGVAIAKTIRLESEVTAIKNALKKTNEA
VSTLGNGVRVLATAVRELKDFVSKNLTRAINKNKCDIDDLKMAVSFSQF
NRRFLNVVRQFSDNAGITPAISLDLMTDAELARAVSNMPTSAGQIKLML
ENRAMVRRKGFGILTGVYGSSVIYMVQLPIFGVIDTPCWIVKAAPSCSK

-continued
KKGNYACLLREDQGWYCQNAGSTVYYPNEKDCETRGDHVFCDTAAGINV

AEQSKECNINISTTNYPCKVSTGRHPISMVALSPLGALVACYKGVSCSI

GSNRVGIIKQLNKGCSYITNQDADTVTIDNTVYQLSKVEGEQHVIKGRP

VSSSFDPVKFPEDQFNVALDQVFENIENSQALVDQSNRILSSAEKGNTG

FIIVIILIAVLGSSMILVSIFIIIKKTKKQTGAPPELSGVTNNGFIPH

S;

AEK26886.1,
(SEQ ID NO: 21)
MSWKVVIIFSLLITPQHGLKESYLEESCSTITEGYLSVLRTGWYTNVFT

LEVGDVENLTCADGPSLIKTELDLTKSALRELRTVSADQLAREEQIENP

RQSRFVLGAIALGVATAAAVTAGVAIAKTIRLESEVTAIKNALKKTNEA

VSTLGNGVRVLATAVRELKDFVSKNLTRAINKNKCDIADLKMAVSFSQF

NRRFLNVVRQFSDNAGITPAISLDLMTDAELARAVSNMPTSAGQIKLML

ENRAMVRRKGFGIPIGVYGSSVIYMVQLPIFGVIDTPCWIVKAAPSCSE

KKGNYACLLREDQGWYCQNAGSTVYYPNEKDCETRGDHVFCDTAAGINV

AEQSKECNINISTTNYPCKVSTGRHPISMVALSPLGALVACYKGVSCSI

GSNRVGIIKQLNKGCSYITNQDADTVTIDNTVYQLSKVEGEQHVIKGRP

VSSSFDPVKFPEDQFNVALDQVFENIENSQALVDQSNRILSSAEKGNTG

FIIVIILTAVLGSTMILVSVFIIIKKTKKPTGAPPELSGVTNNGFIPH

N;

AEK26906.1,
(SEQ ID NO: 22)
MSWKVMIIISLLITPQHGLKESYLEESCSTITEGYLSVLRTGWYTNVFT

LEVGDVENLTCTDGPSLIKTELDLTKSALRELKTVSADQLAREEQIENP

RQSRFVLGAIALGVATAAAVTAGIAIAKTIRLESEVNAIKGALKQTNEA

VSTLGNGVRVLATAVRELKEFVSKNLTSAINKNKCDIADLKMAVSFSQF

NRRFLNVVRQFSDNAGITPAISLDLMTDAELARAVSYMPTSAGQIKLML

ENRAMVRRKGFGILIGVYGSSVIYMVQLPIFGVIDTPCWIIKAAPSCSE

KNGNYACLLREDQGWYCKNAGSTVYYPNEKDCETRGDHVFCDTAAGINV

AEQSRECNINISTTNYPCKVSTGGHPISMVALSPLGALVACYKGVSCSI

GSNRVGIIKQLPKGCSYITNQDADTVTIDNTVYQLSKVEGEQHVIKGRP

VSSSFDPIRFPEDQFNVALDQVFESIENSQALVDQSNRILNSAEKGNTG

FIIVIILVAVLGLTMISVSIIIIKKTKKPKGAPPELNGVTNGGFIPH

S;

ACJ53612.1.,
(SEQ ID NO: 23)
MSWKVMIIISLLITPQHGLKESYLEESCSTITEGYLSVLRTGWYTNVFT

LEVGDVENLTCTDGPSLIKTELDLTKSALRELKTVSADQLAREEQIENP

RQSRFVLGAIALGVATAAAVTAGIAIAKTIRLESEVNAIKGALKKTNEA

VSTLGNGVRVLATAVRELKEFVSKNLTSAINKNKCDIADLKMAVSFSQF

NRRFLNVVRQFSDNAGITPAISLDLMTDAELARAVSYMPTSAGQIKLML

ENRAMVRRKGFGILIGVYGSSVIYMVQLPIFGVIDTPCWIIKAAPSCSE

KDGNYACLLREDQGWYCKNAGSTVYYPNEKDCETRGDHVFCDTAAGINV

AEQSRECNINISTTNYPCKVSTGRHPISMVALSPLGALVACYKGVSCSI

GSNRVGIIKQLPKGCSYITNQDADTVTIDNTVYQLSKVEGEQHVIKGRP

VSSSFDPIRFPEDQFNVALDQVFESIENSQALVDQSNKILNSAEKGNTG

FIIVIILIAVLGLTMISVSIIIIKKTRKPTGAPPELNGVTNGGFIPH

S;

ACJ53565.1,
(SEQ ID NO: 24)
MSWKVVIIFSLLITPQHGLKESYLEESCSTITEGYLSVLRTGWYTNVFT

LEVGDVENLTCADGPSLIKTELELTKSALRELKTVSADQLAREEQIENP

RQSRFVLGAIALGVATAAAVTAGVAIAKTIRLESEVTAIKNALKKTNEA

VSTLGNGVRVLATAVRELKDFVSKNLTRAINKNKCDIDDLKMAVSFSQF

NRRFLNVVRQFSDNAGITPAISLDLMTDAELARAVSNMPTSAGQIKLML

ENRAMVRRKGFGILTGVYGSSVIYMVQLPIFGVIDTPCWIVKAAPSCSE

KKGNYACLLREDQGWYCQNAGSTVYYPNEKDCETRGDHVFCDTAAGINV

AEQSKECNINISTTNYPCKVSTGRHPISMVALSPLGALVACYKGVSCSI

GSNRVGIIKQLNKGCSYITNQDADTVTIDNTVYQLSKVEGEQHVIKGRP

VSSSFDPVKFPEDQFNVALDQVFENIENSQALVDQSNRILSSAEKGNTG

FIIVIILIAVLGSSMILVSIFIIIKKTKKQTGAPPELSGVTNNGFIPH

S;

AHV79858.1,
(SEQ ID NO: 25)
MSWKVVIIFSLLITPQHGLKESYLEESCSTITEGYLSVLRTGWYTNVFT

LEVGDVENLTCADGPSLIKTELDLTKSALRELKTVSADQLAREEQIENP

RQSRFVLGAIALGVATAAAVTAGVAIAKTIRLESEVTAIKNALKKTNEA

VSTLGNGVRVLATAVRELKDFVSKNLTRAINKNKCDIDDLKMAVSFSQF

NRRFLNVVRQFSDNAGITPAISLDLMTDAELARAVSNMPTSAGQIKLML

ENRAMVRRKGFGILTGVYGSSVIYMVQLPIFGVIDTPCWIVKAAPSCSE

KKGNYACLLREDQGWYCQNAGSTVYYPNEKDCETRGDHVFCDTAAGINV

AEQSKECNINISTTNYPCKVSTGRHPISMVALSPLGALVACYKGVSCSI

GSNRVGIIKQLNKGCSYITNQDADTVTIDNTVYQLSKVEGEQHVIKGRP

VSSSFDPVKFPEDQFNVALDQVFENIENSQALVDQSNRILSSAEKGNTG

FIIVIILIAVLGSSMILVSVLIIIKKTKKPTGAPPELSGVTNNGFIPH

S;

BBB35088.1,
(SEQ ID NO: 26)
MSWKVVIIFSLLITPQHGLKESYLEESCSTITEGYLSVLRTGWYTNVFT

LEVGDVENLTCADGPSLIKTELDLTKSALRELKTVSADQLAREEQIENP

RQSRFVLGAIALGVATAAAVTAGVAIAKTIRLESEVTAIKNALKKTNEA

VSTLGNGVRVLATAVRELKDFVSKNLTRAINKNKCDIDDLKMAVSFSQF

NRRFLNVVRQFSDNAGITPAISLDLMTDAELARAVSNMPTSAGQIKLML

ENRAMVRRKGFGILTGVYGSSVIYMVQLPIFGVIDTPCWIVKAAPSCSE

KKGNYACLLREDQGWYCQNAGSTVYYPNEKDCETRGDHVFCDTAAGINV

AEQSKECNINISTTNYPCKVSTGRHPISMVALSPLGALVACYKGVSCSI

GSNRVGIIKQLNKGCSYITNQDADTVTIDNTVYQLSKVEGEQHVIKGRP

-continued

VSNSFDPVKFPEDQFNVALDQVFENIENSQALVDQSNRILSSAEKGNTG

FIIVIILIAVLGSSMILVSIFIIIKKTKKPTGAPPELSGVTNNGFIPH

S;

AHV79473.1,
(SEQ ID NO: 27)
MSWKVVVIFSLLITPQHGLKESYLEESCSTITEGYLSVLRTGWYTNVFT

LEVGDVENLTCADGPSLIKTELDLTKSALRELKTVSADQLAREEQIENP

RQSRFVLGAIALGVATAAAVTAGVAIAKTIRLESEVTAIKNALKKTNEA

VSTLGNGVRVLATAVRELKDFVSKNLTRAINKNKCDIDDLKMAVSFSQF

NRRFLNVVRQFSDNAGITPAISLDLMTDAELARAVSNMPTSAGQIKLML

ENRAMVRRKGFGILTGVYGSSVIYMVQLPIFGVIDTPCWIVKAAPSCSE

KKGNYACLLREDQGWYCQNAGSTVYYPNEKDCETRGDHVFCDTAAGINV

AEQSKECNINISTTNYPCKVSTGRHPISMVALSPLGALVACYKGVSCSI

GSNRVGIIKQLNKGCSYITNQDADTVTIDNTVYQLSKVEGEQHVIKGRP

VSSSFDPVKFPEDQFNVALDQVFENIENSQALVDQSNRILSSAEKGNTG

FIIVIILIAVLGSSMILVSVFIIIKKTKKPTGAPPELSGVTNNGFIPH

S;

AAS22125.1,
(SEQ ID NO: 28)
MSWKVVIIFSLLITPQHGLKESYLEESCSTITEGYLSVLRTGWYTNVFT

LEVGDVENLTCADGPSLIKTELDLTKSALRELKTVSADQLAREEQIENP

RQSRFVLGAIALGVATAAAVTAGVAIAKTIRLESEVTAIKNALKKTNEA

VSTLGNGVRVLATAVRELKDFVSKNLTRAINKNKCDIDDLKMAVSFSQF

NRRFLNVVRQFSDNAGITPAISLDLMTDAELARAVSNMPTSAGQIKLML

ENRAMVRRKGFGILTGVYGSSVIYMVQLPIFGVIDTPCWIVKAAPSCSE

KRGNYACLLREDQGWYCQNAGSTVYYPNEKDCETRGDHVFCDTAAGINV

AEQSKECNINISTTNYPCKVSTGRHPISMVALSPLGALVACYKGVSCSI

GSNRVGIIKQLNKGCSYITNQDADTVTIDNTVYQLSKVEGEQHVIKGRP

VSSSFDPVKFPEDQFNVALDQVFENIENSQALVDQSNRILSSAEKGNTG

FIIVIILIAVLGSSMILVSVFIIIKKTKKPTGAPPELSGVTNNGFIPH

S;

AUF72445.1,
(SEQ ID NO: 29)
MSWKVVIIFSLLITPQHGLKESYLEESCSTITEGYLSVLRTGWYTNVFT

LEVGDVENLTCADGPSLIKTELDLTKSALRELKTVSADQLAREEQIENP

RQSRFVLGAIAFGVATAAAVTAGVAIAKTIRLESEVTAIKNALKKTNEA

VSTLGNGVRVLATAVRELKDFVSKNLTRAINKNKCDIDDLKMAVSFSQF

NRRFLNVVRQFSDNAGITPAISLDLMTDAELARAVSNMPTSAGQIKLML

ENRAMVRRKGFGILTGVYGSSVIYMVQLPIFGVIDTPCWIVKAAPSCSE

KKGNYACLLREDQGWYCQNAGSTVYYPNEKDCETRGDHVFCDTAAGINV

AEQSKECNINISTTNYPCKVSTGRHPISMVALSPLGALVACYKGVSCSI

GSNRVGIIKQLNKGCSYITNQDADTVTIDNTVYQLSKVEGEQHVIKGRP

VSSSFDPVKFPEDQFNVALDQVFENIENSQALVDQSNRILSSAEKGNTG

FIIVIILIAVLGSSMILVSIFIIIKKTKKPTGAPPELSGVTNNGFIPH

S;

ACJ53575.1,
(SEQ ID NO: 30)
MSWKVVIIFSLLITPQHGLKESYLEESCSTITEGYLSVLRTGWYTNVFT

LEVGDVENLTCADGPSLIKTELDLTKSALRELKTVSADQLAREEQIENP

RQSRFVLGAIALGVATAAAVTAGVAIAKTIRLESEVTAIKNALKKTNEA

VSTLGNGVRVLATAVRELKDFVSKNLTRAINKNKCDIDDLKMAVSFSQF

NRRFLNVVRQFSDNAGITPAISLDLMTDAELARAVSNMPTSAGQIKLML

ENRAMVRRKGFGILTGVYGSSVIYMVQLPIFGVIDTPCWIVKAAPSCSE

KRGNYACLLREDQGWYCQNAGSTVYYPNEKDCETRGDHVFCDTAAGINV

AEQSKECNINISTTNYPCKVSTGRHPISMVALSPLGALVACYKGVSCSI

GSNRVGIIKQLSKGCSYITNQDADTVTIDNTVYQLSKVEGEQHVIKGRP

VSSSFDPVKFPEDQFNVALDQVFENIENSQALVDQSNRILSSAEKGNTG

FIIVIILIAVLGSSMILVSIFIIIKKTKKPTGAPPELSGVTNNGFIPH

S.

In certain embodiments, $X^1$ to $X^{24}$ are each, individually and independently, any amino acid or a conserved substitution of those identified therein.

In certain embodiments, the chimeric hMPV and RSV F protein has a C-terminal RSV sequence of SEQ ID NO: 7, $X^2$MITTIIVIIVILLX$^1$LIAVGLLLYCKARSTPX$^3$-TLSKDQLSGINNIAFSN, wherein $X^1$ is S or L, $X^2$ is I or V, $X^3$ is V or I such as those provided for in Respiratory syncytial virus type A having GenBank® accession numbers AUC68149.1, AHW81430.1, AIZ95893.1, AHW81440.1, and AJZ70067.1. In certain embodiments, $X^1$ to $X^3$ are each, individually and independently, any amino acid or a conserved substitution of those identified therein.

In certain embodiments, the disclosure contemplates a nucleic acid or vector encoding the chimeric hMPV and RSV F protein having SEQ ID NO: 1 or variants thereof with greater than 50, 60, 70, 80, 90, 95, 98, or 99% sequence identity. In certain embodiments, the nucleic acid comprises SEQ ID NO: 2 or variants thereof. In certain embodiments, variants are those that contain synonymous codons or are codon deoptimized.

In certain embodiments, the chimeric RSV-hMPV has genes encoding RSV NS1 and NS2, or the chimeric hMPV and RSV F protein which are optionally codon-deoptimized such that the rate of expression of the protein is reduced by more than half in Vero cells compared to the wild type A2 virus.

In certain embodiments, the rate of expression of NS1 is reduced by more than one third (⅓), one fourth, (¼), one fifth (⅕), or one tenth (1/10) in Vero cells compared to the wild type line A2 virus.

In certain embodiments, the rate of expression of NS2 is reduced by more than one third (⅓), one fourth, (¼), one fifth (⅕), or one tenth (1/10) in Vero cells compared to the wild type line A2 virus.

In certain embodiments, the gene encoding the SH protein is deleted or altered such that a truncated protein or no protein is expressed. In certain embodiments, the gene encoding the M2-2 is deleted or altered such that a truncated protein or no protein is expressed. In certain embodiments, the gene encoding the G protein is deleted or altered such that a truncated protein or no protein is expressed.

In certain embodiments, this disclosure relates to vaccine and immunogenic compositions comprising chimeric RSV-hMPV disclosed herein. In certain embodiments, the compositions further comprise an adjuvant and/or other pharmaceutically acceptable carrier. In certain embodiments, the adjuvant is an aluminum gel, aluminum salt, or monophosphoryl lipid A.

In certain embodiments, the adjuvant is an oil-in-water emulsion. In certain embodiments, the oil-in-water emulsion further comprises α-tocopherol, squalene, and/or a surfactant.

In certain embodiments, the disclosure relates to methods for vaccinating or immunizing a subject against respiratory syncytial virus, the method comprising administering to the subject an effective amount of a chimeric RSV-hMPV disclosed herein or immunogenic composition comprising the same. In certain embodiments, the effective amount produces a protective immune response in the subject.

In certain embodiments, the subject is a pregnant mother, a child under 2, 3, or 4 years old. In certain embodiments, subject has a reduced immune system, is over 60 or 65 years old or is regularly administered a chemotherapy or immune suppressive medication.

In certain embodiments, the disclosure relates to vectors comprising a nucleic acid encoding a chimeric hMPV and RSV F protein having SEQ ID NO: 1 or variants thereof. In certain embodiments, the vector is selected from a plasmid or a bacterial artificial chromosome.

In certain embodiments, the chimeric RSV-hMPV includes those that are infectious to a human subject and those that are not infectious to a human subject.

In certain embodiments, the disclosure relates to a particle, RSV-hMPV particle, or virus like particle comprising a chimeric hMPV and RSV F protein having SEQ ID NO: 1 or variants thereof as disclosed herein. In certain embodiments, the particle comprises a live and infectious attenuated chimeric RSV-hMPV genome or antigenome. In certain embodiments, the particle comprises and inactivated RSV-hMPV genome or antigenome, e.g., without nucleic acids or with nucleic acids that are not capable of expressing one, two, three or more or any of the RSV or hMPV proteins. In certain embodiments, the particles are killed using a method such as heat or formaldehyde. In certain embodiments, the particles are reconstituted by expression of viral structural proteins and a chimeric hMPV and RSV F protein having SEQ ID NO: 1 or variants thereof disclosed herein.

BRIEF DESCRIPTION OF THE DRAWINGS

Figure 1:
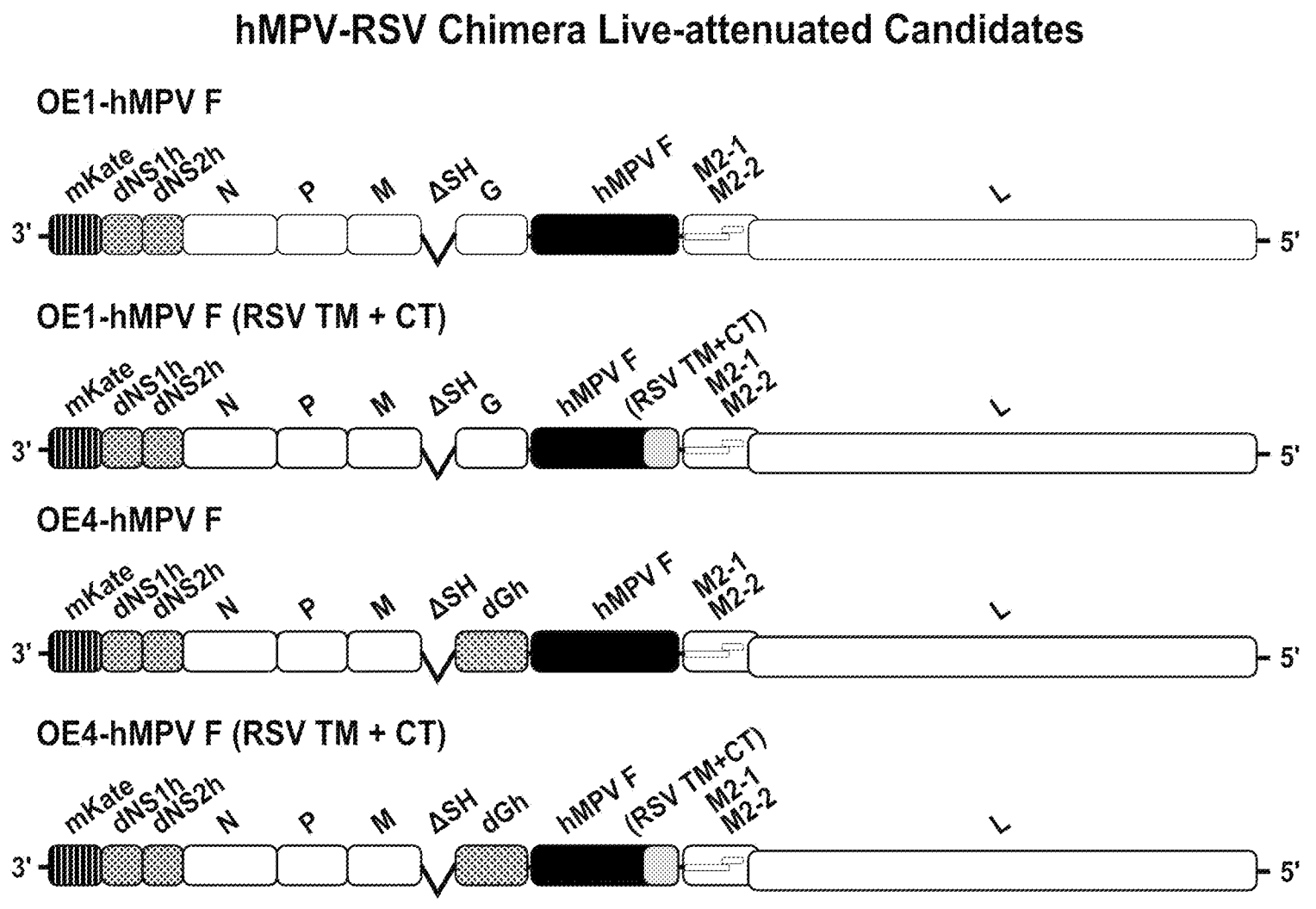

FIG. 1 illustrates a schematic genome of human metapneumovirus (hMPV) live-attenuated vaccine candidate DH1 (OE1-hMPV-F), DH2 (OE1-hMPV-F (RSV TM+CT), DH3 (OE4-hMPV-F), DH4 (OE4-hMPV-F (RSV TM+CT). To generate DH constructs, the hMPV TN/94-49 F gene (full length) or hMPV TN/94-49 F gene containing the RSV F transmembrane and cytoplasmic tail was inserted into the RSV A2 strain backbone. Further modifications to the A2 backbone included codon deoptimizing the NS1 and NS2 genes, and deletion of the small hydrophobic (SH) gene.

FIG. 5 shows a sequence comparison of the hMPV-F protein as provided for in Human metapneumovirus GenBank accession number AEK26895.1 (TN/94-49 F; SEQ ID NO: 5) with a chimeric RSV-hMPV F protein as disclosed herein (SEQ ID NO: 1), having an identity of 498/539 (92%). Yang et al. Genetic diversity and evolution of human metapneumovirus fusion protein over twenty years, J Virol, 6, 138 (2009).

Figure 6A:
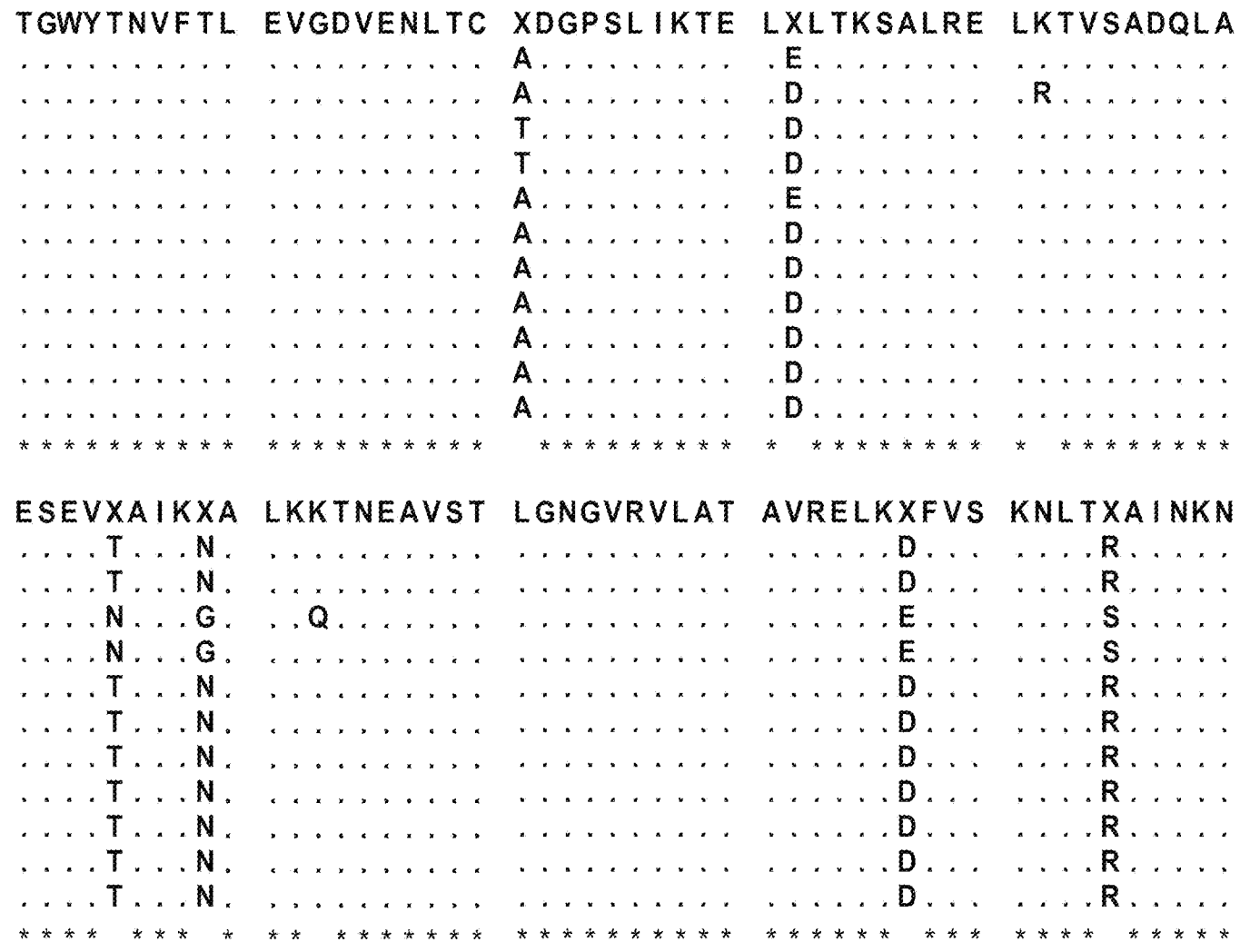
Figure 6B:
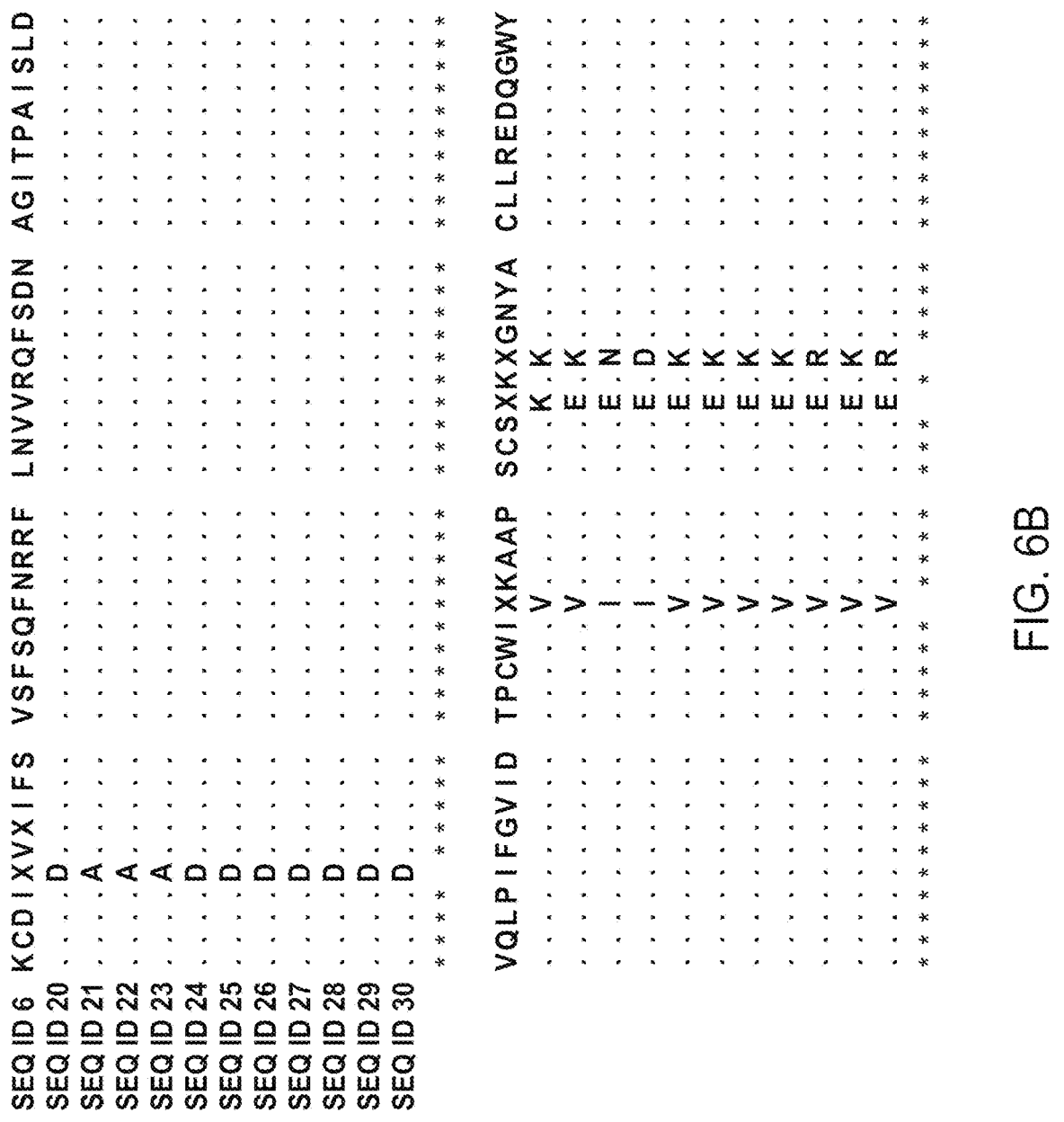
Figure 6B:
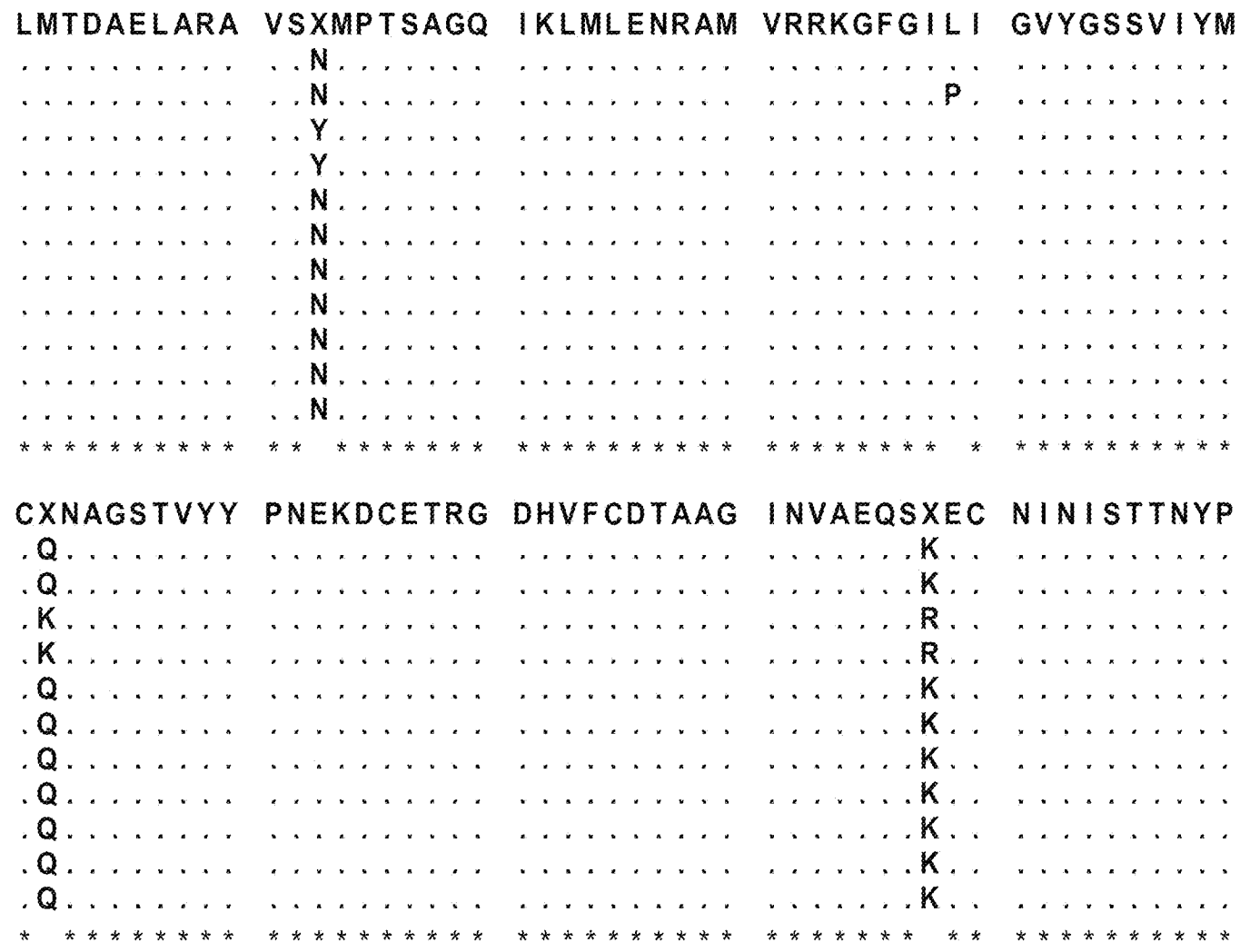

FIG. 6A provides an alignment of the first 180 amino acid in the consensus sequence SEQ ID NO: 6 with F proteins from various strains of hMPV (SEQ ID Nos 20-30).

FIG. 6B provides an alignment of the amino acids 181-360 in the consensus sequence SEQ ID NO: 6 with F proteins from various strains of hMPV (SEQ ID Nos 20-30).

FIG. 6C provides an alignment of the amino acids 361-489 in the consensus sequence SEQ ID NO: 6 with F proteins from various strains of hMPV (SEQ ID Nos 20-30).

DETAILED DESCRIPTION

Figure 2:
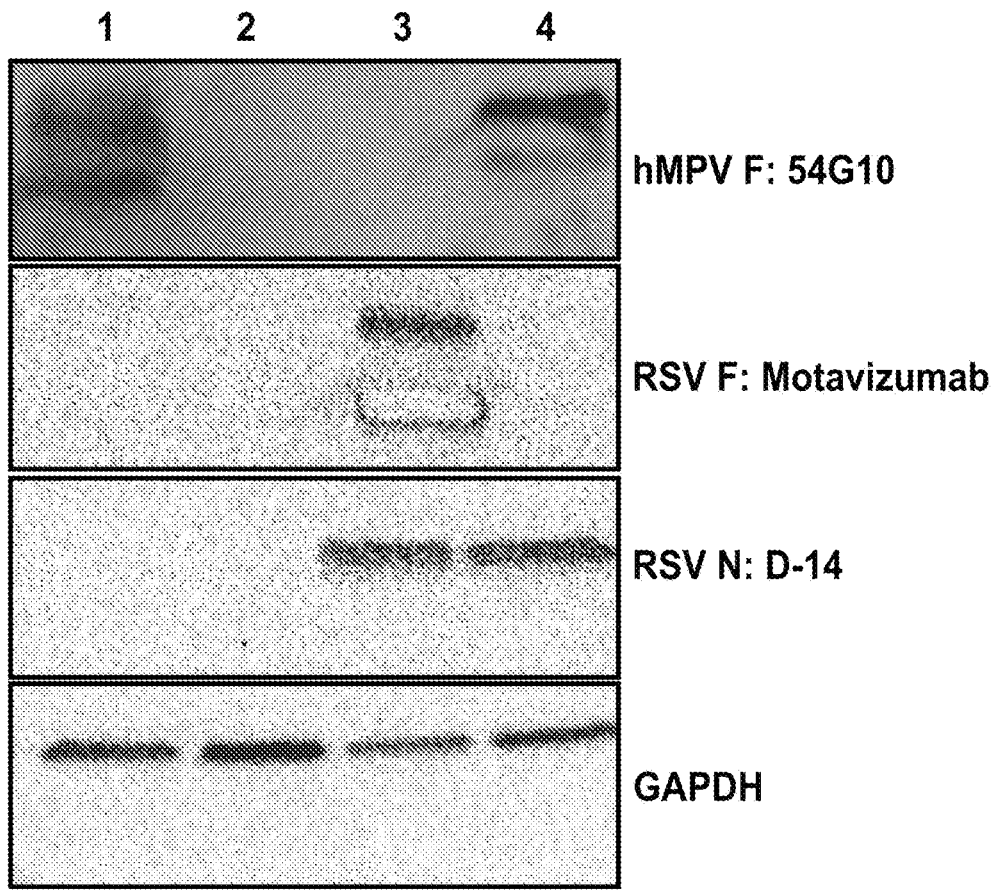
FIG. 2 shows hMPV F protein expression in Vero cells. Blot showing the F protein expression of wildtype hMPV (1), mock (2), RSV strain OE1 (3) and hMPV vaccine candidate DH2 (4). Cells were infected at MOI 0.5 and harvested 48 hours post infection. Equal amounts of protein were blotted.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of immunology, medicine, organic chemistry, biochemistry, molecular biology, pharmacology, physiology, and the like, which are within the skill of the art. Such techniques are explained fully in the literature.

It must be noted that, as used in the specification and the appended claims, the singular forms "a," "an," and "the" include plural referents unless the context clearly dictates otherwise. In this specification and in the claims that follow, reference will be made to a number of terms that shall be defined to have the following meanings unless a contrary intention is apparent.

Prior to describing the various embodiments, the following definitions are provided and should be used unless otherwise indicated.

The terms "protein" and "polypeptide" refer to compounds comprising amino acids joined via peptide bonds and are used interchangeably.

The term "portion" when used in reference to a protein (as in "a portion of a given protein") refers to fragments of that protein. The fragments may range in size from four amino acid residues to the entire amino sequence minus one amino acid.

The terms "chimeric respiratory syncytial virus" or "chimeric RSV-hMPV" refer to a nucleic acid that contains sufficient RSV genes to allow the genome or antigenome to replicate in host cells (e.g. Vero cells) and the sequence nucleic acid is altered to include at least one nucleic acid segment that contains a hMPV gene sequence or fragment. A chimeric RSV-hMPV includes an RSV or hMPV gene wherein the codons are altered to be different from those naturally occurring even though the gene produces a polypeptide with an identical amino acid sequence to those naturally expressed. Different strains of RSV-hMPV will have different nucleotide sequences and express proteins with different amino acid sequences that have similar functions. Thus, a chimeric RSV-hMPV includes an RSV or hMPV gene wherein one or more genes from one strain are replaced from genes in alternative or second strain such that the nucleic acid sequence of the entire RSV or hMPV genome is not identical to an RSV or hMPV found in nature. In certain embodiments, the chimeric RSV-hMPV includes those strains where nucleic acids are deleted after a codon for starting translation in order to truncate the proteins expression, provided such truncation pattern for the genome is not found in naturally occurring virus. In certain embodiments, the chimeric RSV-hMPV includes those that are infectious and can replicate in a human subject.

The term "chimera" or "chimeric" when used in reference to a polypeptide refers to the expression product of two or more coding sequences obtained from different sources such that they do not exist together in a natural environment, that have been cloned together and that, after translation, act as a single polypeptide sequence. The coding sequences include those obtained from the same or from different species of organisms. The present disclosure relates to chimeric RSV/hMPV fusion (F) proteins. Naturally-occurring RSV and hMPV F protein is a major surface glycoprotein that causes the virion membrane to fuse to the target cell membrane. The fusion protein exists in a metastable pre-fusion conformation that subsequently undergoes major refolding into a stable post-fusion form that approximates virion and target cell membranes and enables fusion.

The term "homolog" or "homologous" when used in reference to a polypeptide refers to a high degree of sequence identity between two polypeptides, or to a high degree of similarity between the three-dimensional structures or to a high degree of similarity between the active site and the mechanism of action. In a preferred embodiment, a homolog has a greater than 60% sequence identity, and more preferably greater than 75% sequence identity, and still more preferably greater than 90% sequence identity, with a reference sequence.

As applied to polypeptides, the term "substantial identity" means that two peptide sequences, when optimally aligned, such as by the programs "GAP" (Genetics Computer Group, Madison, Wis.), "ALIGN" (DNAStar, Madison, Wis.), Jotun Hein (Hein (2001) Proc. Pacific Symp. Biocomput. 179-190), using default gap weights, share at least 80 percent sequence identity, preferably at least 90 percent sequence identity, more preferably at least 95 percent sequence identity, e.g., at least 96 percent identity, at least 97 percent identity, at least 98 percent identity, at least 99 percent identity, at least 99.5 percent identity, at least 99.9 percent identity. Preferably, residue positions which are not identical differ by conservative amino acid substitutions.

The terms "variant" and "mutant" when used in reference to a polypeptide refer to an amino acid sequence that differs by one or more amino acids from another, usually related polypeptide. The variant may have "conservative" changes, wherein a substituted amino acid has similar structural or chemical properties. One type of conservative amino acid substitutions refers to the interchangeability of residues having similar side chains. For example, a group of amino acids having aliphatic side chains is glycine, alanine, valine, leucine, and isoleucine; a group of amino acids having aliphatic-hydroxyl side chains is serine and threonine; a group of amino acids having amide-containing side chains is asparagine and glutamine; a group of amino acids having aromatic side chains is phenylalanine, tyrosine, and tryptophan; a group of amino acids having basic side chains is lysine, arginine, and histidine; and a group of amino acids having sulfur-containing side chains is cysteine and methionine. Preferred conservative amino acids substitution groups are: valine-leucine-isoleucine, phenylalanine-tyrosine, lysine-arginine, alanine-valine, and asparagine-glutamine. More rarely, a variant may have "non-conservative" changes (e.g., replacement of a glycine with a tryptophan). Similar minor variations may also include amino acid deletions or insertions (in other words, additions), or both. Guidance in determining which and how many amino acid residues may be substituted, inserted or deleted without abolishing biological activity may be found using computer programs well known in the art, for example, DNAStar software. Variants can be tested in functional assays. Preferred variants have less than 10%, and preferably less than 5%, and still more preferably less than 2% changes (whether substitutions, deletions, and so on).

The term "gene" refers to a nucleic acid (e.g., DNA or RNA) sequence that comprises coding sequences necessary for the production of an RNA, or a polypeptide or its precursor (e.g., proinsulin). A functional polypeptide can be encoded by a full length coding sequence or by any portion of the coding sequence as long as the desired activity or functional properties (e.g., enzymatic activity, ligand binding, signal transduction, etc.) of the polypeptide are retained. The term "portion" when used in reference to a gene refers to fragments of that gene. The fragments may range in size from a few nucleotides to the entire gene sequence minus one nucleotide. Thus, "a nucleotide comprising at least a portion of a gene" may comprise fragments of the gene or the entire gene.

The term "gene" also encompasses the coding regions of a structural gene and includes sequences located adjacent to the coding region on both the 5' and 3' ends for a distance of about 1 kb on either end such that the gene corresponds to the length of the full-length mRNA. The sequences which are located 5' of the coding region and which are present on the mRNA are referred to as 5' non-translated sequences. The sequences which are located 3' or downstream of the coding region and which are present on the mRNA are referred to as 3' non-translated sequences. The term "gene" encompasses both cDNA and genomic forms of a gene. A genomic form or clone of a gene contains the coding region interrupted with non-coding sequences termed "introns" or "intervening regions" or "intervening sequences." Introns are segments of a gene which are transcribed into nuclear RNA (mRNA); introns may contain regulatory elements such as enhancers. Introns are removed or "spliced out" from the nuclear or primary transcript; introns therefore are absent in the messenger RNA (mRNA) transcript. The mRNA functions during translation to specify the sequence or order of amino acids in a nascent polypeptide.

In addition to containing introns, genomic forms of a gene may also include sequences located on both the 5' and 3' end of the sequences which are present on the RNA transcript. These sequences are referred to as "flanking" sequences or regions (these flanking sequences are located 5' or 3' to the non-translated sequences present on the mRNA transcript). The 5' flanking region may contain regulatory sequences such as promoters and enhancers which control or influence the transcription of the gene. The 3' flanking region may contain sequences which direct the termination of transcription, posttranscriptional cleavage and polyadenylation.

The term "heterologous gene" refers to a gene encoding a factor that is not in its natural environment (i.e., has been altered by the hand of man). For example, a heterologous gene includes a gene from one species introduced into another species. A heterologous gene also includes a gene native to an organism that has been altered in some way (e.g., mutated, added in multiple copies, linked to a non-native promoter or enhancer sequence, etc.). Heterologous genes are distinguished from endogenous genes in that the heterologous gene sequences are typically joined to nucleotide sequences comprising regulatory elements such as promoters that are not found naturally associated with the gene for the protein encoded by the heterologous gene or with gene sequences in the chromosome, or are associated with portions of the chromosome not found in nature (e.g., genes expressed in loci where the gene is not normally expressed).

The term "polynucleotide" refers to a molecule comprised of two or more deoxyribonucleotides or ribonucleotides, preferably more than three, and usually more than ten. The exact size will depend on many factors, which in turn depends on the ultimate function or use of the oligonucleotide. The polynucleotide may be generated in any manner, including chemical synthesis, DNA replication, reverse transcription, or a combination thereof. The term "oligonucleotide" generally refers to a short length of single-stranded polynucleotide chain although it may also be used interchangeably with the term "polynucleotide."

The term "nucleic acid" refers to a polymer of nucleotides, or a polynucleotide, as described above. The term is used to designate a single molecule, or a collection of molecules. Nucleic acids may be single stranded or double stranded, and may include coding regions and regions of various control elements, as described below.

The term "a polynucleotide having a nucleotide sequence encoding a gene" or "a polynucleotide having a nucleotide sequence encoding a gene" or "a nucleic acid sequence encoding" a specified polypeptide refers to a nucleic acid sequence comprising the coding region of a gene or in other words the nucleic acid sequence which encodes a gene product. The coding region may be present in either a cDNA, genomic DNA or RNA form. When present in a DNA form, the oligonucleotide, polynucleotide, or nucleic acid may be single-stranded (i.e., the sense strand) or double-stranded. Suitable control elements such as enhancers/promoters, splice junctions, polyadenylation signals, etc. may be placed in close proximity to the coding region of the gene if needed to permit proper initiation of transcription and/or correct processing of the primary RNA transcript. Alternatively, the coding region utilized in the expression vectors of the present disclosure may contain endogenous enhancers/promoters, splice junctions, intervening sequences, polyadenylation signals, etc. or a combination of both endogenous and exogenous control elements.

The term "recombinant" when made in reference to a nucleic acid molecule refers to a nucleic acid molecule which is comprised of segments of nucleic acid joined together by means of molecular biological techniques. The term "recombinant" when made in reference to a protein or a polypeptide refers to a protein molecule which is expressed using a recombinant nucleic acid molecule.

The terms "complementary" and "complementarity" refer to polynucleotides (i.e., a sequence of nucleotides) related by the base-pairing rules. For example, for the sequence "A-G-T," is complementary to the sequence "T-C-A." Complementarity may be "partial," in which only some of the nucleic acids' bases are matched according to the base pairing rules. Or, there may be "complete" or "total" complementarity between the nucleic acids. The degree of complementarity between nucleic acid strands has significant effects on the efficiency and strength of hybridization between nucleic acid strands. This is of particular importance in amplification reactions, as well as detection methods which depend upon binding between nucleic acids.

The term "homology" when used in relation to nucleic acids refers to a degree of complementarity. There may be partial homology or complete homology (i.e., identity). "Sequence identity" refers to a measure of relatedness between two or more nucleic acids or proteins, and is given as a percentage with reference to the total comparison length. The identity calculation takes into account those nucleotide or amino acid residues that are identical and in the same relative positions in their respective larger sequences. Calculations of identity may be performed by algorithms contained within computer programs such as "GAP" (Genetics Computer Group, Madison, Wis.) and "ALIGN" (DNAStar, Madison, Wis.). A partially complementary sequence is one that at least partially inhibits (or competes with) a completely complementary sequence from hybridizing to a target nucleic acid is referred to using the functional term "substantially homologous." The inhibition of hybridization of the completely complementary sequence to the target sequence may be examined using a hybridization assay (Southern or Northern blot, solution hybridization and the like) under conditions of low stringency. A substantially homologous sequence or probe will compete for and inhibit the binding (i.e., the hybridization) of a sequence which is completely homologous to a target under conditions of low stringency. This is not to say that conditions of low stringency are such that non-specific binding is permitted; low stringency conditions require that the binding of two sequences to one another be a specific (i.e., selective) interaction. The absence of non-specific binding may be tested by the use of a second target which lacks even a partial degree of complementarity (e.g., less than about 30% identity); in the absence of non-specific binding the probe will not hybridize to the second non-complementary target.

The following terms are used to describe the sequence relationships between two or more polynucleotides: "reference sequence", "sequence identity", "percentage of sequence identity", and "substantial identity". A "reference sequence" is a defined sequence used as a basis for a sequence comparison; a reference sequence may be a subset of a larger sequence, for example, as a segment of a full-length cDNA sequence given in a sequence listing or may comprise a complete gene sequence. Generally, a reference sequence is at least 20 nucleotides in length, frequently at least 25 nucleotides in length, and often at least 50 nucleotides in length. Since two polynucleotides may each (1) comprise a sequence (i.e., a portion of the complete polynucleotide sequence) that is similar between the two polynucleotides, and (2) may further comprise a sequence that is divergent between the two polynucleotides, sequence comparisons between two (or more) polynucleotides are typically performed by comparing sequences of the two polynucleotides over a "comparison window" to identify and compare local regions of sequence similarity. A "comparison window", as used herein, refers to a conceptual segment of at least 20 contiguous nucleotide positions wherein a polynucleotide sequence may be compared to a reference sequence of at least 20 contiguous nucleotides and wherein the portion of the polynucleotide sequence in the comparison window may comprise additions or deletions (i.e., gaps) of 20 percent or less as compared to the reference sequence (which does not comprise additions or deletions) for optimal alignment of the two sequences. Optimal alignment of sequences for aligning a comparison window may be conducted by the local homology algorithm of Smith and Waterman (Smith and Waterman, Adv. Appl. Math. 2:482 (1981)) by the homology alignment algorithm of Needleman and Wunsch (Needleman and Wunsch, J. Mol. Biol. 48:443 (1970)), by the search for similarity method of Pearson and Lipman (Pearson and Lipman, Proc. Natl. Acad. Sci. (U.S.) 85:2444 (1988)), by computerized implementations of these algorithms (GAP, BESTFIT, FASTA, and TFASTA in the Wisconsin Genetics Software Package Release 7.0, Genetics Computer Group, 575 Science Dr., Madison, Wis.), or by inspection, and the best alignment (i.e., resulting in the highest percentage of homology over the comparison window) generated by the various methods is selected. The term "sequence identity" means that two polynucleotide sequences are identical (i.e., on a nucleotide-by-nucleotide basis) over the window of comparison.

In certain embodiments, term "percentage of sequence identity" is calculated by comparing two optimally aligned sequences over the window of comparison, determining the number of positions at which the identical nucleic acid base (e.g., A, T, C, G, U, or I) occurs in both sequences to yield the number of matched positions, dividing the number of matched positions by the total number of positions in the window of comparison (i.e., the window size), and multiplying the result by 100 to yield the percentage of sequence identity.

In certain embodiments, sequence "identity" refers to the number of exactly matching amino acids (expressed as a percentage) in a sequence alignment between two sequences of the alignment calculated using the number of identical positions divided by the greater of the shortest sequence or the number of equivalent positions excluding overhangs wherein internal gaps are counted as an equivalent position. For example, the polypeptides GGGGGG (SEQ ID NO: 35) and GGGGT (SEQ ID NO: 32) have a sequence identity of 4 out of 5 or 80%. For example, the polypeptides GGGPPP (SEQ ID NO: 33) and GGGAPPP (SEQ ID NO: 34) have a sequence identity of 6 out of 7 or 85%. In certain embodiments, any recitation of sequence identity expressed herein may be substituted for sequence similarity. Percent "similarity" is used to quantify the similarity between two sequences of the alignment. This method is identical to determining the identity except that certain amino acids do not have to be identical to have a match. Amino acids are classified as matches if they are among a group with similar properties according to the following amino acid groups: Aromatic—F Y W; hydrophobic—A V I L; Charged positive: R K H; Charged negative—D E; Polar—S T N Q.

The terms "substantial identity" as used herein denotes a characteristic of a polynucleotide sequence, wherein the polynucleotide comprises a sequence that has at least 85 percent sequence identity, preferably at least 90 to 95 percent sequence identity, more usually at least 99 percent sequence identity as compared to a reference sequence over a comparison window of at least 20 nucleotide positions, frequently over a window of at least 25-50 nucleotides, wherein the percentage of sequence identity is calculated by comparing the reference sequence to the polynucleotide sequence which may include deletions or additions which total 20 percent or less of the reference sequence over the window of comparison. The reference sequence may be a subset of a larger sequence, for example, as a segment of the full-length sequences of the compositions claimed in the present disclosure.

When used in reference to a double-stranded nucleic acid sequence such as a cDNA or genomic clone, the term "substantially homologous" refers to any probe that can hybridize to either or both strands of the double-stranded nucleic acid sequence under conditions of low to high stringency as described above.

When used in reference to a single-stranded nucleic acid sequence, the term "substantially homologous" refers to any probe that can hybridize (i.e., it is the complement of) the single-stranded nucleic acid sequence under conditions of low to high stringency as described above.

The terms "in operable combination", "in operable order" and "operably linked" refer to the linkage of nucleic acid sequences in such a manner that a nucleic acid molecule capable of directing the transcription of a given gene and/or the synthesis of a desired protein molecule is produced. The term also refers to the linkage of amino acid sequences in such a manner so that a functional protein is produced.

The term "regulatory element" refers to a genetic element which controls some aspect of the expression of nucleic acid sequences. For example, a promoter is a regulatory element which facilitates the initiation of transcription of an operably linked coding region. Other regulatory elements are splicing signals, polyadenylation signals, termination signals, etc.

Transcriptional control signals in eukaryotes comprise "promoter" and "enhancer" elements. Promoters and enhancers consist of short arrays of DNA sequences that interact specifically with cellular proteins involved in transcription (Maniatis, et al., Science 236:1237, 1987). Promoter and enhancer elements have been isolated from a variety of eukaryotic sources including genes in yeast, insect, mammalian and plant cells. Promoter and enhancer elements have also been isolated from viruses and are found in prokaryotes. The selection of a particular promoter and enhancer depends on the cell type used to express the protein of interest. Some eukaryotic promoters and enhancers have a broad host range while others are functional in a limited subset of cell types (for review, see Voss, et al., Trends Biochem. Sci., 11:287, 1986; and Maniatis, et al., supra 1987).

The terms "promoter element," "promoter," or "promoter sequence" as used herein, refer to a DNA sequence that i.e. functions as a switch, activating the expression of a gene. If the gene is activated, it is said to be transcribed, or participating in transcription. Transcription involves the synthesis of mRNA from the gene. The promoter, therefore, serves as a transcriptional regulatory element and also provides a site for initiation of transcription of the gene into mRNA.

Promoters may be tissue specific or cell specific. The term "tissue specific" as it applies to a promoter refers to a promoter that is capable of directing selective expression of a nucleotide sequence of interest to a specific type of tissue (e.g., seeds) in the relative absence of expression of the same nucleotide sequence of interest in a different type of tissue (e.g., leaves). Tissue specificity of a promoter may be evaluated by, for example, operably linking a reporter gene to the promoter sequence to generate a reporter construct, introducing the reporter construct into the genome of an organism such that the reporter construct is integrated into every tissue of the resulting transgenic organism, and detecting the expression of the reporter gene (e.g., detecting mRNA, protein, or the activity of a protein encoded by the reporter gene) in different tissues of the transgenic organism. The detection of a greater level of expression of the reporter gene in one or more tissues relative to the level of expression of the reporter gene in other tissues shows that the promoter is specific for the tissues in which greater levels of expression are detected. The term "cell type specific" as applied to a promoter refers to a promoter which is capable of directing selective expression of a nucleotide sequence of interest in a specific type of cell in the relative absence of expression of the same nucleotide sequence of interest in a different type of cell within the same tissue. The term "cell type specific" when applied to a promoter also means a promoter capable of promoting selective expression of a nucleotide sequence of interest in a region within a single tissue. Cell type specificity of a promoter may be assessed using methods well known in the art, e.g., immunohistochemical staining. Briefly, tissue sections are embedded in paraffin, and paraffin sections are reacted with a primary antibody which is specific for the polypeptide product encoded by the nucleotide sequence of interest whose expression is controlled by the promoter. A labeled (e.g., peroxidase conjugated) secondary antibody which is specific for the primary antibody is allowed to bind to the sectioned tissue and specific binding detected (e.g., with avidin/biotin) by microscopy Promoters may be constitutive or regulatable. The term "constitutive" when made in reference to a promoter means that the promoter is capable of directing transcription of an operably linked nucleic acid sequence in the absence of a stimulus (e.g., heat shock, chemicals, light, etc.). Typically, constitutive promoters are capable of directing expression of a transgene in substantially any cell and any tissue.

In contrast, a "regulatable" or "inducible" promoter is one which is capable of directing a level of transcription of an operably linked nucleic acid sequence in the presence of a stimulus (e.g., heat shock, chemicals, light, etc.) which is different from the level of transcription of the operably linked nucleic acid sequence in the absence of the stimulus.

The enhancer and/or promoter may be "endogenous" or "exogenous" or "heterologous." An "endogenous" enhancer or promoter is one that is naturally linked with a given gene in the genome. An "exogenous" or "heterologous" enhancer or promoter is one that is placed in juxtaposition to a gene by means of genetic manipulation (i.e., molecular biological techniques) such that transcription of the gene is directed by the linked enhancer or promoter. For example, an endogenous promoter in operable combination with a first gene can be isolated, removed, and placed in operable combination with a second gene, thereby making it a "heterologous promoter" in operable combination with the second gene. A variety of such combinations are contemplated (e.g., the first and second genes can be from the same species, or from different species).

Efficient expression of recombinant DNA sequences in eukaryotic cells typically requires expression of signals directing the efficient termination and polyadenylation of the resulting transcript. Transcription termination signals are generally found downstream of the polyadenylation signal and are a few hundred nucleotides in length. The term "poly(A) site" or "poly(A) sequence" as used herein denotes a DNA sequence which directs both the termination and polyadenylation of the nascent RNA transcript. Efficient polyadenylation of the recombinant transcript is desirable, as transcripts lacking a poly(A) tail are unstable and are rapidly degraded. The poly(A) signal utilized in an expression vector may be "heterologous" or "endogenous." An endogenous poly(A) signal is found naturally at the 3' end of the coding region of a given gene in the genome. A heterologous poly(A) signal is one which has been isolated from one gene and positioned 3' to another gene. A commonly used heterologous poly(A) signal is the SV40 poly(A) signal. The SV40 poly(A) signal is contained on a 237 bp BamHI/BclI restriction fragment and directs both termination and polyadenylation.

The term "vector" refers to nucleic acid molecules that transfer DNA segment(s) from one cell to another. The term "vehicle" is sometimes used interchangeably with "vector."

The terms "expression vector" or "expression cassette" refer to a recombinant nucleic acid containing a desired coding sequence and appropriate nucleic acid sequences used for the expression of the operably linked coding sequence in a particular host organism. Nucleic acid sequences used for expression in prokaryotes typically include a promoter, an operator (optional), and a ribosome binding site, often along with other sequences. Eukaryotic cells are known to utilize promoters, enhancers, and termination and polyadenylation signals.

The term "host cell" refers to any cell capable of replicating and/or transcribing and/or translating a heterologous gene. Thus, a "host cell" refers to any eukaryotic or prokaryotic cell (e.g., bacterial cells such as E. coli, yeast cells, mammalian cells, avian cells, amphibian cells, plant cells, fish cells, and insect cells), whether located in vitro or in vivo. For example, host cells may be located in a transgenic animal.

A "selectable marker" is a nucleic acid introduced into a recombinant vector that encodes a polypeptide that confers a trait suitable for artificial selection or identification (see also, "reporter gene" below), e.g., beta-lactamase confers antibiotic resistance, which allows an organism expressing beta-lactamase to survive in the presence antibiotic in a growth medium. Another example is thymidine kinase, which makes the host sensitive to ganciclovir selection. It may be a screenable marker that allows one to distinguish between wanted and unwanted cells based on the presence or absence of an expected color. For example, the lac-z-gene produces a beta-galactosidase enzyme which confers a blue color in the presence of X-gal (5-bromo-4-chloro-3-indolyl-β-D-galactoside). If recombinant insertion inactivates the lac-z-gene, then the resulting colonies are colorless. There may be one or more selectable markers, e.g., an enzyme that can complement to the inability of an expression organism to synthesize a particular compound required for its growth (auxotrophic) and one able to convert a compound to another that is toxic for growth. URA3, an orotidine-5' phosphate decarboxylase, is necessary for uracil biosynthesis and can complement ura3 mutants that are auxotrophic for uracil. URA3 also converts 5-fluoroorotic acid into the toxic compound 5-fluorouracil. Additional contemplated selectable markers include any genes that impart antibacterial resistance or express a fluorescent protein. Examples include, but are not limited to, the following genes: ampr, camr, tetr, blasticidinr, neor, hygr, abxr, neomycin phosphotransferase type II gene (nptII), p-glucuronidase (gus), green fluorescent protein (gfp), egfp, yfp, mCherry, p-galactosidase (lacZ), lacZa, lacZAM15, chloramphenicol acetyltransferase (cat), alkaline phosphatase (phoA), bacterial luciferase (luxAB), bialaphos resistance gene (bar), phosphomannose isomerase (pmi), xylose isomerase (xylA), arabitol dehydrogenase (atlD), UDP-glucose: galactose-1-phosphate uridyltransferasel (galT), feedback-insensitive a subunit of anthranilate synthase (OASAID), 2-deoxyglucose (2-DOGR), benzyladenine-N-3-glucuronide, E. coli threonine deaminase, glutamate 1-semialdehyde aminotransferase (GSA-AT), D-amino acidoxidase (DAAO), salt-tolerance gene (rstB), ferredoxin-like protein (pflp), trehalose-6-P synthase gene (AtTPS1), lysine racemase (lyr), dihydrodipicolinate synthase (dapA), tryptophan synthase beta 1 (AtTSB1), dehalogenase (dhlA), mannose-6-phosphate reductase gene (M6PR), hygromycin phosphotransferase (HPT), and D-serine ammonialyase (dsdA).

A "label" refers to a detectable compound or composition that is conjugated directly or indirectly to another molecule, such as an antibody or a protein, to facilitate detection of that molecule. Specific, non-limiting examples of labels include fluorescent tags, enzymatic linkages, and radioactive isotopes. In one example, a "label receptor" refers to incorporation of a heterologous polypeptide in the receptor. A label includes the incorporation of a radiolabeled amino acid or the covalent attachment of biotinyl moieties to a polypeptide that can be detected by marked avidin (for example, streptavidin containing a fluorescent marker or enzymatic activity that can be detected by optical or colorimetric methods). Various methods of labeling polypeptides and glycoproteins are known in the art and may be used. Examples of labels for polypeptides include, but are not limited to, the following: radioisotopes or radionucleotides (such as $^{35}S$ or $^{131}I$) fluorescent labels (such as fluorescein isothiocyanate (FITC), rhodamine, lanthanide phosphors), enzymatic labels (such as horseradish peroxidase, beta-galactosidase, luciferase, alkaline phosphatase), chemiluminescent markers, biotinyl groups, predetermined polypeptide epitopes recognized by a secondary reporter (such as a leucine zipper pair sequences, binding sites for secondary antibodies, metal binding domains, epitope tags), or magnetic agents, such as gadolinium chelates. In some embodiments, labels are attached by spacer arms of various lengths to reduce potential steric hindrance.

In certain embodiments, the disclosure relates to recombinant polypeptides comprising sequences disclosed herein or variants or fusions thereof wherein the amino terminal end or the carbon terminal end of the amino acid sequence are optionally attached to a heterologous amino acid sequence, label, or reporter molecule.

In certain embodiments, the disclosure relates to the recombinant vectors comprising a nucleic acid encoding a polypeptide disclosed herein or fusion protein thereof.

In certain embodiments, the recombinant vector optionally comprises a mammalian, human, insect, viral, bacterial, bacterial plasmid, yeast associated origin of replication or gene such as a gene or retroviral gene or lentiviral LTR, TAR, RRE, PE, SLIP, CRS, and INS nucleotide segment or gene selected from tat, rev, nef, vif, vpr, vpu, and vpx or structural genes selected from gag, pol, and env.

In certain embodiments, the recombinant vector optionally comprises a gene vector element (nucleic acid) such as a selectable marker region, lac operon, a CMV promoter, a hybrid chicken β-actin/CMV enhancer (CAG) promoter, tac promoter, T7 RNA polymerase promoter, SP6 RNA polymerase promoter, SV40 promoter, internal ribosome entry site (IRES) sequence, cis-acting woodchuck post regulatory element (WPRE), scaffold-attachment region (SAR), inverted terminal repeats (ITR), FLAG tag coding region, c-myc tag coding region, metal affinity tag coding region, streptavidin binding peptide tag coding region, polyHis tag coding region, HA tag coding region, MBP tag coding region, GST tag coding region, polyadenylation coding region, SV40 polyadenylation signal, SV40 origin of replication, Col E1 origin of replication, f1 origin, pBR322 origin, or pUC origin, TEV protease recognition site, loxP site, Cre recombinase coding region, or a multiple cloning site such as having 5, 6, or 7 or more restriction sites within a continuous segment of less than 50 or 60 nucleotides or having 3 or 4 or more restriction sites with a continuous segment of less than 20 or 30 nucleotides.

The term "reporter gene" refers to a gene encoding a protein that may be assayed. Examples of reporter genes include, but are not limited to, modified katushka, mkate and mkate2 (See, e.g., Merzlyak et al., Nat. Methods, 2007, 4, 555-557 and Shcherbo et al., Biochem. J., 2008, 418, 567-574), luciferase (See, e.g., deWet et al., Mol. Cell. Biol. 7:725 (1987) and U.S. Pat. Nos. 6,074,859; 5,976,796; 5,674,713; and 5,618,682; all of which are incorporated herein by reference), green fluorescent protein (e.g., GenBank Accession Number U43284; a number of GFP variants are commercially available from ClonTech Laboratories, Palo Alto, Calif.), chloramphenicol acetyltransferase, beta-galactosidase, alkaline phosphatase, and horse radish peroxidase.

The term "wild-type" when made in reference to a gene refers to a gene which has the characteristics of a gene isolated from a naturally occurring source. The term "wild-type" when made in reference to a gene product refers to a gene product which has the characteristics of a gene product isolated from a naturally occurring source. The term "naturally-occurring" as used herein as applied to an object refers to the fact that an object can be found in nature. For example, a polypeptide or polynucleotide sequence that is present in an organism (including viruses) that can be isolated from a source in nature and which has not been intentionally modified by man in the laboratory is naturally-occurring. A wild-type gene is that which is most frequently observed in a population and is thus arbitrarily designated the "normal" or "wild-type" form of the gene. In contrast, the term "modified" or "mutant" when made in reference to a gene or to a gene product refers, respectively, to a gene or to a gene product which displays modifications in sequence and/or functional properties (i.e., altered characteristics) when compared to the wild-type gene or gene product. It is noted that naturally-occurring mutants can be isolated; these are identified by the fact that they have altered characteristics when compared to the wild-type gene or gene product.

The term "antisense" or "antigenome" refers to a nucleotide sequence whose sequence of nucleotide residues is in reverse 5' to 3' orientation in relation to the sequence of nucleotide residues in a sense strand. A "sense strand" of a DNA duplex refers to a strand in a DNA duplex which is transcribed by a cell in its natural state into a "sense mRNA." Thus an "antisense" sequence is a sequence having the same sequence as the non-coding strand in a DNA duplex.

The term "isolated" refers to a biological material, such as a virus, a nucleic acid or a protein, which is substantially free from components that normally accompany or interact with it in its naturally occurring environment. The isolated material optionally comprises material not found with the material in its natural environment, e.g., a cell. For example, if the material is in its natural environment, such as a cell, the material has been placed at a location in the cell (e.g., genome or genetic element) not native to a material found in that environment. For example, a naturally occurring nucleic acid (e.g., a coding sequence, a promoter, an enhancer, etc.) becomes isolated if it is introduced by non-naturally occurring means to a locus of the genome (e.g., a vector, such as a plasmid or virus vector, or amplicon) not native to that nucleic acid. Such nucleic acids are also referred to as "heterologous" nucleic acids. An isolated virus, for example, is in an environment (e.g., a cell culture system, or purified from cell culture) other than the native environment of wild-type virus (e.g., the nasopharynx of an infected individual).

An "immunologically effective amount" of a virus or attenuated virus is an amount sufficient to enhance an individual's (e.g., a human's) own immune response against a subsequent exposure to the agent. Levels of induced immunity can be monitored, e.g., by measuring amounts of neutralizing secretory and/or serum antibodies, e.g., by plaque neutralization, complement fixation, enzyme-linked immunosorbent, or microneutralization assay.

A "protective immune response" against a virus refers to an immune response exhibited by an individual (e.g., a human) that is protective against serious lower respiratory tract disease (e.g., pneumonia and/or bronchiolitis) when the individual is subsequently exposed to and/or infected with wild-type virus.

Chimeric RSV-hMPV

Naturally occurring RSV particles typically contain a viral genome within a helical nucleocapsid which is surrounded by matrix proteins and an envelope containing glycoproteins. The genome of human wild-type RSV encodes the proteins, NS1, NS2, N, P, M, SH, G, F, M2-1, M2-2, and L. G, F, and SH are glycoproteins. RSV polymerase activity consists of the large protein (L) and phosphoprotein (P). The viral M2-1 protein is used during transcription and is likely to be a component of the transcriptase complex. The viral N protein is used to encapsidate the nascent RNA during replication.

The genome is transcribed and replicated in the cytoplasm of a host cell. Host-cell transcription typically results in synthesis of ten methylated and polyadenylated mRNAs. The antigenome is positive-sense RNA complement of the genome produced during replication, which in turn acts as a template for genome synthesis. The viral genes are flanked by conserved gene-start (GS) and gene-end (GE) sequences.

At the 3' and 5' ends of the genome are leader and trailer nucleotides. The wild type leader sequence contains a promoter at the 3' end. When the viral polymerase reaches a GE signal, the polymerase polyadenylates and releases the mRNA and reinitiates RNA synthesis at the next GS signal. The L-P complex is believed to be responsible for recognition of the promoter, RNA synthesis, capping and methylation of the 5' termini of the mRNAs and polyadenylation of their 3' ends. It is believed that the polymerase sometimes dissociates from the gene at the junctions. Because the polymerase initiates transcription at the 3' end of the genome, this results in a gradient of expression, with the genes at the 3' end of the genome being transcribed more frequently than those at the 5' end.

To replicate the genome, the polymerase does not respond to the cis-acting GE and GS signals and generates positive-sense RNA complement of the genome, the antigenome. At the 3' end of the antigenome is the complement of the trailer, which contains a promoter. The polymerase uses this promoter to generate genome-sense RNA. Unlike mRNA, which is released as naked RNA, the antigenome and genome RNAs are encapsidated with virus nucleoprotein (N) as they are synthesized.

After translation of viral mRNAs, a full-length (+) antigenomic RNA is produced as a template for replication of the (−) RNA genome. Infectious recombinant RSV (rRSV) particles may be recovered from transfected plasmids. Co-expression of RSV N, P, L, and M2-1 proteins as well as the full-length antigenomic RNA is sufficient for RSV replication. See Collins et al., Proc Natl Acad Sci USA., 1995, 92 (25): 11563-11567 and U.S. Pat. No. 6,790,449.

In certain embodiments, the disclosure relates to certain desirable sequences of chimeric F polypeptides and recombinant nucleic acids encoding the same. In certain embodiments, the disclosure contemplates recombinant vectors comprising nucleic acids encoding these polypeptides and cells comprising said vectors. In certain embodiments, the vector comprises a selectable marker or reporter gene.

In certain embodiments, the disclosure relates to a chimeric F protein comprising an hMPV F protein ectodomain and an RSV F protein cytoplasmic tail. The chimeric RSV and hMPV F protein can also include an RSV F protein transmembrane domain, wherein the chimeric RSV and hMPV F protein comprises, in an N- to C-terminal direction, the hMPV F protein ectodomain, the RSV F protein transmembrane domain, and the RSV F protein cytoplasmic tail.

The location and structure of the hMPV F protein ectodomain is known in the art (see, e.g.,) and can include the sequence MSWKVVIIFSLLITPQHGLKESYLEESCSTIT-EGYLSVLRTGWYTNVFTLEVGDVENLTC ADGPS-LIKTELELTKSALRELKTVSADQLAREEQIEN-PRRRRFVLGAIALGVATAAAVTA GVAIAKTIRLESEVTAIKNALKKTNEAVSTLGNGVRV-LATAVRELKDFVSKNLTRAINK NKCDIDDLK-MAVSFSQFNRRFLNVVRQFSDNAGITPAISLDLMT-DAELARAVSNMPTSA GQIKLMLENRAMVRRKGF-GILIGVYGSSVIYMVQLPIFGVIDTPCWIVKAAP-SCSKKKGN YACLLREDQGWYCQNAGSTVYYP-NEKDCETRGDHVFCDTAAGINVAEQSKECNINIST TNYPCKVSTGRHPISMVALSPLGALVACYKGVSCSIG-SNRVGIIKQLNKGCSYITNQDAD TVTIDNTVYQL-SKVEGEQHVIKGRPVSSSFDPVKFPEDQFN-VALDQVFENIENSQALVDQ SNRILSSAEKGNT (SEQ ID NO: 8), MSWKVMIIISLLITPQHGLKESYLEESC-STITEGYLSVLRTGWYTNVFTLEVGDVENLTCT DGPSLIKTELDLTKSALRELKTVSADQLAREEQIEN- PRQSRFVLGAIALGVATAAAVTAG IAIAKTIRLE-
SEVNAIKGALKKTNEAVSTLGNGVRVLATA-
VRELKEFVSKNLTSAINKNK
CDIADLKMAVSFSQFNRRFLNVVRQFSDNAGITPAIS-
LDLMTDAELARAVSYMPTSAGQ IKLMLEN-
RAMVRRKGF-
GILIGVYGSSVIYMVQLPIFGVIDTPCWIIKAAP-
SCSEKDGNYA CLLREDQGWYCKNAGSTVYYP-
NEKDCETRGDHVFCDTAAGINVAEQSRECNINISTTN
YPCKVSTGRHPISMVALSPLGALVACYKGVSCSIG-
SNRVGIIKQLPKGCSYITNQDADTV TIDNTVYQL-
SKVEGEQHVIKGRPVSSSFDPIRFPEDQFN-
VALDQVFESIENSQALVDQSNK ILNSAEKGNT (SEQ ID NO: 9) or a portion thereof (e.g., a fragment thereof comprising at least about 200 amino acids, at least about 300 amino acids, or at least about 400 amino acids, or a sequence comprising at least about 80%, at least about 85%, at least about 90%, at least about 95% at least about 99% sequence identity thereto). In certain embodiments, the hMPV F protein ectodomain is truncated by about 1-100 amino acids, by about 1-90 amino acids, by about 1-80 amino acids, by about 1-70 amino acids, by about 1-60 amino acids, or by about 1-50 amino acids, for example, by about 1, about 2, about 3, about 4, about 5 about 6, about 7, about 8, about 9, or about 10 amino acids.

Figure 3:
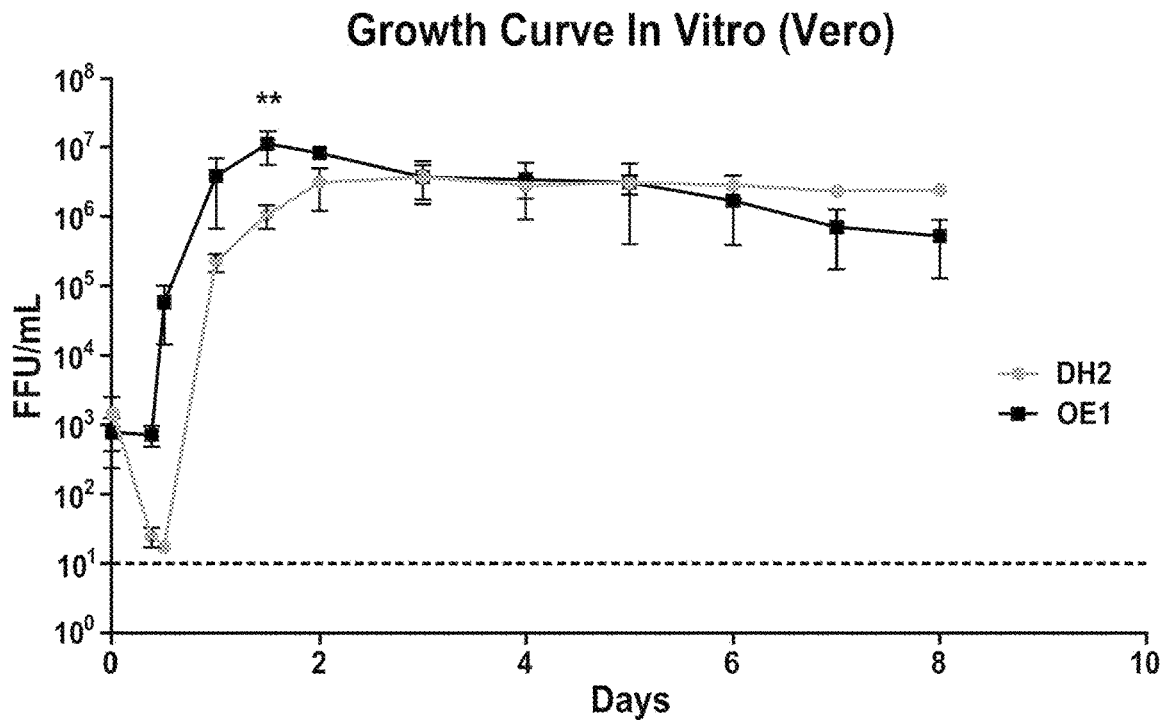
FIG. 3 shows in vitro growth curve of hMPV in Vero cells. Growth kinetics were conducted using Vero cells. Cells were infected at MOI 0.1 in duplicates for each time point. Samples were titered on Vero cells by fluorescent focus unit (FFU) assay.

The location and structure of the RSV transmembrane domain (TM) is known in the art (see, e.g., Collins et al. (1984) PNAS 81:7683-7687 at FIG. 3) and can include the sequence IMITTIIIVIIVILLSLIAVGLLL (SEQ ID NO: 10), IMITTIIIVIIVILLSLIAVGLLLYC (SEQ ID NO: 11), IMITAIIIVIIVVLLSLIAIGLLLYC (SEQ ID NO: 12), or IMITAIIIVIIVVLLSLIAIGLLL (SEQ ID NO: 13) or a portion of any of the foregoing (e.g., a fragment of any of the foregoing comprising at least about 15 amino acids, at least about 20 amino acids, at least about 21 amino acids, at least about 22 amino acids, at least about 23 amino acids, at least about 24 amino acids or at least about 25 amino acids, or a sequence comprising at least about 80%, at least about 85%, at least about 90%, at least about 95% at least about 99% sequence identity thereto). In certain embodiments, the RSV TM domain is truncated by about 1-15 amino acids, by about 1-10 amino acids, by about 1-5 amino acids, by about 1-3 amino acids, by about 5-15 amino acids, or by about 5-10 amino acids, for example, by about 1, about 2, about 3, about 4, about 5 about 6, about 7, about 8, about 9, or about 10 amino acids.

The location and structure of the RSV cytoplasmic tail (CT) domain is known in the art (see, e.g., Baviskar et al. (2013) J Virol 87 (19): 10730-10741) and can include the sequence YCKARSTPVTLSKDQLSGINNIAFSN (SEQ ID NO: 14), KARSTPVTLSKDQLSGINNIAFSN (SEQ ID NO: 15), YCKAKNTPVTLSKDQLSGINNIAFSK (SEQ ID NO: 16), KAKNTPVTLSKDQLSGINNIAFSK (SEQ ID NO: 17), or a portion of any of the foregoing (e.g., a fragment of any of the foregoing comprising at least about 15 amino acids, at least about 20 amino acids, at least about 21 amino acids, at least about 22 amino acids, or at least about 23 amino acids or a sequence comprising at least about 80%, at least about 85%, at least about 90%, at least about 95% at least about 99% sequence identity thereto). In certain embodiments, the RSV CT domain is truncated by about 1-15 amino acids, by about 1-10 amino acids, by about 1-5 amino acids, by about 1-3 amino acids, by about 5-15 amino acids, or by about 5-10 amino acids, for example, by about 1, about 2, about 3, about 4, about 5 about 6, about 7, about 8, about 9, or about 10 amino acids.

In certain embodiments, the disclosure provides a chimeric RSV-hMPV F protein, comprising an N-terminal portion of an hMPV F protein and a C-terminal portion of an RSV F protein. In certain embodiments, the N-terminal portion of the hMPV-RSV chimeric F protein comprises from about 400 to about 540 amino acids of the N-terminal portion of an hMPV F protein, from about 425 to about 525 amino acids of the N-terminal portion of an hMPV F protein, from about 450 to about 500 amino acids of the N-terminal portion of an hMPV F protein, or from about 470 to about 490 amino acids of the N-terminal portion of an hMPV F protein. In certain embodiments, the C-terminal portion of the hMPV-RSV chimeric F protein comprises from about 10 to about 100 amino acids of the C-terminal portion of an RSV F protein, from about 25 to about 75 amino acids of the C-terminal portion of an RSV F protein, from about 40 to about 60 amino acids of the C-terminal portion, or about 50 amino acids of the C-terminal portion of an RSV F protein.

hMPV F protein sequences suitable for use in the chimeric RSV-hMPV F protein include the F protein of the TN/94-49 (subgroup A2; GenBank Accession No. AEK26895.1) strain, the TN/96-12 (subgroup A1 GenBank Accession No AEK26886.1) strain, TN/98-242 (subgroup B1, GenBank Accession No AEK26906.1), and TN/89-515 (subgroup B2, GenBank Accession No. ACJ53612.1), as described in Williams et al. (2006) J Infect Dis. 193 (3): 387-395. Other hMPV F protein sequences suitable for use in the chimeric RSV-hMPV F protein include ACJ53565.1, AHV79858.1, BBB35088.1, AHV79473.1, AAS22125.1, AUF72445.1, and ACJ53575.1 RSV F protein sequences suitable for use in the chimeric RSV-hMPV F protein include the F protein from strains A2-line19F and A2-line19F (1557V) as described in Hotard et al. J Virol 89, 512-522 (2015); Meng et al. Journal of Virology 90, 245-253 (2015); and Hotard et al. Virology, 434, 129-136 (2012) and a consensus sequence of Buenos Aires (subgroup B) F protein as described in Rostad et al. J Virol 92 (6): e01568-17 (2018). Other RSV F protein sequences suitable for use in the chimeric RSV-hMPV F protein include AUC68149.1, AHW81430.1, AIZ95893.1, AHW81440.1, and AJZ70067.1.

In certain embodiments, the portions of the hMPV and RSV sequences used in the chimeric RSV-hMPV F protein comprise about 70% or more, about 75% or more, about 80% or more, about 85% or more, about 90% or more, about 95% or more or about 99% or more sequence identity to a corresponding portion of the wild-type protein.

In certain embodiments, the chimeric RSV-hMPV F protein comprises SEQ ID NO: 1, or a protein comprising about 80% or more, about 85% or more, about 90% or more, about 95% or more, about 96% or more, about 97% or more, about 98% or more, or about 99% or more sequence identity to SEQ ID NO:1.

In certain embodiments, the chimeric RSV-hMPV F protein comprises a RQSR (SEQ ID NO: 18) to RRRR (SEQ ID NO: 19) mutation to introduce a trypsin-independent cleavage site. This mutation promotes trypsin independent growth in the virus. Methods for introducing this mutation are known in the art. See, Zhang et al. (2012) J Virol Methods 185 (1).

Common vectors for storing RSV include plasmids and bacterial artificial chromosomes (BAC). Typically, a bacterial artificial chromosome comprises one or more genes selected from the group consisting of oriS, repE, parA, and parB genes of Factor F in operable combination with a selectable marker, e.g., a gene that provides resistance to an antibiotic. The nucleic acid sequence may be the genomic or antigenomic sequence of the virus that is optionally mutated, e.g., an RSV strain that is optionally mutated.

Cultivating RSV in *E. coli* bacteria may be accomplished by utilizing a bacterial artificial chromosome (BAC). A BAC vector for storing and genetically engineering RSV is reported in Stobart et al., Methods Mol Biol., 2016, 1442: 141-53 and U.S. Patent Application Publication number 2012/0264217. The disclosed BAC contains the complete antigenomic sequence of respiratory syncytial virus (RSV) strain A2 except the F gene, which is the antigenomic sequence of RSV strain line 19.

Along with helper plasmids, it can be used in the reverse genetics system for the recovery of infectious virus. The antigenome sequence on the plasmid can be mutated prior to virus recovery to generate viruses with desired mutations.

In certain embodiments, the disclosure relates to methods of generating RSV-hMPV particles comprising inserting a vector with a BAC gene and a RSV-hMPV antigenome into an isolated eukaryotic cell and inserting one or more vectors selected from the group consisting of: a vector encoding an N protein of RSV, a vector encoding a P protein of RSV, a vector encoding an L protein of RSV, and a vector encoding an M2-1 protein of RSV into the cell under conditions such that RSV virion is formed. Inserting a vector into a cell may occur by physically injecting, electroporating, or mixing the cell and the vector under conditions such that the vector enters the cell.

Chimeric RSV-hMPV is contemplated to include certain mutations, deletions, or variant combinations, such as cold-passaged (cp) non-temperature sensitive (ts) derivatives of RSV, cpRSV, such as rA2cp248/404/1030ΔSH, rA2cp248/404ΔSH contains 4 independent attenuating genetic elements: cp which is based on missense mutations in the N and L proteins that together confer the non-ts attenuation phenotype of cpRSV; ts248, a missense mutation in the L protein; ts404, a nucleotide substitution in the gene-start transcription signal of the M2 gene; and ΔSH, complete deletion of the SH gene, rA2cp248/404/1030ΔSH contains independent attenuating genetic elements: those present in rA2cp248/404ΔSH and ts1030, another missense mutation in the L protein. See Karron et al., J Infect Dis., 2005, 191 (7): 1093-1104, hereby incorporated by reference. Within certain embodiments, it is contemplated that the RSV-hMPV antigenome may contain deletions or mutations in nonessential genes (e.g., the SH, NS1, NS2, and M2-2 genes) or combinations thereof.

Due to the redundancy of the genetic code, individual amino acids are encoded by multiple sequences of codons, sometimes referred to as synonymous codons. In different species, synonymous codons are used more or less frequently, sometimes referred to as codon bias. Genetic engineering of under-represented synonymous codons into the coding sequence of a gene has been shown to result in decreased rates of protein translation without a change in the amino acid sequence of the protein. Mueller et al. report virus attenuation by changes in codon bias. See, Science, 2008, 320:1784. See also WO/2008121992, WO/2006042156, Burns et al., J Virology, 2006, 80 (7): 3259 and Mueller et al., J Virology, 2006, 80 (19): 9687.

Usage of codon deoptimization in RSV is reported in Meng, et al., M Bio 5, e01704-01714 (2014) and U.S. Patent Application Publication number 2016/0030549. In certain embodiments, this disclosure relates to isolated nucleic acids, recombinant RSV-hMPV with codon deoptimization, vaccines produced therefrom, and vaccination methods related thereto. In certain embodiments, the codon deoptimization is in the nonstructural genes NS1 and NS2 and optionally in a gene L. In further embodiments, the gene SH is deleted. In certain embodiments, the codon deoptimization is in the chimeric hMPV and RSV F protein having SEQ ID NO: 1 or variants thereof encoded sequences.

In certain embodiments, the disclosure relates to isolated nucleic acids encoding deoptimized genes NS1 and/or NS2 optionally the gene L of a wild-type human RSV or variants thereof wherein the nucleotides are substituted such that a codon to produce Gly is GGT, a codon to produce Asp is GAT, a codon to produce Glu is GAA, a codon to produce His is CAT, a codon to produce Ile is ATA, a codon to produce Lys is AAA, a codon to produce Leu is CTA, a codon to produce Asn is AAT, a codon to produce Gln is CAA, a codon to produce Val is GTA, or a codon to produce Tyr is TAT, or combinations thereof. In certain embodiments, a gene in the isolated nucleic acid further comprises a combination of at least two, three, four, five, six, seven, eight nine, ten, or all of the individual codons. In certain embodiment, a gene in the isolated nucleic acid comprises at least 20, 30, 40, or 50 or more of the codons.

In certain embodiments, the disclosure relates to isolated nucleic acids encoding deoptimized genes NS1 and/or NS2 optionally the gene L of a wild-type human RSV or variants thereof wherein the nucleotides are substituted such that a codon to produce Ala is GCG, a codon to produce Cys is TGT, a codon to produce Phe is TTT, a codon to produce Pro is CCG, a codon to produce Arg is CGT, a codon to produce Ser is TCG, or a codon to produce Thr is ACG, or combinations thereof. In certain embodiments, a gene containing the nucleic acid comprises a combination of at least two, three, four, five, six, seven, eight nine, ten, eleven, twelve, thirteen, fourteen, fifteen, sixteen, or all of the individual codons. In certain embodiments, a gene in the isolated nucleic acid further comprises at least 20, 30, 40, or 50 or more of the codons.

In certain embodiments, the disclosure relates to isolated nucleic acids encoding deoptimized genes for a chimeric hMPV and RSV F protein, e.g., a chimeric hMPV and RSV F protein comprising SEQ ID NO: 1 or variants thereof, wherein the nucleotides are substituted such that a codon to produce Gly is GGT, a codon to produce Asp is GAT, a codon to produce Glu is GAA, a codon to produce His is CAT, a codon to produce Ile is ATA, a codon to produce Lys is AAA, a codon to produce Leu is CTA, a codon to produce Asn is AAT, a codon to produce Gln is CAA, a codon to produce Val is GTA, or a codon to produce Tyr is TAT, or combinations thereof. In certain embodiments, a gene in the isolated nucleic acid further comprises a combination of at least two, three, four, five, six, seven, eight nine, ten, or all of the individual codons. In certain embodiment, a gene in the isolated nucleic acid comprises at least 20, 30, 40, or 50 or more of the codons.

Glenn et al. report a randomized, blinded, controlled, dose-ranging study of a respiratory syncytial virus recombinant fusion (F) nanoparticle vaccine in healthy women of childbearing age. J Infect Dis. 2016, 213 (3): 411-22. In certain embodiments, this disclosure relates to virus particles and virus-like particles (VLPs) that contain a chimeric hMPV and RSV F protein, e.g., a chimeric hMPV and RSV F protein comprising SEQ ID NO: 1 or variants thereof, as RSV core structural proteins reported herein. Virus particles are commonly used as an inactivated vaccine (or killed vaccine). RSV can be grown in culture and then killed using a method such as heat or formaldehyde. Live attenuated vaccines are typically weakened such that rate of replication and/or infection is slower.

In certain embodiments, the disclosure contemplates a chimeric RSV-hMPV particle as a whole virus vaccine, e.g., the entire virus particle exposed to heat, chemicals, or radiation such that the genome of the RSV-hMPV is non-replicative or non-infectious. In certain embodiments, the disclosure contemplates a chimeric RSV-hMPV particle in a split virus vaccine produced by using a detergent to disrupt the virus and by purifying out the chimeric F proteins disclosed herein as antigens to stimulate the immune system to mount a response to the virus.

VLPs closely resemble mature virions, but they do not contain viral genomic material (i.e., viral genomic RNA). Therefore, VLPs are non-replicative in nature. In addition, VLPs can express proteins on the surface of the VLP. Moreover, since VLPs resemble intact virions and are multivalent particulate structures, VLPs can be effective in inducing neutralizing antibodies to the surface protein. VLPs can be administered repeatedly.

In certain embodiments, the disclosure contemplates VLP comprising a chimeric F protein disclosed herein on the surface and an influenza virus matrix (M1) protein core. Quan et al. report methods of producing virus-like particles (VLPs) made-up of an influenza virus matrix (M1) protein core and RSV-F on the surface. J Infect Dis. 2011, 204 (7): 987-995. One can generate recombinant baculovirus (rBVs) expressing RSV F and influenza M1 and transfect them into insect cells for production.

Methods of Use

In certain embodiments, the disclosure relates to immunogenic compositions comprising an immunologically effective amount of a chimeric RSV-hMPV, RSV and/or hMPV polypeptide, RSV-hMPV particle, RSV-hMPV virus-like particle, and/or nucleic acid disclosed herein. In certain embodiments, the disclosure relates to methods for stimulating the immune system of an individual to produce a protective immune response against hMPV and/or RSV. In certain embodiments, an immunologically effective amount of a chimeric RSV-hMPV, polypeptide, and/or nucleic acid disclosed herein is administered to the individual in a physiologically acceptable carrier.

In certain embodiments, the disclosure relates to medicaments and vaccine products comprising nucleic acids disclosed herein for uses disclosed herein.

In certain embodiments, the disclosure relates to the use of nucleic acids or vectors disclosed herein for the manufacture of a medicament and vaccine products for uses disclosed herein.

The disclosure also provides the ability to analyze other types of attenuating mutations and to incorporate them into chimeric RSV-hMPV for vaccine or other uses. For example, a tissue culture-adapted nonpathogenic strain of pneumonia virus of mice (the murine counterpart of RSV) lacks a cytoplasmic tail of the G protein (Randhawa et al., Virology 207:240-245 (1995)). By analogy, the cytoplasmic and transmembrane domains of each of the glycoproteins, HN, G and SH, can be deleted or modified to achieve attenuation.

Other mutations for use in infectious RSV-hMPV of the present disclosure include mutations in cis-acting signals identified during mutational analysis of RSV-hMPV minigenomes. For example, insertional and deletional analysis of the leader and trailer and flanking sequences identified viral promoters and transcription signals and provided a series of mutations associated with varying degrees of reduction of RNA replication or transcription. Saturation mutagenesis (whereby each position in turn is modified to each of the nucleotide alternatives) of these cis-acting signals also has identified many mutations which reduced (or in one case increased) RNA replication or transcription. Any of these mutations can be inserted into the complete antigenome or genome as described herein. Other mutations involve replacement of the 3' end of genome with its counterpart from antigenome, which is associated with changes in RNA replication and transcription. In addition, the intergenic regions (Collins et al., Proc. Natl. Acad. Sci. USA 83:4594-4598 (1986), incorporated herein by reference) can be shortened or lengthened or changed in sequence content, and the naturally-occurring gene overlap (Collins et al., Proc. Natl. Acad. Sci. USA 84:5134-5138 (1987), incorporated herein by reference) can be removed or changed to a different intergenic region by the methods described herein.

For vaccine use, virus produced according to the present disclosure can be used directly in vaccine formulations, or lyophilized, as desired, using lyophilization protocols well known to the artisan. Lyophilized virus will typically be maintained at about 4 degrees C. When ready for use the lyophilized virus is reconstituted in a stabilizing solution, e.g., saline or comprising SPG, Mg, and HEPES, with or without adjuvant.

Typically, the RSV-hMPV vaccines of the disclosure contain as an active ingredient an immunogenetically effective amount of chimeric virus produced as described herein. The modified virus may be introduced into a subject with a physiologically acceptable carrier and/or adjuvant. Useful carriers are well known in the art, and include, e.g., water, buffered water, 0.4% saline, 0.3% glycine, hyaluronic acid and the like. The resulting aqueous solutions may be packaged for use as is, or lyophilized, the lyophilized preparation being combined with a sterile solution prior to administration, as mentioned above. The compositions may contain pharmaceutically acceptable auxiliary substances as required to approximate physiological conditions, such as pH adjusting and buffering agents, tonicity adjusting agents, wetting agents and the like, for example, sodium acetate, sodium lactate, sodium chloride, potassium chloride, calcium chloride, sorbitan monolaurate, triethanolamine oleate, and the like. Acceptable adjuvants include incomplete Freund's adjuvant, aluminum phosphate, aluminum hydroxide, or alum, which are materials well known in the art.

Upon immunization with a chimeric RSV-hMPV composition as described herein, via aerosol, droplet, oral, topical or other route, the immune system of the subject responds to the vaccine by producing antibodies specific for virus proteins, e.g., F glycoproteins. As a result of the vaccination, the subject becomes at least partially or completely immune to hMPV and/or RSV infection, or resistant to developing moderate or severe hMPV and/or RSV infection, particularly of the lower respiratory tract.

The subject to which the vaccines are administered can be any mammal which is susceptible to infection by hMPV and/or RSV or a closely related virus and which subject is capable of generating a protective immune response to the antigens of the vaccinating strain. Thus, suitable subjects include humans, non-human primates, bovine, equine, swine, ovine, caprine, lagamorph, rodents, etc. Accordingly, the disclosure provides methods for creating vaccines for a variety of human and veterinary uses.

The vaccine compositions containing the RSV-hMPV of the disclosure are administered to a subject susceptible to or otherwise at risk of hMPV and or RSV infection to enhance the subject's own immune response capabilities. Such an amount is defined to be an "immunogenically effective dose." In this use, the precise amounts again depend on the subject's state of health and weight, the mode of administration, the nature of the formulation. The vaccine formulations should provide a quantity of chimeric RSV-hMPV of the disclosure sufficient to effectively protect the subject patient against serious or life-threatening infection.

The chimeric RSV-hMPV produced in accordance with the present disclosure can be combined with viruses of the other subgroup or strains to achieve protection against multiple RSV-hMPV subgroups or strains, or protective epitopes of these strains can be engineered into one virus as described herein. Typically, the different viruses will be in admixture and administered simultaneously, but may also be administered separately. For example, as the F glycoproteins of the two hMPV subgroups differ in amino acid sequence, this similarity is the basis for a cross-protective immune response as observed in animals immunized with chimeric RSV-hMPV or F antigen and challenged with a heterologous strain. Thus, immunization with one strain may protect against different strains of the same or different subgroup.

In some instances, it may be desirable to combine the chimeric RSV-hMPV vaccines of the disclosure with vaccines that induce protective responses to other agents, particularly other childhood viruses. For example, the chimeric RSV-hMPV vaccine of the present disclosure can be administered simultaneously with an RSV vaccine.

Single or multiple administrations of the vaccine compositions of the disclosure can be carried out. In neonates and infants, multiple, sequential administrations may be required to elicit sufficient levels of immunity. Administration may begin within the first month of life, or before, about two months of age, typically not later than six months of age, and at intervals throughout childhood, such as at two months, six months, one year and two years, as necessary to maintain sufficient levels of protection against native (wild-type) infection. Similarly, adults who are particularly susceptible to repeated or serious RSV/hMPV infection, such as, for example, health care workers, day care workers, family members of young children, the elderly (over 55, 60, or 65 years), or individuals with compromised cardiopulmonary function may require multiple immunizations to establish and/or maintain protective immune responses. Levels of induced immunity can be monitored by measuring amounts of neutralizing secretory and serum antibodies, and dosages adjusted or vaccinations repeated as necessary to maintain desired levels of protection. Further, different vaccine viruses may be advantageous for different recipient groups. For example, an engineered strain expressing an additional protein rich in T-cell epitopes may be particularly advantageous for adults rather than for infants.

Administration is typically by aerosol, nebulizer, or other topical application to the respiratory tract of the patient being treated. Recombinant chimeric RSV-hMPV is administered in an amount sufficient to result in the expression of therapeutic or prophylactic levels of the desired gene product. Examples of representative gene products which are administered in this method include those which encode, for example, those particularly suitable for transient expression, e.g., interleukin-2, interleukin-4, gamma-interferon, GM-CSF, G-CSF, erythropoietin, and other cytokines, glucocerebrosidase, phenylalanine hydroxylase, cystic fibrosis transmembrane conductance regulator (CFTR), hypoxanthine-guanine phosphoribosyl transferase, cytotoxins, tumor suppressor genes, antisense RNAs, and vaccine antigens.

In certain embodiments, the disclosure relates to immunogenic compositions (e.g., vaccines) comprising an immunologically effective amount of a recombinant chimeric RSV-hMPV of the disclosure (e.g., an attenuated live recombinant chimeric RSV-hMPV or inactivated, non-replicating RSV-hMPV), an immunologically effective amount of a polypeptide disclosed herein, and/or an immunologically effective amount of a nucleic acid disclosed herein.

In certain embodiments, the disclosure relates to methods for stimulating the immune system of an individual to produce a protective immune response against hMPV. In the methods, an immunologically effective amount of a recombinant chimeric RSV-hMPV disclosed herein, an immunologically effective amount of a polypeptide disclosed herein, and/or an immunologically effective amount of a nucleic acid disclosed herein is administered to the individual in a physiologically acceptable carrier.

Typically, the carrier or excipient is a pharmaceutically acceptable carrier or excipient, such as sterile water, aqueous saline solution, aqueous buffered saline solutions, aqueous dextrose solutions, aqueous glycerol solutions, ethanol, or combinations thereof. The preparation of such solutions ensuring sterility, pH, isotonicity, and stability is affected according to protocols established in the art. Generally, a carrier or excipient is selected to minimize allergic and other undesirable effects, and to suit the particular route of administration, e.g., subcutaneous, intramuscular, intranasal, oral, topical, etc. The resulting aqueous solutions can e.g., be packaged for use as is or lyophilized, the lyophilized preparation being combined with a sterile solution prior to administration.

In certain embodiments, the chimeric RSV-hMPV (or component, e.g., RSV-hMPV F protein,) is administered in a quantity sufficient to stimulate an immune response specific for one or more strains of hMPV (e.g., an immunologically effective amount of chimeric RSV-hMPV or component, e.g., RSV-hMPV F protein, is administered). Preferably, administration of chimeric RSV-hMPV elicits a protective immune response. Dosages and methods for eliciting a protective anti-viral immune response, adaptable to producing a protective immune response against hMPV and/or RSV, are known to those of skill in the art. See, e.g., U.S. Pat. No. 5,922,326; Wright et al. (1982) Infect. Immun. 37:397-400; Kim et al. (1973) Pediatrics 52:56-63; and Wright et al. (1976) J. Pediatr. 88:931-936. For example, virus can be provided in the range of about 103-106 pfu (plaque forming units) per dose administered (e.g., 104-105 pfu per dose administered). Typically, the dose will be adjusted based on, e.g., age, physical condition, body weight, sex, diet, mode and time of administration, and other clinical factors. The vaccine formulation can be systemically administered, e.g., by subcutaneous or intramuscular injection using a needle and syringe or a needleless injection device. Preferably, the vaccine formulation is administered intranasally, e.g., by drops, aerosol (e.g., large particle aerosol (greater than about 10 microns)), or spray into the upper respiratory tract. While any of the above routes of delivery results in a protective systemic immune response, intranasal administration confers the added benefit of eliciting mucosal immunity at the site of entry of the virus. For intranasal administration, attenuated live virus vaccines are often preferred, e.g., an attenuated, cold adapted and/or temperature sensitive recombinant virus. As an alternative or in addition to attenuated live virus vaccines, killed virus vaccines, nucleic acid vaccines, and/or polypeptide subunit vaccines, for example, can be used, as suggested by Walsh et al. (1987) J. Infect. Dis. 155:1198-1204 and Murphy et al. (1990) Vaccine 8:497-502.

In certain embodiments, the attenuated recombinant chimeric RSV-hMPV is as used in a vaccine and is sufficiently attenuated such that symptoms of infection, or at least symptoms of serious infection, will not occur in most individuals immunized (or otherwise infected) with the attenuated virus—in embodiments in which viral components (e.g., the nucleic acids or polypeptides herein) are used as vaccine or immunogenic components. However, virulence is typically sufficiently abrogated such that mild or severe lower respiratory tract infections do not typically occur in the vaccinated or incidental subject.

While stimulation of a protective immune response with a single dose is preferred, additional dosages can be administered, by the same or different route, to achieve the desired prophylactic effect. In neonates and infants, for example, multiple administrations may be required to elicit sufficient levels of immunity. Administration can continue at intervals throughout childhood, as necessary to maintain sufficient levels of protection against wild-type hMPV infection. Similarly, adults who are particularly susceptible to repeated or serious hMPV infection, such as, for example, health care workers, day care workers, family members of young children, the elderly, and individuals with compromised cardiopulmonary function may require multiple immunizations to establish and/or maintain protective immune responses. Levels of induced immunity can be monitored, for example, by measuring amounts of virus-neutralizing secretory and serum antibodies, and dosages adjusted or vaccinations repeated as necessary to elicit and maintain desired levels of protection.

Alternatively, an immune response can be stimulated by ex vivo or in vivo targeting of dendritic cells with virus. For example, proliferating dendritic cells are exposed to viruses in a sufficient amount and for a sufficient period of time to permit capture of the hMPV antigens by the dendritic cells. The cells are then transferred into a subject to be vaccinated by standard intravenous transplantation methods.

Optionally, the formulation for administration of the vaccine also contains one or more adjuvants for enhancing the immune response to the hMPV antigens. Contemplated adjuvants include aluminum salts such as Alhydrogel® and Adjuphos®. Contemplated adjuvants include oil-in-water emulsions, where the oil acts as the solute in the water phase and forms isolated droplets, stabilized by emulsifying agents. In certain embodiments, emulsions contain a squalene or α-tocopherol (vitamin E) with additional emulsifying agents such as sorbitan trioleate and polysorbate-80 (PS80) as surfactants. In certain embodiments, emulsions contain a glucopyranosyl lipid A (GLA). GLA can be formulated with chimeric RSV-hMPV, particles or F protein either alone or in a squalene-based oil-in-water stable emulsion (SE). Iyer et al. report oil-in-water adjuvants of different particle size using Respiratory Syncytial Virus Fusion protein (RSV-F). Hum Vaccin Immunother, 2015, 11 (7): 1853-1864

Suitable adjuvants include, for example: complete Freund's adjuvant, incomplete Freund's adjuvant, saponin, mineral gels such as aluminum hydroxide, surface-active substances such as lysolecithin, pluronic polyols, polyanions, peptides, oil or hydrocarbon emulsions, bacille Calmette-Guerin (BCG), *Corynebacterium parvum*, and the synthetic adjuvant QS-21.

If desired, prophylactic vaccine administration of chimeric RSV-hMPV can be performed in conjunction with administration of one or more immunostimulatory molecules. Immunostimulatory molecules include various cytokines, lymphokines and chemokines with immunostimulatory, immunopotentiating, and pro-inflammatory activities, such as interleukins (e.g., IL-1, IL-2, IL-3, IL-4, IL-12, IL-13); growth factors (e.g., granulocyte-macrophage (GM)-colony stimulating factor (CSF)); and other immunostimulatory molecules, such as macrophage inflammatory factor, Flt3 ligand, B7.1; B7.2, etc. The immunostimulatory molecules can be administered in the same formulation as the chimeric RSV-hMPV or can be administered separately. Either the protein or an expression vector encoding the protein can be administered to produce an immunostimulatory effect.

Although vaccination of an individual with an chimeric RSV-hMPV of a particular strain of a particular subgroup can induce cross-protection against viruses of different strains and/or subgroups, cross-protection can be enhanced, if desired, by vaccinating the individual with attenuated hMPV from at least two strains, e.g., each of which represents a different subgroup. Similarly, the chimeric RSV-hMPV vaccines can optionally be combined with vaccines that induce protective immune responses against other infectious agents.

EXAMPLES

Example 1—Assembly and Rescue of Chimeric RSV-hMPV Viruses Chimeric Human RSV-hMPV F Protein A live-attenuated vaccine candidate expressing a chimeric fusion (F) protein of hMPV containing the tail region of respiratory syncytial virus (RSV) line19F within the genetic background of an RSV vaccine was constructed. The candidate was assembled using RSV A2 reverse genetics system and contains codon-deoptimization of the immunomodulatory NS1 and NS2 genes, a deletion of the small hydrophobic (SH) gene, and expression of the far red fluorescent monomeric Katushka 2 (mKate2) protein, a construct named OE1. See U.S. Patent Publication No. 20160030549. The NS1 and NS2 genes were codon deoptimized, which reduces but does not eliminate expression of the proteins.

The RSV-hMPV chimeric F gene was inserted into the BAC OE1 construct by replacing the RSV line 19F gene using restriction sites Sal I and Sac II. Gene start and gene stop were RSV specific. In addition, an RQSR (SEQ ID NO: 18) to RRRR (SEQ ID NO: 19) trypsin-independent cleavage site was introduced into the F protein, which promotes trypsin independent growth in the virus (see, Zhang et al. (2012) J Virol Methods 185 (1). The RSV-hMPV chimeric F protein is shown below as SEQ ID NO: 1, encoded by the gene shown below as SEQ ID NO: 2.

```
                                          (SEQ ID NO: 1)
MSWKVVIIFSLLITPQHGLKESYLEESCSTITEGYLSVLRTGWYTNVFT

LEVGDVENLTCADGPSLIKTELELTKSALRELKTVSADQLAREEQIENP

RRRRFVLGAIALGVATAAAVTAGVAIAKTIRLESEVTAIKNALKKTNEA

VSTLGNGVRVLATAVRELKDFVSKNLTRAINKNKCDIDDLKMAVSFSQF

NRRFLNVVRQFSDNAGITPAISLDLMTDAELARAVSNMPTSAGQIKLML

ENRAMVRRKGFGILIGVYGSSVIYMVQLPIFGVIDTPCWIVKAAPSCSK

KKGNYACLLREDQGWYCQNAGSTVYYPNEKDCETRGDHVFCDTAAGINV
```

-continued

AEQSKECNINISTTNYPCKVSTGRHPISMVALSPLGALVACYKGVSCSI

GSNRVGIIKQLNKGCSYITNQDADTVTIDNTVYQLSKVEGEQHVIKGRP

VSSSFDPVKFPEDQFNVALDQVFENIENSQALVDQSNRILSSAEKGNTI

MITTIIIVIIVILLSLIAVGLLLYCKARSTPVTLSKDQLSGINNIAFSN (SEQ ID NO: 2)
ATGTCCTGGAAAGTGGTGATCATTTTTTCATTGCTAATAACACCTCAAC

ACGGTCTTAAAGAGAGCTACTTGGAAGAATCATGTAGCACTATAACTGA

GGGGTATCTCAGTGTTCTGAGGACAGGTTGGTATACCAACGTTTTTACA

TTAGAGGTGGGTGATGTAGAAAACCTCACATGTGCTGATGGACCTAGCC

TAATAAAAACAGAATTAGAACTGACCAAAAGTGCACTAAGAGAGCTCAA

AACAGTCTCTGCTGACCAATTGGCGAGAGAGGAACAAATTGAGAATCCC

AGAAGAAGAAGATTTGTTCTAGGAGCAATAGCACTCGGTGTTGCAACAG

CAGCTGCAGTTACAGCAGGTGTTGCAATTGCCAAAACCATCCGGCTTGA

GAGTGAAGTCACAGCAATTAAGAATGCCCTTAAAAAGACCAATGAAGCA

GTATCTACATTGGGGAATGGAGTTCGAGTGTTGGCAACTGCAGTAAGAG

AGCTGAAAGATTTTGTGAGCAAGAATTTAACTCGTGCAATCAACAAAAA

CAAGTGCGACATTGATGACCTAAAAATGGCCGTTAGCTTCAGTCAATTC

AACAGAAGGTTTCTAAATGTTGTGCGGCAATTTTCAGACAATGCTGGAA

TAACACCAGCAATATCTTTGGACTTAATGACAGATGCTGAACTAGCCAG

GGCCGTCTCCAACATGCCGACATCTGCAGGACAAATAAAATTGATGTTG

GAGAACCGTGCAATGGTGCGAAGAAAGGGGTTTGGAATCCTGATAGGGG

TCTACGGGAGCTCCGTAATTTACATGGTGCAGCTGCCAATCTTTGGCGT

CATAGACACGCCTTGCTGGATAGTAAAAGCAGCCCCCTCTTGTTCCAAA

AAAAAGGGAAACTATGCTTGCCTTTTAAGAGAAGATCAAGGGTGGTATT

GTCAGAATGCAGGGTCAACTGTTTACTACCCAAATGAGAAAGACTGTGA

AACAAGAGGAGACCATGTCTTTTGCGACACAGCAGCAGGAATTAATGTT

GCTGAGCAATCAAAAGAGTGCAATATCAACATATCCACTACAAATTACC

CATGCAAAGTCAGCACAGGAAGACATCCTATCAGTATGGTTGCACTGTC

TCCTCTTGGGGCTCTAGTTGCTTGCTACAAAGGAGTAAGCTGTTCCATT

GGCAGCAATAGAGTAGGGATCATCAAGCAGCTGAACAAAGGTTGCTCCT

ATATAACCAACCAAGATGCAGACACAGTGACAATAGACAACACTGTATA

TCAGCTAAGCAAAGTTGAGGGTGAACAGCATGTTATAAAAGGCAGACCA

GTGTCAAGCAGCTTTGATCCAGTCAAGTTTCCTGAAGATCAATTCAATG

TTGCACTTGACCAAGTTTTTGAGAACATTGAAAACAGCCAGGCCTTGGT

GGATCAATCAAACAGGATCCTAAGCAGTGCAGAGAAAGGGAACACTATC

ATGATAACTACTATAATTATAGTGATTATAGTAATATTGTTATCATTAA

TTGCTGTTGGACTGCTCCTATACTGTAAGGCCAGAAGCACACCAGTCAC

ACTAAGCAAGGATCAACTGAGTGGTATAAATAATATTGCATTTAGTAAC

TGA

Generation of the Bacterial Artificial Chromosome (BAC) Construct

The bacterial artificial chromosome (BAC) construct for OE1 was used to generate the herein disclosed chimeric RSV-hMPV construct DH2. The bacterial artificial chromosome (BAC) construct for OE1 was generated through modification of a BAC containing A2-mKate2-line19F (1557V). See Hotard et al., A stabilized respiratory syncytial virus reverse genetics system amenable to recombination-mediated mutagenesis. Virology 434, 129-136 (2012). The gene for monomeric Katushka 2 (mKate2, K), a far-red fluorescent reporter, is in the first gene position of the RSV antigenomic cDNA. Inclusion of mKate2 in this position did not attenuate RSV in vitro or in mice. Deletion of SH (ΔSH) was performed by recombination-mediated mutagenesis (re-combineering). Oligonucleotide primers were used to PCR-amplify the galK cassette such that the amplicon termini are homologous to the target site to replace SH with galK. Recombination in E. coli resulted in replacing SH, from the beginning of the gene start to the end of the SH-G intergenic region, with the galK cassette. Complementary oligonucle-otides were annealed and used for removing the galK cassette in the second step of recombineering. Precise deletion of SH was confirmed by sequencing, yielding A2-K-ΔSH-line19F (1557V) BAC.

The human codon-deoptimized NS1 is

SEQ ID NO: 3
ATGGGTTCGAATTCGCTATCGATGATAAAAGTACGTCTACAAAATCTAT

TTGATAATGATGAAGTAGCGCTACTAAAAATAACGTGTTATACGGATAA

ACTAATACATCTAACGAATGCGCTAGCGAAAGCGGTAATACATACGATA

AAACTAAATGGTATAGTATTTGTACATGTAATAACGTCGTCGGATATAT

GTCCGAATAATAATATAGTAGTAAAATCGAATTTTACGACGATGCCGGT

ACTACAAAATGGTGGTTATATATGGGAAATGATGGAACTAACGCATTGT

TCGCAACCGAATGGTCTACTAGATGATAATTGTGAAATAAAATTTTCGA

AAAAACTATCGGATTCGACGATGACGAATTATATGAATCAACTATCGGA

ACTACTAGGTTTTGATCTAAATCCGTAA and

NS2 is

SEQ ID NO: 4
ATGGATACGACGCATAATGATAATACGCCGCAACGTCTAATGATAACGG

ATATGCGTCCGCTATCGCTAGAAACGATAATAACGTCGCTAACGCGTGA

TATAATAACGCATAAATTTATATATCTAATAAATCATGAATGTATAGTA

CGTAAACTAGATGAACGTCAAGCGACGTTTACGTTTCTAGTAAATTATG

AAATGAAACTACTACATAAAGTAGGTTCGACGAAATATAAAAAATATAC

GGAATATAATACGAAATATGGTACGTTTCCGATGCCGATATTTATAAAT

CATGATGGTTTTCTAGAATGTATAGGTATAAAACCGACGAAACATACGC

CGATAATATATAAATATGATCTAAATCCGTAA.

Sequence of DH2

(SEQ ID NO: 31)
ACGCGAAAAAATGCGTACAACAAACTTGCATAAACCAAAAAAATGGGGC

AAATAAGAATTTGATAAGTACCACTTAAATTTAACTCCCTTGCTTAGCG

ATGGGTTCGAATTCGCTATCGATGATAAAAGTACGTCTACAAAATCTAT

TTGATAATGATGAAGTAGCGCTACTAAAAATAACGTGTTATACGGATAA

ACTAATACATCTAACGAATGCGCTAGCGAAAGCGGTAATACATACGATA

AAACTAAATGGTATAGTATTTGTACATGTAATAACGTCGTCGGATATAT

-continued
```
GTCCGAATAATAATATAGTAGTAAAATCGAATTTTACGACGATGCCGGT
ACTACAAAATGGTGGTTATATATGGGAAATGATGGAACTAACGCATTGT
TCGCAACCGAATGGTCTACTAGATGATAATTGTGAAATAAAATTTTCGA
AAAAACTATCGGATTCGACGATGACGAATTATATGAATCAACTATCGGA
ACTACTAGGTTTTGATCTAAATCCGTAAATTATAATTAATATCAACTAG
CAAATCAATGTCACTAACACCATTAGTTAATATAAAACTTAACAGAAGA
CAAAAATGGGGCAAATAAATCAATTCAGCCAACCCAACCATGGATACGA
CGCATAATGATAATACGCCGCAACGTCTAATGATAACGGATATGCGTCC
GCTATCGCTAGAAACGATAATAACGTCGCTAACGCGTGATATAATAACG
CATAAATTTATATATCTAATAAATCATGAATGTATAGTACGTAAACTAG
ATGAACGTCAAGCGACGTTTACGTTTCTAGTAAATTATGAAATGAAACT
ACTACATAAAGTAGGTTCGACGAAATATAAAAAATATACGGAATATAAT
ACGAAATATGGTACGTTTCCGATGCCGATATTTATAAATCATGATGGTT
TTCTAGAATGTATAGGTATAAAACCGACGAAACATACGCCGATAATATA
TAAATATGATCTAAATCCGTAAATTTCAACACAATATTCACACAATCTA
AAACAACAACTCTATGCATAACTATACTCCATAGTCCAGATGGAGCCTG
AAAATTATAGTAATTTAAAATTAAGGAGAGATATAAGATAGAAGATGGG
GCAAATACAAAGATGGCTCTTAGCAAAGTCAAGTTGAATGATACACTCA
ACAAAGATCAACTTCTGTCATCCAGCAAATACACCATCCAACGGAGCAC
AGGAGATAGTATTGATACTCCTAATTATGATGTGCAGAAACACATCAAT
AAGTTATGTGGCATGTTATTAATCACAGAAGATGCTAATCATAAATTCA
CTGGGTTAATAGGTATGTTATATGCGATGTCTAGGTTAGGAAGAGAAGA
CACCATAAAAATACTCAGAGATGCGGGATATCATGTAAAAGCAAATGGA
GTAGATGTAACAACACATCGTCAAGACATTAATGGAAAAGAAATGAAAT
TTGAAGTGTTAACATTGGCAAGCTTAACAACTGAAATTCAAATCAACAT
TGAGATAGAATCTAGAAAATCCTACAAAAAAATGCTAAAAGAAATGGGA
GAGGTAGCTCCAGAATACAGGCATGACTCTCCTGATTGTGGGATGATAA
TATTATGTATAGCAGCATTAGTAATAACTAAATTAGCAGCAGGGGACAG
ATCTGGTCTTACAGCCGTGATTAGGAGAGCTAATAATGTCCTAAAAAAT
GAAATGAAACGTTACAAAGGCTTACTACCCAAGGACATAGCCAACAGCT
TCTATGAAGTGTTTGAAAAACATCCCCACTTTATAGATGTTTTTGTTCA
TTTTGGTATAGCACAATCTTCTACCAGAGGTGGCAGTAGAGTTGAAGGG
ATTTTTGCAGGATTGTTTATGAATGCCTATGGTGCAGGGCAAGTGATGT
TACGGTGGGGAGTCTTAGCAAAATCAGTTAAAAATATTATGTTAGGACA
TGCTAGTGTGCAAGCAGAAATGGAACAAGTTGTTGAGGTTTATGAATAT
GCCCAAAAATTGGGTGGTGAAGCAGGATTCTACCATATATTGAACAACC
CAAAAGCATCATTATTATCTTTGACTCAATTTCCTCACTTCTCCAGTGT
AGTATTAGGCAATGCTGCTGGCCTAGGCATAATGGGAGAGTACAGAGGT
ACACCGAGGAATCAAGATCTATATGATGCAGCAAAGGCATATGCTGAAC
AACTCAAAGAAAATGGTGTGATTAACTACAGTGTACTAGACTTGACAGC
AGAAGAACTAGAGGCTATCAAACATCAGCTTAATCCAAAAGATAATGAT GTAGAGCTTTGAGTTAATAAAAAATGGGGCAAATAAATCATCATGGAAA
AGTTTGCTCCTGAATTCCATGGAGAAGATGCAAACAACAGGGCTACTAA
ATTCCTAGAATCAATAAAGGGCAAATTCACATCACCCAAAGATCCCAAG
AAAAAGATAGTATCATATCTGTCAACTCAATAGATATAGAAGTAACCA
AAGAAAGCCCTATAACATCAAATTCAACTATTATCAACCCAACAAATGA
GACAGATGATACTGCAGGGAACAAGCCCAATTATCAAAGAAAACCTCTA
GTAAGTTTCAAAGAAGACCCTACACCAAGTGATAATCCCTTTTCTAAAC
TATACAAAGAAACCATAGAAACATTTGATAACAATGAAGAAGAATCCAG
CTATTCATACGAAGAAATAAATGATCAGACAAACGATAATATAACAGCA
AGATTAGATAGGATTGATGAAAAATTAAGTGAAATACTAGGAATGCTTC
ACACATTAGTAGTGGCAAGTGCAGGACCTACATCTGCTCGGGATGGTAT
AAGAGATGCCATGATTGGTTTAAGAGAAGAAATGATAGAAAAAATCAGA
ACTGAAGCATTAATGACCAATGACAGATTAGAAGCTATGGCAAGACTCA
GGAATGAGGAAAGTGAAAAGATGGCAAAAGACACATCAGATGAAGTGTC
TCTCAATCCAACATCAGAGAAATTGAACAACCTATTGGAAGGGAATGAT
AGTGACAATGATCTATCACTTGAAGATTTCTGATTAGTTACCACTCTTC
ACATCAACACACAATACCAACAGAAGACCAACAAACTAACCAACCCAAT
CATCCAACCAAACATCCATCCGCCAATCAGCCAAACAGCCAACAAAACA
ACCAGCCAATCCAAAACTAACCACCCGGAAAAAATCTATAATATAGTTA
CAAAAAAGGAAAGGGTGGGGCAAATATGGAAACATACGTGAACAAGCT
TCACGAAGGCTCCACATACACAGCTGCTGTTCAATACAATGTCTTAGAA
AAAGACGATGACCCTGCATCACTTACAATATGGGTGCCCATGTTCCAAT
CATCTATGCCAGCAGATTTACTTATAAAAGAACTAGCTAATGTCAACAT
ACTAGTGAAACAAATATCCACACCCAAGGGACCTTCACTAAGAGTCATG
ATAAACTCAAGAAGTGCAGTGCTAGCACAAATGCCCAGCAAATTTACCA
TATGCGCTAATGTGTCCTTGGATGAAAGAAGCAAACTAGCATATGATGT
AACCACACCCTGTGAAATCAAGGCATGTAGTCTAACATGCCTAAAATCA
AAAAATATGTTGACTACAGTTAAAGATCTCACTATGAAGACACTCAACC
CTACACATGATATTATTGCTTTATGTGAATTTGAAAACATAGTAACATC
AAAAAAGTCATAATACCAACATACCTAAGATCCATCAGTGTCAGAAAT
AAAGATCTGAACACACTTGAAAATATAACAACCACTGAATTCAAAAATG
CTATCACAAATGCAAAAATCATCCCTTACTCAGGATTACTATTAGTCAT
CACAGTGACTGACAACAAAGGAGCATTCAAATACATAAAGCCACAAAGT
CAATTCATAGTAGATCTTGGAGCTTACCTAGAAAAAGAAAGTATATATT
ATGTTACCACAAATTGGAAGCACACAGCTACACGATTTGCAATCAAACC
CATGGAAGATTAACCTTTTCCTCTACATCAGTGTGTTAATTCATACAA
ACTTTCTACCTACATTCTTCACTTCACCATCACAATCACAAACACTCTG
TGGTTCAACCAATCAAACAAAACTTATCTGAAGTCCCAGATCATCCCAA
GTCATTGTTTATCAGATCTAGTACTCAAATAAGTTAATAAAAAATATAC
ACATGGACGTCCATGGGGCAAATGCAAACATGTCCAAAAACAAGGACCA
```

-continued

ACGCACCGCTAAGACATTAGAAAGGACCTGGGACACTCTCAATCATTTA
TTATTCATATCATCGTGCTTATATAAGTTAAATCTTAAATCTGTAGCAC
AAATCACATTATCCATTCTGGCAATGATAATCTCAACTTCACTTATAAT
TGCAGCCATCATATTCATAGCCTCGGCAAACCACAAAGTCACACCAACA
ACTGCAATCATACAAGATGCAACAAGCCAGATCAAGAACACAACCCCAA
CATACCTCACCCAGAATCCTCAGCTTGGAATCAGTCCCTCTAATCCGTC
TGAAATTACATCACAAATCACCACCATACTAGCTTCAACAACACCAGGA
GTCAAGTCAACCCTGCAATCCACAACAGTCAAGACCAAAAACACAACAA
CAACTCAAACACAACCCAGCAAGCCCACCACAAAACAACGCCAAAACAA
ACCACCAAGCAAACCCAATAATGATTTTCACTTTGAAGTGTTCAACTTT
GTACCCTGCAGCATATGCAGCAACAATCCAACCTGCTGGGCTATCTGCA
AAAGAATACCAAACAAAAAACCAGGAAAGAAAACCACTACCAAGCCCAC
AAAAAAACCAACCCTCAAGACAACCAAAAAAGATCCCAAACCTCAAACC
ACTAAATCAAAGGAAGTACCCACCACCAAGCCCACAGAAGAGCCAACCA
TCAACACCACCAAAACAAACATCATAACTACACTACTCACCTCCAACAC
CACAGGAAATCCAGAACTCACAAGTCAAATGGAAACCTTCCACTCAACT
TCCTCCGAAGGCAATCCAAGCCCTTCTCAAGTCTCTACAACATCCGAGT
ACCCATCACAACCTTCATCTCCACCCAACACACCACGCCAGTAGTTACT
TAAAAACATATTATCACAAAAGGCCTTGACCAACCGCGGAGAATCAAAA
TAAACTCTGGGGCAAATAACAATGTCCTGGAAAGTGGTGATCATTTTTT
CATTGCTAATAACACCTCAACACGGTCTTAAAGAGAGCTACTTGGAAGA
ATCATGTAGCACTATAACTGAGGGGTATCTCAGTGTTCTGAGGACAGGT
TGGTATACCAACGTTTTTACATTAGAGGTGGGTGATGTAGAAAACCTCA
CATGTGCTGATGGACCTAGCCTAATAAAAACAGAATTAGAACTGACCAA
AAGTGCACTAAGAGAGCTCAAAACAGTCTCTGCTGACCAATTGGCGAGA
GAGGAACAAATTGAGAATCCCAGAAGAAGAAGATTTGTTCTAGGAGCAA
TAGCACTCGGTGTTGCAACAGCAGCTGCAGTTACAGCAGGTGTTGCAAT
TGCCAAAACCATCCGGCTTGAGAGTGAAGTCACAGCAATTAAGAATGCC
CTTAAAAAGACCAATGAAGCAGTATCTACATTGGGGAATGGAGTTCGAG
TGTTGGCAACTGCAGTAAGAGAGCTGAAAGATTTTGTGAGCAAGAATTT
AACTCGTGCAATCAACAAAAACAAGTGCGACATTGATGACCTAAAAATG
GCCGTTAGCTTCAGTCAATTCAACAGAAGGTTTCTAAATGTTGTGCGGC
AATTTTCAGACAATGCTGGAATAACACCAGCAATATCTTTGGACTTAAT
GACAGATGCTGAACTAGCCAGGGCCGTCTCCAACATGCCGACATCTGCA
GGACAAATAAAATTGATGTTGGAGAACCGTGCAATGGTGCGAAGAAAGG
GGTTTGGAATCCTGATAGGGGTCTACGGGAGCTCCGTAATTTACATGGT
GCAGCTGCCAATCTTTGGCGTCATAGACACGCCTTGCTGGATAGTAAAA
GCAGCCCCTCTTGTTCCAAAAAAAGGGAAACTATGCTTGCCTTTTAA
GAGAAGATCAAGGGTGGTATTGTCAGAATGCAGGGTCAACTGTTTACTA
CCCAAATGAGAAAGACTGTGAAACAAGAGGAGACCATGTCTTTTGCGAC
ACAGCAGCAGGAATTAATGTTGCTGAGCAATCAAAAGAGTGCAATATCA

-continued

ACATATCCACTACAAATTACCCATGCAAAGTCAGCACAGGAAGACATCC
TATCAGTATGGTTGCACTGTCTCCTCTTGGGGCTCTAGTTGCTTGCTAC
AAAGGAGTAAGCTGTTCCATTGGCAGCAATAGAGTAGGGATCATCAAGC
AGCTGAACAAAGGTTGCTCCTATATAACCAACCAAGATGCAGACACAGT
GACAATAGACAACACTGTATATCAGCTAAGCAAAGTTGAGGGTGAACAG
CATGTTATAAAGGCAGACCAGTGTCAAGCAGCTTTGATCCAGTCAAGT
TTCCTGAAGATCAATTCAATGTTGCACTTGACCAAGTTTTTGAGAACAT
TGAAAACAGCCAGGCCTTGGTGGATCAATCAAACAGGATCCTAAGCAGT
GCAGAGAAAGGGAACACTATCATGATAACTACTATAATTATAGTGATTA
TAGTAATATTGTTATCATTAATTGCTGTTGGACTGCTCCTATACTGTAA
GGCCAGAAGCACACCAGTCACACTAAGCAAGGATCAACTGAGTGGTATA
AATAATATTGCATTTAGTAACTGAATAAAAATAGCACCTAATCATGTTC
TTACAATGGTTTACTATCTGCTCATAGACAACCCATCTATCATTGGATT
TTCTTAAAATCTGAACTTCATCGAAACTCTTATCTATAAACCATCTCAC
TTACACTATTTAAGTAGATTCCTAGTTTATAGTTATATAAAAACACAAT
TGAATGCCAGTCGACCTTACCATCTGTAAAAATGAAAACTGGGGCAAAT
ATGTCACGAAGGAATCCTTGCAAATTTGAAATTCGAGGTCATTGCTTAA
ATGGTAAGAGGTGTCATTTTAGTCATAATTATTTTGAATGGCCACCCCA
TGCACTGCTTGTAAGACAAAACTTTATGTTAAACAGAATACTTAAGTCT
ATGGATAAAAGTATAGATACCTTATCAGAAATAAGTGGAGCTGCAGAGT
TGGACAGAACAGAAGAGTATGCTCTTGGTGTAGTTGGAGTGCTAGAGAG
TTATATAGGATCAATAAACAATATAACTAAACAATCAGCATGTGTTGCC
ATGAGCAAACTCCTCACTGAACTCAATAGTGATGATATCAAAAAGCTGA
GGGACAATGAAGAGCTAAATTCACCCAAGATAAGAGTGTACAATACTGT
CATATCATATATTGAAAGCAACAGGAAAAACAATAAACAAACTATCCAT
CTGTTAAAAAGATTGCCAGCAGACGTATTGAAGAAAACCATCAAAAACA
CATTGGATATCCATAAGAGCATAACCATCAACAACCCAAAAGAATCAAC
TGTTAGTGATACAAATGACCATGCCAAAAATAATGATACTACCTGACAA
ATATCCTTGTAGTATAACTTCCATACTAATAACAAGTAGATGTAGAGTT
ACTATGTATAATCAAAAGAACACACTATATTTCAATCAAAACAACCCAA
ATAACCATATGTACTCACCGAATCAAACATTCAATGAAATCCATTGGAC
CTCTCAAGAATTGATTGACACAATTCAAAATTTTCTACAACATCTAGGT
ATTATTGAGGATATATATACAATATATATATTAGTGTCATAACACTCAA
TTCTAACACTCACCACATCGTTACATTATTAATTCAAACAATTCAAGTT
GTGGGACAAAATGGATCCCATTATTAATGGAAATTCTGCTAATGTTTAT
CTAACCGATAGTTATTTAAAAGGTGTTATCTCTTTCTCAGAGTGTAATG
CTTTAGGAAGTTACATATTCAATGGTCCTTATCTCAAAAATGATTATAC
CAACTTAATTAGTAGACAAAATCCATTAATAGAACACATGAATCTAAAG
AAACTAAATATAACACAGTCCTTAATATCTAAGTATCATAAAGGTGAAA
TAAAATTAGAAGAACCTACTTATTTTCAGTCATTACTTATGACATACAA

-continued
```
GAGTATGACCTCGTCAGAACAGATTGCTACCACTAATTTACTTAAAAAG
ATAATAAGAAGAGCTATAGAAATAAGTGATGTCAAAGTCTATGCTATAT
TGAATAAACTAGGGCTTAAAGAAAAGGACAAGATTAAATCCAACAATGG
ACAAGATGAAGACAACTCAGTTATTACGACCATAATCAAAGATGATATA
CTTTCAGCTGTTAAAGATAATCAATCTCATCTTAAAGCAGACAAAAATC
ACTCTACAAAACAAAAGACACAATCAAAACAACACTCTTGAAGAAATT
GATGTGTTCAATGCAACATCCTCCATCATGGTTAATACATTGGTTTAAC
TTATACACAAAATTAAACAACATATTAACACAGTATCGATCAAATGAGG
TAAAAAACCATGGGTTTACATTGATAGATAATCAAACTCTTAGTGGATT
TCAATTTATTTTGAACCATATGGTTGTATAGTTTATCATAAGGAACTC
AAAAGAATTACTGTGACAACCTATAATCAATTCTTGACATGGAAAGATA
TTAGCCTTAGTAGATTAAATGTTTGTTTAATTACATGGATTAGTAACTG
CTTGAACACATTAAATAAAAGCTTAGGCTTAAGATGCGGATTCAATAAT
GTTATCTTGACACAACTATTCCTTTATGGAGATTGTATACTAAAGCTAT
TTCACAATGAGGGGTTCTACATAATAAAAGAGGTAGAGGGATTTATTAT
GTCTCTAATTTTAAATATAACAGAAGAAGATCAATTCAGAAAACGATTT
TATAATAGTATGCTCAACAACATCACAGATGCTGCTAATAAAGCTCAGA
AAAATCTGCTATCAAGAGTATGTCATACATTATTAGATAAGACAGTGTC
CGATAATATAATAAATGGCAGATGGATAATTCTATTAAGTAAGTTCCTT
AAATTAATTAAGCTTGCAGGTGACAATAACCTTAACAATCTGAGTGAAC
TATATTTTTGTTCAGAATATTTGGACACCCAATGGTAGATGAAAGACA
AGCCATGGATGCTGTTAAAATTAATTGCAATGAGACCAAATTTTACTTG
TTAAGCAGTCTGAGTATGTTAAGAGGTGCCTTTATATATAGAATTATAA
AAGGGTTTGTAAATAATTACAACAGATGGCCTACTTTAAGAAATGCTAT
TGTTTTACCCTTAAGATGGTTAACTTACTATAAACTAAACACTTATCCT
TCTTTGTTGGAACTTACAGAAAGAGATTTGATTGTGTTATCAGGACTAC
GTTTCTATCGTGAGTTTCGGTTGCCTAAAAAAGTGGATCTTGAAATGAT
TATAAATGATAAAGCTATATCACCTCCTAAAAATTTGATATGGACTAGT
TTCCCTAGAAATTACATGCCATCACACATACAAAACTATATAGAACATG
AAAAATTAAAATTTTCCGAGAGTGATAAATCAAGAAGAGTATTAGAGTA
TTATTTAAGAGATAACAAATTCAATGAATGTGATTTATACAACTGTGTA
GTTAATCAAAGTTATCTCAACAACCCTAATCATGTGGTATCATTGACAG
GCAAAGAAAGAACTCAGTGTAGGTAGAATGTTTGCAATGCAACCGGG
AATGTTCAGACAGGTTCAAATATTGGCAGAGAAAATGATAGCTGAAAAC
ATTTTACAATTCTTTCCTGAAAGTCTTACAAGATATGGTGATCTAGAAC
TACAAAAAATATTAGAATTGAAAGCAGGAATAAGTAACAAATCAAATCG
CTACAATGATAATTACAACAATTACATTAGTAAGTGCTCTATCATCACA
GATCTCAGCAAATTCAATCAAGCATTTCGATATGAAACGTCATGTATTT
GTAGTGATGTGCTGGATGAACTGCATGGTGTACAATCTCTATTTTCCTG
GTTACATTTAACTATTCCTCATGTCACAATAATATGCACATATAGGCAT
GCACCCCCCTATATAGGAGATCATATTGTAGATCTTAACAATGTAGATG
```

-continued
```
AACAAAGTGGATTATATAGATATCACATGGGTGGCATCGAAGGGTGGTG
TCAAAAACTGTGGACCATAGAAGCTATATCACTATTGGATCTAATATCT
CTCAAAGGGAAATTCTCAATTACTGCTTTAATTAATGGTGACAATCAAT
CAATAGATATAAGCAAACCAATCAGACTCATGGAAGGTCAAACTCATGC
TCAAGCAGATTATTTGCTAGCATTAAATAGCCTTAAATTACTGTATAAA
GAGTATGCAGGCATAGGCCACAAATTAAAAGGAACTGAGACTTATATAT
CACGAGATATGCAATTTATGAGTAAAACAATTCAACATAACGGTGTATA
TTACCCAGCTAGTATAAAGAAAGTCCTAAGAGTGGGACCGTGGATAAAC
ACTATACTTGATGATTTCAAAGTGAGTCTAGAATCTATAGGTAGTTTGA
CACAAGAATTAGAATATAGAGGTGAAAGTCTATTATGCAGTTTAATATT
TAGAAATGTATGGTTATATAATCAGATTGCTCTACAATTAAAAAATCAT
GCATTATGTAACAATAAACTATATTTGGACATATTAAAGGTTCTGAAAC
ACTTAAAAACCTTTTTTAATCTTGATAATATTGATACAGCATTAACATT
GTATATGAATTTACCCATGTTATTTGGTGGTGGTGATCCCAACTTGTTA
TATCGAAGTTTCTATAGAAGAACTCCTGACTTCCTCACAGAGGCTATAG
TTCACTCTGTGTTCATACTTAGTTATTATACAAACCATGACTTAAAAGA
TAAACTTCAAGATCTGTCAGATGATAGATTGAATAAGTTCTTAACATGC
ATAATCACGTTTGACAAAAACCCTAATGCTGAATTCGTAACATTGATGA
GAGATCCTCAAGCTTTAGGGTCTGAGAGACAAGCTAAAATTACTAGCGA
AATCAATAGACTGGCAGTTACAGAGGTTTTGAGTACAGCTCCAAACAAA
ATATTCTCCAAAAGTGCACAACATTATACTACTACAGAGATAGATCTAA
ATGATATTATGCAAAATATAGAACCTACATATCCTCATGGGCTAAGAGT
TGTTTATGAAAGTTTACCCTTTTATAAAGCAGAGAAAATAGTAAATCTT
ATATCAGGTACAAAATCTATAACTAACATACTGGAAAAAACTTCTGCCA
TAGACTTAACAGATATTGATAGAGCCACTGAGATGATGAGGAAAAACAT
AACTTTGCTTATAAGGATACTTCCATTGGATTGTAACAGAGATAAAAGA
GAGATATTGAGTATGGAAAACCTAAGTATTACTGAATTAAGCAAATATG
TTAGGGAAAGATCTTGGTCTTTATCCAATATAGTTGGTGTTACATCACC
CAGTATCATGTATACAATGGACATCAAATATACTACAAGCACTATATCT
AGTGGCATAATTATAGAGAAATATAATGTTAACAGTTTAACACGTGGTG
AGAGAGGACCCACTAAACCATGGGTTGGTTCATCTACACAAGAGAAAAA
AACAATGCCAGTTTATAATAGACAAGTCTTAACCAAAAAACAGAGAGAT
CAAATAGATCTATTAGCAAAATTGGATTGGGTGTATGCATCTATAGATA
ACAAGGATGAATTCATGGAAGAACTCAGCATAGGAACCCTTGGGTTAAC
ATATGAAAGGCCAAGAAATTATTTCCACAATATTTAAGTGTCAATTAT
TTGCATCGCCTTACAGTCAGTAGTAGACCATGTGAATTCCCTGCATCAA
TACCAGCTTATAGAACAACAAATTATCACTTTGACACTAGCCCTATTAA
TCGCATATTAACAGAAAGTATGGTGATGAAGATATTGACATAGTATTC
CAAAACTGTATAAGCTTTGGCCTTAGTTTAATGTCAGTAGTAGAACAAT
TTACTAATGTATGTCCTAACAGAATTATTCTCATACCTAAGCTTAATGA
```

-continued

```
GATACATTTGATGAAACCTCCCATATTCACAGGTGATGTTGATATTCAC
AAGTTAAAACAAGTGATACAAAAACAGCATATGTTTTTACCAGACAAAA
TAAGTTTGACTCAATATGTGGAATTATTCTTAAGTAATAAAACACTCAA
ATCTGGATCTCATGTTAATTCTAATTTAATATTGGCACATAAATATCT
GACTATTTTCATAATACTTACATTTTAAGTACTAATTTAGCTGGACATT
GGATTCTGATTATACAACTTATGAAAGATTCTAAAGGTATTTTTGAAAA
AGATTGGGGAGAGGGATATATAACTGATCATATGTTTATTAATTTGAAA
GTTTTCTTCAATGCTTATAAGACCTATCTCTTGTGTTTTCATAAAGGTT
ATGGCAAAGCAAAGCTGGAGTGTGATATGAACACTTCAGATCTTCTATG
TGTATTGGAATTAATAGACAGTAGTTATTGGAAGTCTATGTCTAAGGTA
TTTTTAGAACAAAAAGTTATCAAATACATTCTTAGCCAAGATGCAAGTT
TACATAGAGTAAAAGGATGTCATAGCTTCAAATTATGGTTTCTTAAACG
TCTTAATGTAGCAGAATTCACAGTTTGCCCTTGGGTTGTTAACATAGAT
TATCATCCAACACATATGAAAGCAATATTAACTTATATAGATCTTGTTA
GAATGGGATTGATAAATATAGATAATACACATTAAAAATAAACACAA
ATTCAATGATGAATTTTATACTTCTAATCTCTTCTACATTAATTATAAC
TTCTCAGATAATACTCATCTATTAACTAAACATATAAGGATTGCTAATT
CTGAATTAGAAAATAATTACAACAAATTATATCATCCTACACCAGAAAC
CCTAGAGAATATACTAGCCAATCCGATTAAAAGTAATGACAAAAAGACA
CTGAATGACTATTGTATAGGTAAAAATGTTGACTCAATAATGTTACCAT
TGTTATCTAATAAGAAGCTTATTAAATCGTCTGCAATGATTAGAACCAA
TTACAGCAAACAAGATTTGTATAATTTATTCCCTATGGTTGTGATTGAT
AGAATTATAGATCATTCAGGCAATACAGCCAAATCCAACCAACTTTACA
CTACTACTTCCCACCAAATATCTTTAGTGCACAATAGCACATCACTTTA
CTGCATGCTTCCTTGGCATCATATTAATAGATTCAATTTTGTATTTAGT
TCTACAGGTTGTAAAATTAGTATAGAGTATATTTTAAAAGATCTTAAAA
TTAAAGATCCCAATTGTATAGCATTCATAGGTGAAGGAGCAGGGAATTT
ATTATTGCGTACAGTAGTGGAACTTCATCCTGACATAAGATATATTTAC
AGAAGTCTGAAAGATTGCAATGATCATAGTTTACCTATTGAGTTTTTAA
GGCTGTACAATGGACATATCAACATTGATTATGGTGAAAATTTGACCAT
TCCTGCTACAGATGCAACCAACAACATTCATTGGTCTTATTTACATATA
AAGTTTGCTGAACCTATCAGTCTTTTTGTCTGTGATGCCGAATTGTCTG
TAACAGTCAACTGGAGTAAAATTATAATAGAATGGAGCAAGCATGTAAG
AAAGTGCAAGTACTGTTCCTCAGTTAATAAATGTATGTTAATAGTAAAA
TATCATGCTCAAGATGATATTGATTTCAAATTAGACAATATAACTATAT
TAAAAACTTATGTATGCTTAGGCAGTAAGTTAAAGGGATCGGAGGTTTA
CTTAGTCCTTACAATAGGTCCTGCGAATATATTCCCAGTATTTAATGTA
GTACAAAATGCTAAATTGATACTATCAAGAACCAAAAATTTCATCATGC
CTAAGAAAGCTGATAAAGAGTCTATTGATGCAAATATTAAAAGTTTGAT
ACCCTTTCTTTGTTACCCTATAACAAAAAAAGGAATTAATACTGCATTG
TCAAAACTAAAGAGTGTTGTTAGTGGAGATATACTATCATATTCTATAG
CTGGACGTAATGAAGTTTTCAGCAATAAACTTATAAATCATAAGCATAT
GAACATCTTAAAATGGTTCAATCATGTTTTAAATTTCAGATCAACAGAA
CTAAACTATAACCATTTATATATGGTAGAATCTACATATCCTTACCTAA
GTGAATTGTTAAACAGCTTGACAACCAATGAACTTAAAAAACTGATTAA
AATCACAGGTAGTCTGTTATACAACTTTCATAATGAATAATGAATAAAG
ATCTTATAATAAAAATTCCCATAGCTATACACTAACACTGTATTCAATT
ATAGTTATTAAAAATTAAAAATCGTACGATTTTTTAAATAACTTTTAGT
GAACTAATCCTAAAGTTATCATTTTAATCTTGGAGGAATAAATTTAAAC
CCTAATCTAATTGGTTTATATGTGTATTAACTAAATTACGAGATATTAG
TTTTTGACACTTTTTTTCTCGTGGGTCGGCATGGCATCTCCACCTCCTC
GCGGTCCGACCTGGGCATCCGAAGGAGGACGCACGTCCACTCGGATGGC
TAAGGGAGCTGCTAACAAAGCCCGAAAGGAAGCTGAGTTGGCTGCTGCC
ACCGCTGAGCAATAACTAGCATAACCCCTTGGGGCCTCTAAACGGGTCT
TGAGGGGTTTTTTGCTGAAAGGAGGAACTATAT.
```

Human metapneumovirus GenBank accession number AEK26895.1

(TN/94-49 F; SEQ ID NO: 5)

```
MSWKVVIIFSLLITPQHGLKESYLEESCSTITEGYLSVLRTGWYTNVFT
LEVGDVENLTCADGPSLIKTELELTKSALRELKTVSADQLAREEQIENP
RQSRFVLGAIALGVATAAAVTAGVAIAKTIRLESEVTAIKNALKKTNEA
VSTLGNGVRVLATAVRELKDFVSKNLTRAINKNKCDIDDLKMAVSFSQF
NRRFLNVVRQFSDNAGITPAISLDLMTDAELARAVSNMPTSAGQIKLML
ENRAMVRRKGFGILIGVYGSSVIYMVQLPIFGVIDTPCWIVKAAPSCSK
KKGNYACLLREDQGWYCQNAGSTVYYPNEKDCETRGDHVFCDTAAGINV
AEQSKECNINISTTNYPCKVSTGRHPISMVALSPLGALVACYKGVSCSI
GSNRVGIIKQLNKGCSYITNQDADTVTIDNTVYQLSKVEGEQHVIKGRP
VSSSFDPVKFPEDQFNVALDQVFENIENSQALVDQSNRILSSAEKGNTG
FIIVIILIAVLGSSMILVSIFIIIKKTKKQTGAPPELSGVTNNGFIPH
S.
```

In Vitro Growth of DH2 in Vero Cells and Primary Normal Human Bronchial Epithelial Cells (NHBE)

Vero cells. The media from 70% confluent Vero cells in 6-well plates was aspirated, and 0.5 mL of virus at a MOI of 0.01 or 0.5 was added to replicate wells for each of the time points to be acquired for each virus strain. The plates were rocked at room temperature for 1 h. Following infection, the virus was carefully aspirated and the monolayers washed twice with 1 mL of PBS before 2 mL of pre-warmed complete E-MEM (Vero) was added. The plates were incubated at 37° C. and 5% $CO_2$ for the duration of the time courses. Time points were acquired at 1, 12, 24 h, 2, 3, 4, 5, 6, 7, and 8 days post-infection. At each time point, the monolayers were scrapped into the supernatant, vortexed briefly, and flash frozen in liquid nitrogen before storage at −80° C.

hMPV F protein expression at 48 hours post infection at MOI 0.5 in Vero cells is shown in FIG. 2 (wildtype hMPV (1), mock (2), RSV strain OE1 (3) and hMPV vaccine candidate DH2 (4)). Equal amounts of protein were blotted.

An in vitro growth curve of hMPV in Vero cells is shown in FIG. 3A. Cells were infected at MOI 0.1 as described above in duplicates for each time point. Samples were titered on Vero cells by fluorescent focus unit (FFU) assay. FIG. 3B shows representative images of infected Vero cells.

NHBE cells were differentiated at ALI and the monolayers washed with PBS before being infected apically with 100 µL of virus at a MOI of 0.1. The virus was left to incubate for 2 h at 37° C. before removal and 3 subsequent washes with PBS. At designated time points, 150 µL of medium was incubated on the apical surface for 10 min at 37° C. before harvesting and transfer into microcentrifuge tubes. The process was repeated to yield a total of 300 µL of pooled apical wash, which was frozen in liquid nitrogen and stored at −80° C. for later titration. FFU titration was performed for all analyses in Vero cells.

Figure 4A:
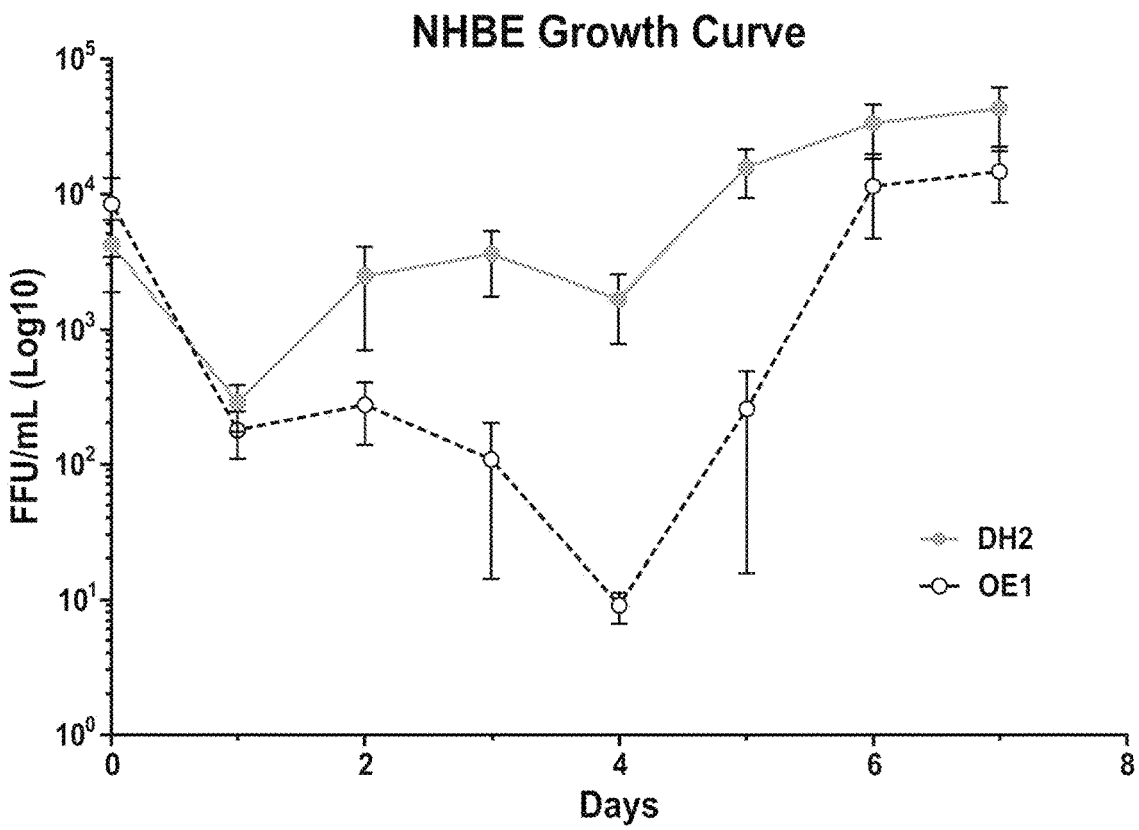
FIG. 4A shows in vitro growth curve of hMPV in primary normal bronchial epithelial (NhBE) cells for DH2 and OE1. Growth kinetics were conducted on NhBE cells. Cells were infected at MOI 0.1 in duplicates for each time point. Samples were titered on Vero cells by fluorescent focus unit (FFU) assay.
Figure 4B:
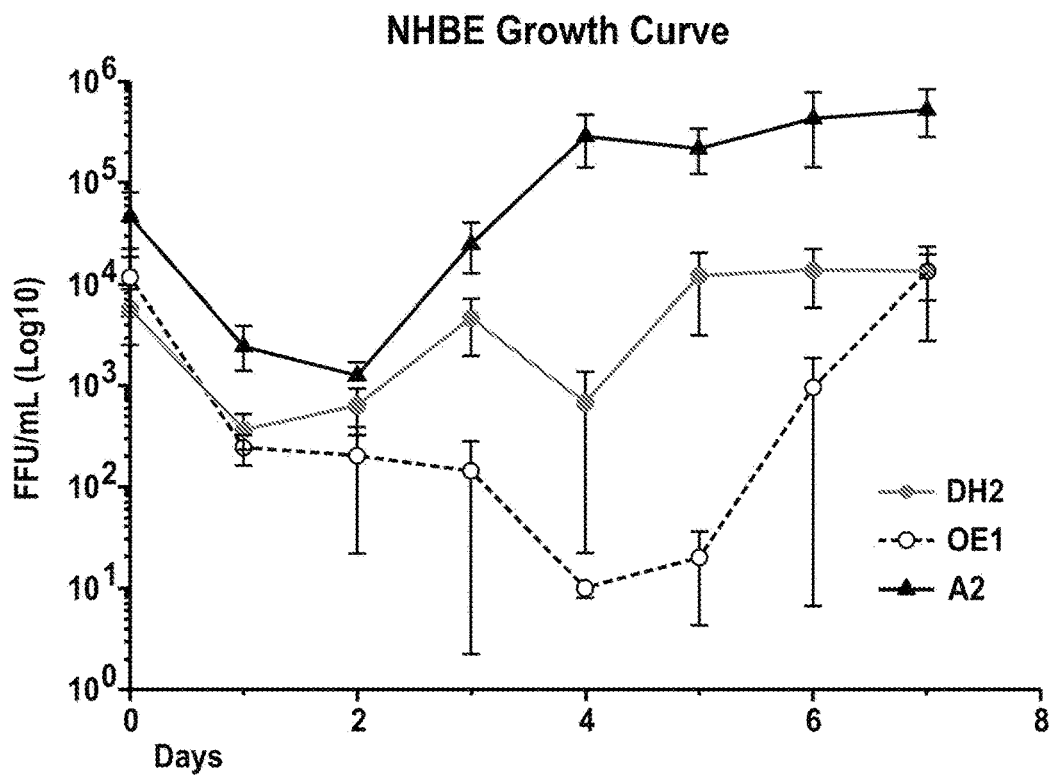
FIG. 4B shows in vitro growth curve of hMPV in primary normal bronchial epithelial (NhBE) cells for DH2, OE1 and A2.
Figure 4C:
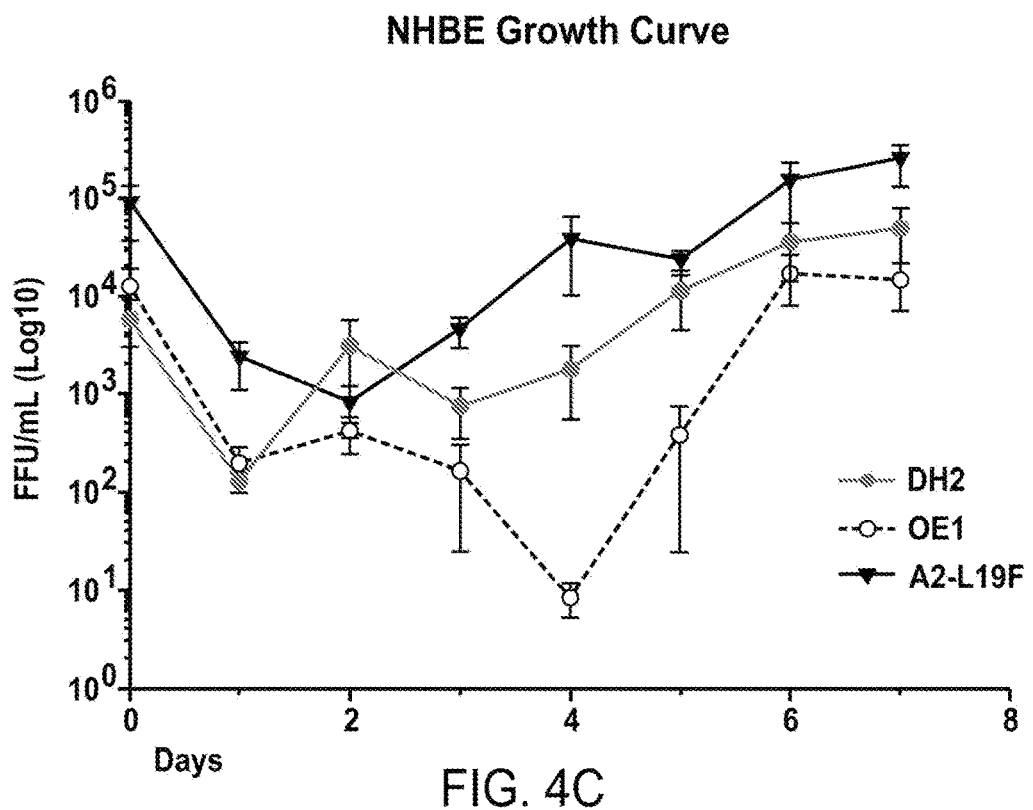
FIG. 4C shows in vitro growth curve of hMPV in primary normal bronchial epithelial (NhBE) cells for DH2, OE1 and A2-L19F.

An in vitro growth curve of hMPV in NHBE cells is shown in FIG. 4. Cells were infected at MOI 0.1 as described above in duplicates for each time point. Samples were titered on Vero cells by fluorescent focus unit (FFU) assay.

Rescue of DH2 in BSR/T7 Cells

Four chimeric hMPV constructs were generated and attempted to be rescued in BSR/T7 cells, a BHK-21 based cell line clone that stably expresses the T7 RNA polymerase. See, Buchholz et al. (1999) J Virol 73 (1): 251-259. The constructs were named DH1-4. DH1 and DH2 were constructed using the backbone of OE1 (wild type G), with DH1 having the full length hMPV F (SEQ ID NO: 5) and DH2 having the RSV-hMPV chimeric F (SEQ ID NO: 2). DH3 (full length hMPV F) and DH4 (RSV-hMPV chimeric F) were constructed using the backbone of OE4 which, like OE1, contains the codon deoptimized NS1 and NS2 and the deletion of the SH gene. See, Stobart (2016), supra. Additionally, this construct contains a codon deoptimized G gene. The hMPV F gene and the RSV-hMPV chimeric F gene contained the RQSR (SEQ ID NO: 18) to RRRR (SEQ ID NO: 19) mutation to introduce a trypsin-independent cleavage site. This mutation promotes trypsin independent growth in the virus.

The rescue was performed by simultaneous transfection of BSR/T7 cells with RSV helper plasmids (RSVP, N, M2-1, L) and the BAC plasmid containing the antigenome of the chimeric hMPV constructs. Several rescue attempts revealed that only DH2 and DH4 were able to be rescued. However, DH4, which expresses a codon deoptimized G, grew significantly slower than DH2 which indicated that this candidate was likely too attenuated for a vaccine. Constructs that contained the full length hMPV F did not grow, demonstrating that use of a chimeric form of the F protein comprising the cytoplasmic tail of the RSV F protein is advantageous for the production of an hMPV vaccine.

The invention claimed is:

1. A chimeric respiratory syncytial virus (RSV) and human metapneumovirus (hMPV) F protein comprising an hMPV F protein ectodomain, an RSV F protein cytoplasmic tail comprising SEQ ID NO: 15 or SEQ ID NO: 17, and an RSV F protein transmembrane domain, and
wherein the chimeric respiratory syncytial virus (RSV) and human metapneumovirus (hMPV) F protein comprises SEQ ID NO: 1 or a variant having greater than 93% sequence identity to SEQ ID NO: 1.

2. An immunogenic composition comprising a live chimeric virus comprising a nucleic acid encoding
a chimeric respiratory syncytial virus (RSV) and human metapneumovirus (hMPV) F protein comprising an hMPV F protein ectodomain, an RSV F protein cytoplasmic tail comprising SEQ ID NO: 15 or SEQ ID NO: 17, and an RSV F protein transmembrane domain, and
wherein the chimeric respiratory syncytial virus (RSV) and human metapneumovirus (hMPV) F protein comprises SEQ ID NO: 1 or a variant having greater than 93% sequence identity to SEQ ID NO: 1.

3. The immunogenic composition of claim 2, wherein the nucleic acid comprises SEQ ID NO: 2.

4. The immunogenic composition of claim 2, wherein the live chimeric virus does not contain a gene that encodes a respiratory syncytial virus SH protein.

5. The immunogenic composition of claim 2, further comprising an adjuvant and/or other pharmaceutically acceptable carrier.

6. The immunogenic composition of claim 5, wherein the adjuvant is an aluminum gel, an aluminum salt, or monophosphoryl lipid A.

7. The immunogenic composition of claim 5, wherein the adjuvant is an oil-in-water emulsion optionally comprising α-tocopherol, squalene, and/or a surfactant.

8. A method for immunizing a subject against a parainfluenza virus, the method comprising administering to the subject an effective amount of the immunogenic composition of claim 2.

9. A nucleic acid encoding
a chimeric respiratory syncytial virus (RSV) and human metapneumovirus (hMPV) F protein comprising an hMPV F protein ectodomain, an RSV F protein cytoplasmic tail comprising SEQ ID NO: 15 or SEQ ID NO: 17 and an RSV F protein transmembrane domain, and
wherein the chimeric respiratory syncytial virus (RSV) and human metapneumovirus (hMPV) F protein comprises SEQ ID NO: 1 or a variant having greater than 93% sequence identity to SEQ ID NO: 1.

10. The nucleic acid of claim 9 comprising SEQ ID NO: 2.

11. A vector comprising the nucleic acid of claim 9.

12. The vector of claim 11 selected from a plasmid or a bacterial artificial chromosome.

13. An isolated recombinant particle comprising the NS1 and NS2 proteins of RSV and the chimeric RSV and hMPV F protein of claim 1.

14. The isolated recombinant particle of claim 13, comprising a live attenuated chimeric RSV-hMPV genome or antigenome.

15. The chimeric RSV and hMPV F protein of claim 1 having greater than 94% identity to SEQ ID NO: 1.

16. The chimeric RSV and hMPV F protein of claim 1 having greater than 95% identity to SEQ ID NO: 1.

17. The chimeric RSV and hMPV F protein of claim 1 having greater than 96% identity to SEQ ID NO: 1.

18. The chimeric RSV and hMPV F protein of claim 1 having greater than 97% identity to SEQ ID NO: 1.

19. The chimeric RSV and hMPV F protein of claim 1 having greater than 98% identity to SEQ ID NO: 1.

20. The chimeric RSV and hMPV F protein of claim 1 having greater than 99% identity to SEQ ID NO: 1.

* * * * *

SEQUENCE LISTING

```
<160> NUMBER OF SEQ ID NOS: 35

<210> SEQ ID NO 1
<211> LENGTH: 539
<212> TYPE: PRT
<213> ORGANISM: Artificial Sequence
<220> FEATURE:
<223> OTHER INFORMATION: Synthetic construct

<400> SEQUENCE: 1

Met Ser Trp Lys Val Val Ile Ile Phe Ser Leu Leu Ile Thr Pro Gln
1               5                   10                  15

His Gly Leu Lys Glu Ser Tyr Leu Glu Glu Ser Cys Ser Thr Ile Thr
            20                  25                  30

Glu Gly Tyr Leu Ser Val Leu Arg Thr Gly Trp Tyr Thr Asn Val Phe
        35                  40                  45

Thr Leu Glu Val Gly Asp Val Glu Asn Leu Thr Cys Ala Asp Gly Pro
    50                  55                  60

Ser Leu Ile Lys Thr Glu Leu Glu Leu Thr Lys Ser Ala Leu Arg Glu
65                  70                  75                  80

Leu Lys Thr Val Ser Ala Asp Gln Leu Ala Arg Glu Glu Gln Ile Glu
                85                  90                  95

Asn Pro Arg Arg Arg Phe Val Leu Gly Ala Ile Ala Leu Gly Val
            100                 105                 110

Ala Thr Ala Ala Ala Val Thr Ala Gly Val Ala Ile Ala Lys Thr Ile
        115                 120                 125

Arg Leu Glu Ser Glu Val Thr Ala Ile Lys Asn Ala Leu Lys Lys Thr
    130                 135                 140

Asn Glu Ala Val Ser Thr Leu Gly Asn Gly Val Arg Val Leu Ala Thr
145                 150                 155                 160

Ala Val Arg Glu Leu Lys Asp Phe Val Ser Lys Asn Leu Thr Arg Ala
                165                 170                 175

Ile Asn Lys Asn Lys Cys Asp Ile Asp Asp Leu Lys Met Ala Val Ser
            180                 185                 190
```

Phe Ser Gln Phe Asn Arg Arg Phe Leu Asn Val Val Arg Gln Phe Ser
         195                 200                 205
Asp Asn Ala Gly Ile Thr Pro Ala Ile Ser Leu Asp Leu Met Thr Asp
    210                 215                 220
Ala Glu Leu Ala Arg Ala Val Ser Asn Met Pro Thr Ser Ala Gly Gln
225                 230                 235                 240
Ile Lys Leu Met Leu Glu Asn Arg Ala Met Val Arg Arg Lys Gly Phe
                245                 250                 255
Gly Ile Leu Ile Gly Val Tyr Gly Ser Ser Val Ile Tyr Met Val Gln
            260                 265                 270
Leu Pro Ile Phe Gly Val Ile Asp Thr Pro Cys Trp Ile Val Lys Ala
        275                 280                 285
Ala Pro Ser Cys Ser Lys Lys Lys Gly Asn Tyr Ala Cys Leu Leu Arg
    290                 295                 300
Glu Asp Gln Gly Trp Tyr Cys Gln Asn Ala Gly Ser Thr Val Tyr Tyr
305                 310                 315                 320
Pro Asn Glu Lys Asp Cys Glu Thr Arg Gly Asp His Val Phe Cys Asp
                325                 330                 335
Thr Ala Ala Gly Ile Asn Val Ala Glu Gln Ser Lys Glu Cys Asn Ile
            340                 345                 350
Asn Ile Ser Thr Thr Asn Tyr Pro Cys Lys Val Ser Thr Gly Arg His
        355                 360                 365
Pro Ile Ser Met Val Ala Leu Ser Pro Leu Gly Ala Leu Val Ala Cys
    370                 375                 380
Tyr Lys Gly Val Ser Cys Ser Ile Gly Ser Asn Arg Val Gly Ile Ile
385                 390                 395                 400
Lys Gln Leu Asn Lys Gly Cys Ser Tyr Ile Thr Asn Gln Asp Ala Asp
                405                 410                 415
Thr Val Thr Ile Asp Asn Thr Val Tyr Gln Leu Ser Lys Val Glu Gly
            420                 425                 430
Glu Gln His Val Ile Lys Gly Arg Pro Val Ser Ser Ser Phe Asp Pro
        435                 440                 445
Val Lys Phe Pro Glu Asp Gln Phe Asn Val Ala Leu Asp Gln Val Phe
    450                 455                 460
Glu Asn Ile Glu Asn Ser Gln Ala Leu Val Asp Gln Ser Asn Arg Ile
465                 470                 475                 480
Leu Ser Ser Ala Glu Lys Gly Asn Thr Ile Met Ile Thr Thr Ile Ile
                485                 490                 495
Ile Val Ile Ile Val Ile Leu Leu Ser Leu Ile Ala Val Gly Leu Leu
            500                 505                 510
Leu Tyr Cys Lys Ala Arg Ser Thr Pro Val Thr Leu Ser Lys Asp Gln
        515                 520                 525
Leu Ser Gly Ile Asn Asn Ile Ala Phe Ser Asn
    530                 535

<210> SEQ ID NO 2
<211> LENGTH: 1620
<212> TYPE: DNA
<213> ORGANISM: Artificial Sequence
<220> FEATURE:
<223> OTHER INFORMATION: Synthetic construct

<400> SEQUENCE: 2
atgtcctgga aagtggtgat cattttttca ttgctaataa cacctcaaca cggtcttaaa     60

-continued

```
gagagctact tggaagaatc atgtagcact ataactgagg ggtatctcag tgttctgagg      120
acaggttggt ataccaacgt ttttacatta gaggtgggtg atgtagaaaa cctcacatgt      180
gctgatggac ctagcctaat aaaaacagaa ttagaactga ccaaaagtgc actaagagag      240
ctcaaaacag tctctgctga ccaattggcg agagaggaac aaattgagaa tcccagaaga      300
agaagatttg ttctaggagc aatagcactc ggtgttgcaa cagcagctgc agttacagca      360
ggtgttgcaa ttgccaaaac catccggctt gagagtgaag tcacagcaat taagaatgcc      420
cttaaaaaga ccaatgaagc agtatctaca ttggggaatg gagttcgagt gttggcaact      480
gcagtaagag agctgaaaga ttttgtgagc aagaatttaa ctcgtgcaat caacaaaaac      540
aagtgcgaca ttgatgacct aaaaatggcc gttagcttca gtcaattcaa cagaaggttt      600
ctaaatgttg tgcggcaatt ttcagacaat gctggaataa caccagcaat atctttggac      660
ttaatgacag atgctgaact agccagggcc gtctccaaca tgccgacatc tgcaggacaa      720
ataaaattga tgttggagaa ccgtgcaatg gtgcgaagaa aggggtttgg aatcctgata      780
ggggtctacg ggagctccgt aatttacatg gtgcagctgc caatctttgg cgtcatagac      840
acgccttgct ggatagtaaa agcagccccc tcttgttcca aaaaaaaggg aaactatgct      900
tgccttttaa gagaagatca agggtggtat tgtcagaatg cagggtcaac tgtttactac      960
ccaaatgaga aagactgtga aacaagagga gaccatgtct tttgcgacac agcagcagga     1020
attaatgttg ctgagcaatc aaaagagtgc aatatcaaca tatccactac aaattaccca     1080
tgcaaagtca gcacaggaag acatcctatc agtatggttg cactgtctcc tcttggggct     1140
ctagttgctt gctacaaagg agtaagctgt ccattggca gcaatagagt agggatcatc     1200
aagcagctga acaaaggttg ctcctatata accaaccaag atgcagacac agtgacaata     1260
gacaacactg tatatcagct aagcaaagtt gagggtgaac agcatgttat aaaaggcaga     1320
ccagtgtcaa gcagctttga tccagtcaag tttcctgaag atcaattcaa tgttgcactt     1380
gaccaagttt ttgagaacat tgaaaacagc caggccttgg tggatcaatc aaacaggatc     1440
ctaagcagtg cagagaaagg gaacactatc atgataacta ctataattat agtgattata     1500
gtaatattgt tatcattaat tgctgttgga ctgctcctat actgtaaggc cagaagcaca     1560
ccagtcacac taagcaagga tcaactgagt ggtataaata atattgcatt tagtaactga     1620
```

<210> SEQ ID NO 3
<211> LENGTH: 420
<212> TYPE: DNA
<213> ORGANISM: Artificial Sequence
<220> FEATURE:
<223> OTHER INFORMATION: Synthetic construct

<400> SEQUENCE: 3

```
atgggttcga attcgctatc gatgataaaa gtacgtctac aaaatctatt tgataatgat       60
gaagtagcgc tactaaaaat aacgtgttat acggataaac taatacatct aacgaatgcg      120
ctagcgaaag cggtaataca tacgataaaa ctaaatggta tagtatttgt acatgtaata      180
acgtcgtcgg atatatgtcc gaataataat atagtagtaa aatcgaattt tacgacgatg      240
ccggtactac aaaatggtgg ttatatatgg gaaatgatgg aactaacgca ttgttcgcaa      300
ccgaatggtc tactagatga taattgtgaa ataaaatttt cgaaaaaact atcggattcg      360
acgatgacga attatatgaa tcaactatcg gaactactag gttttgatct aaatccgtaa      420
```

<210> SEQ ID NO 4
<211> LENGTH: 375

<212> TYPE: DNA
<213> ORGANISM: Artificial Sequence
<220> FEATURE:
<223> OTHER INFORMATION: Synthetic construct

<400> SEQUENCE: 4

```
atggatacga cgcataatga taatacgccg caacgtctaa tgataacgga tatgcgtccg      60
ctatcgctag aaacgataat aacgtcgcta acgcgtgata taataacgca taaatttata    120
tatctaataa atcatgaatg tatagtacgt aaactagatg aacgtcaagc gacgtttacg    180
tttctagtaa attatgaaat gaaactacta cataaagtag gttcgacgaa atataaaaaa    240
tatacggaat ataatacgaa atatggtacg tttccgatgc cgatatttat aaatcatgat    300
ggttttctag aatgtatagg tataaaaccg acgaaacata cgccgataat atataaatat    360
gatctaaatc cgtaa                                                     375
```

<210> SEQ ID NO 5
<211> LENGTH: 539
<212> TYPE: PRT
<213> ORGANISM: Homo sapiens

<400> SEQUENCE: 5

```
Met Ser Trp Lys Val Ile Ile Phe Ser Leu Leu Ile Thr Pro Gln
1               5                   10                  15

His Gly Leu Lys Glu Ser Tyr Leu Glu Glu Ser Cys Ser Thr Ile Thr
            20                  25                  30

Glu Gly Tyr Leu Ser Val Leu Arg Thr Gly Trp Tyr Thr Asn Val Phe
        35                  40                  45

Thr Leu Glu Val Gly Asp Val Glu Asn Leu Thr Cys Ala Asp Gly Pro
    50                  55                  60

Ser Leu Ile Lys Thr Glu Leu Glu Leu Thr Lys Ser Ala Leu Arg Glu
65                  70                  75                  80

Leu Lys Thr Val Ser Ala Asp Gln Leu Ala Arg Glu Glu Gln Ile Glu
                85                  90                  95

Asn Pro Arg Gln Ser Arg Phe Val Leu Gly Ala Ile Ala Leu Gly Val
            100                 105                 110

Ala Thr Ala Ala Ala Val Thr Ala Gly Val Ala Ile Ala Lys Thr Ile
        115                 120                 125

Arg Leu Glu Ser Glu Val Thr Ala Ile Lys Asn Ala Leu Lys Lys Thr
    130                 135                 140

Asn Glu Ala Val Ser Thr Leu Gly Asn Gly Val Arg Val Leu Ala Thr
145                 150                 155                 160

Ala Val Arg Glu Leu Lys Asp Phe Val Ser Lys Asn Leu Thr Arg Ala
                165                 170                 175

Ile Asn Lys Asn Lys Cys Asp Ile Asp Asp Leu Lys Met Ala Val Ser
            180                 185                 190

Phe Ser Gln Phe Asn Arg Arg Phe Leu Asn Val Val Arg Gln Phe Ser
        195                 200                 205

Asp Asn Ala Gly Ile Thr Pro Ala Ile Ser Leu Asp Leu Met Thr Asp
    210                 215                 220

Ala Glu Leu Ala Arg Ala Val Ser Asn Met Pro Thr Ser Ala Gly Gln
225                 230                 235                 240

Ile Lys Leu Met Leu Glu Asn Arg Ala Met Val Arg Arg Lys Gly Phe
                245                 250                 255

Gly Ile Leu Ile Gly Val Tyr Gly Ser Ser Val Ile Tyr Met Val Gln
            260                 265                 270
```

```
Leu Pro Ile Phe Gly Val Ile Asp Thr Pro Cys Trp Ile Val Lys Ala
    275                 280                 285

Ala Pro Ser Cys Ser Lys Lys Gly Asn Tyr Ala Cys Leu Leu Arg
    290                 295                 300

Glu Asp Gln Gly Trp Tyr Cys Gln Asn Ala Gly Ser Thr Val Tyr Tyr
305                 310                 315                 320

Pro Asn Glu Lys Asp Cys Glu Thr Arg Gly Asp His Val Phe Cys Asp
                325                 330                 335

Thr Ala Ala Gly Ile Asn Val Ala Glu Gln Ser Lys Glu Cys Asn Ile
                340                 345                 350

Asn Ile Ser Thr Thr Asn Tyr Pro Cys Lys Val Ser Thr Gly Arg His
                355                 360                 365

Pro Ile Ser Met Val Ala Leu Ser Pro Leu Gly Ala Leu Val Ala Cys
    370                 375                 380

Tyr Lys Gly Val Ser Cys Ser Ile Gly Ser Asn Arg Val Gly Ile Ile
385                 390                 395                 400

Lys Gln Leu Asn Lys Gly Cys Ser Tyr Ile Thr Asn Gln Asp Ala Asp
                405                 410                 415

Thr Val Thr Ile Asp Asn Thr Val Tyr Gln Leu Ser Lys Val Glu Gly
                420                 425                 430

Glu Gln His Val Ile Lys Gly Arg Pro Val Ser Ser Ser Phe Asp Pro
                435                 440                 445

Val Lys Phe Pro Glu Asp Gln Phe Asn Val Ala Leu Asp Gln Val Phe
    450                 455                 460

Glu Asn Ile Glu Asn Ser Gln Ala Leu Val Asp Gln Ser Asn Arg Ile
465                 470                 475                 480

Leu Ser Ser Ala Glu Lys Gly Asn Thr Gly Phe Ile Ile Val Ile Ile
                485                 490                 495

Leu Ile Ala Val Leu Gly Ser Ser Met Ile Leu Val Ser Ile Phe Ile
                500                 505                 510

Ile Ile Lys Lys Thr Lys Lys Gln Thr Gly Ala Pro Pro Glu Leu Ser
            515                 520                 525

Gly Val Thr Asn Asn Gly Phe Ile Pro His Ser
    530                 535

<210> SEQ ID NO 6
<211> LENGTH: 489
<212> TYPE: PRT
<213> ORGANISM: Artificial Sequence
<220> FEATURE:
<223> OTHER INFORMATION: Synthetic construct
<220> FEATURE:
<221> NAME/KEY: MISC_FEATURE
<222> LOCATION: (7)..(7)
<223> OTHER INFORMATION: X is I or V
<220> FEATURE:
<221> NAME/KEY: MISC_FEATURE
<222> LOCATION: (61)..(61)
<223> OTHER INFORMATION: X is A or T
<220> FEATURE:
<221> NAME/KEY: MISC_FEATURE
<222> LOCATION: (72)..(72)
<223> OTHER INFORMATION: X is E or D
<220> FEATURE:
<221> NAME/KEY: MISC_FEATURE
<222> LOCATION: (100)..(100)
<223> OTHER INFORMATION: X is R or Q
<220> FEATURE:
<221> NAME/KEY: MISC_FEATURE
<222> LOCATION: (101)..(101)
<223> OTHER INFORMATION: X is R or S
```

```
<220> FEATURE:
<221> NAME/KEY: MISC_FEATURE
<222> LOCATION: (110)..(110)
<223> OTHER INFORMATION: X is L or F
<220> FEATURE:
<221> NAME/KEY: MISC_FEATURE
<222> LOCATION: (122)..(122)
<223> OTHER INFORMATION: X is V or I
<220> FEATURE:
<221> NAME/KEY: MISC_FEATURE
<222> LOCATION: (135)..(135)
<223> OTHER INFORMATION: X is T or N
<220> FEATURE:
<221> NAME/KEY: MISC_FEATURE
<222> LOCATION: (139)..(139)
<223> OTHER INFORMATION: X is N or G
<220> FEATURE:
<221> NAME/KEY: MISC_FEATURE
<222> LOCATION: (167)..(167)
<223> OTHER INFORMATION: X is E or D
<220> FEATURE:
<221> NAME/KEY: MISC_FEATURE
<222> LOCATION: (175)..(175)
<223> OTHER INFORMATION: X is R or S
<220> FEATURE:
<221> NAME/KEY: MISC_FEATURE
<222> LOCATION: (185)..(185)
<223> OTHER INFORMATION: X is A or D
<220> FEATURE:
<221> NAME/KEY: MISC_FEATURE
<222> LOCATION: (233)..(233)
<223> OTHER INFORMATION: X is V or Y
<220> FEATURE:
<221> NAME/KEY: MISC_FEATURE
<222> LOCATION: (286)..(286)
<223> OTHER INFORMATION: X is V or I
<220> FEATURE:
<221> NAME/KEY: MISC_FEATURE
<222> LOCATION: (294)..(294)
<223> OTHER INFORMATION: X is K or E
<220> FEATURE:
<221> NAME/KEY: MISC_FEATURE
<222> LOCATION: (296)..(296)
<223> OTHER INFORMATION: X is K or R
<220> FEATURE:
<221> NAME/KEY: MISC_FEATURE
<222> LOCATION: (312)..(312)
<223> OTHER INFORMATION: X is Q or K
<220> FEATURE:
<221> NAME/KEY: MISC_FEATURE
<222> LOCATION: (348)..(348)
<223> OTHER INFORMATION: X is K or R
<220> FEATURE:
<221> NAME/KEY: MISC_FEATURE
<222> LOCATION: (404)..(404)
<223> OTHER INFORMATION: X is N or S
<220> FEATURE:
<221> NAME/KEY: MISC_FEATURE
<222> LOCATION: (444)..(444)
<223> OTHER INFORMATION: X is S or N
<220> FEATURE:
<221> NAME/KEY: MISC_FEATURE
<222> LOCATION: (449)..(449)
<223> OTHER INFORMATION: X is V or I
<220> FEATURE:
<221> NAME/KEY: MISC_FEATURE
<222> LOCATION: (450)..(450)
<223> OTHER INFORMATION: X is K or R
<220> FEATURE:
<221> NAME/KEY: MISC_FEATURE
<222> LOCATION: (470)..(470)
<223> OTHER INFORMATION: X is N or S
<220> FEATURE:
<221> NAME/KEY: MISC_FEATURE
<222> LOCATION: (482)..(482)
<223> OTHER INFORMATION: X is S or N

<400> SEQUENCE: 6
```

```
Met Ser Trp Lys Val Xaa Ile Phe Ser Leu Leu Ile Thr Pro Gln
1               5                   10                  15

His Gly Leu Lys Glu Ser Tyr Leu Glu Glu Ser Cys Ser Thr Ile Thr
            20                  25                  30

Glu Gly Tyr Leu Ser Val Leu Arg Thr Gly Trp Tyr Thr Asn Val Phe
            35                  40                  45

Thr Leu Glu Val Gly Asp Val Glu Asn Leu Thr Cys Xaa Asp Gly Pro
50                  55                  60

Ser Leu Ile Lys Thr Glu Leu Xaa Leu Thr Lys Ser Ala Leu Arg Glu
65                  70                  75                  80

Leu Lys Thr Val Ser Ala Asp Gln Leu Ala Arg Glu Glu Gln Ile Glu
                85                  90                  95

Asn Pro Arg Xaa Xaa Arg Phe Val Leu Gly Ala Ile Ala Xaa Gly Val
            100                 105                 110

Ala Thr Ala Ala Ala Val Thr Ala Gly Xaa Ala Ile Ala Lys Thr Ile
            115                 120                 125

Arg Leu Glu Ser Glu Val Xaa Ala Ile Lys Xaa Ala Leu Lys Lys Thr
            130                 135                 140

Asn Glu Ala Val Ser Thr Leu Gly Asn Gly Val Arg Val Leu Ala Thr
145                 150                 155                 160

Ala Val Arg Glu Leu Lys Xaa Phe Val Ser Lys Asn Leu Thr Xaa Ala
                165                 170                 175

Ile Asn Lys Asn Lys Cys Asp Ile Xaa Asp Leu Lys Met Ala Val Ser
            180                 185                 190

Phe Ser Gln Phe Asn Arg Arg Phe Leu Asn Val Arg Gln Phe Ser
            195                 200                 205

Asp Asn Ala Gly Ile Thr Pro Ala Ile Ser Leu Asp Leu Met Thr Asp
210                 215                 220

Ala Glu Leu Ala Arg Ala Val Ser Xaa Met Pro Thr Ser Ala Gly Gln
225                 230                 235                 240

Ile Lys Leu Met Leu Glu Asn Arg Ala Met Val Arg Arg Lys Gly Phe
            245                 250                 255

Gly Ile Leu Ile Gly Val Tyr Gly Ser Ser Val Ile Tyr Met Val Gln
            260                 265                 270

Leu Pro Ile Phe Gly Val Ile Asp Thr Pro Cys Trp Ile Xaa Lys Ala
            275                 280                 285

Ala Pro Ser Cys Ser Xaa Lys Xaa Gly Asn Tyr Ala Cys Leu Leu Arg
            290                 295                 300

Glu Asp Gln Gly Trp Tyr Cys Xaa Asn Ala Gly Ser Thr Val Tyr Tyr
305                 310                 315                 320

Pro Asn Glu Lys Asp Cys Glu Thr Arg Gly Asp His Val Phe Cys Asp
            325                 330                 335

Thr Ala Ala Gly Ile Asn Val Ala Glu Gln Ser Xaa Glu Cys Asn Ile
            340                 345                 350

Asn Ile Ser Thr Thr Asn Tyr Pro Cys Lys Val Ser Thr Gly Arg His
            355                 360                 365

Pro Ile Ser Met Val Ala Leu Ser Pro Leu Gly Ala Leu Val Ala Cys
            370                 375                 380

Tyr Lys Gly Val Ser Cys Ser Ile Gly Ser Asn Arg Val Gly Ile Ile
385                 390                 395                 400

Lys Gln Leu Xaa Lys Gly Cys Ser Tyr Ile Thr Asn Gln Asp Ala Asp
                405                 410                 415

Thr Val Thr Ile Asp Asn Thr Val Tyr Gln Leu Ser Lys Val Glu Gly
```

```
                420             425             430
Glu Gln His Val Ile Lys Gly Arg Pro Val Ser Xaa Ser Phe Asp Pro
            435                 440                 445

Xaa Xaa Phe Pro Glu Asp Gln Phe Asn Val Ala Leu Asp Gln Val Phe
    450                 455                 460

Glu Asn Ile Glu Asn Xaa Gln Ala Leu Val Asp Gln Ser Asn Arg Ile
465                 470                 475                 480

Leu Xaa Ser Ala Glu Lys Gly Asn Thr
                485
```

```
<210> SEQ ID NO 7
<211> LENGTH: 50
<212> TYPE: PRT
<213> ORGANISM: Artificial Sequence
<220> FEATURE:
<223> OTHER INFORMATION: Synthetic construct
<220> FEATURE:
<221> NAME/KEY: MISC_FEATURE
<222> LOCATION: (1)..(1)
<223> OTHER INFORMATION: X is S or L
<220> FEATURE:
<221> NAME/KEY: MISC_FEATURE
<222> LOCATION: (16)..(16)
<223> OTHER INFORMATION: X is I or V
<220> FEATURE:
<221> NAME/KEY: MISC_FEATURE
<222> LOCATION: (33)..(33)
<223> OTHER INFORMATION: X is V or I

<400> SEQUENCE: 7

Xaa Met Ile Thr Thr Ile Ile Ile Val Ile Ile Val Ile Leu Leu Xaa
1               5                   10                  15

Leu Ile Ala Val Gly Leu Leu Leu Tyr Cys Lys Ala Arg Ser Thr Pro
            20                  25                  30

Xaa Thr Leu Ser Lys Asp Gln Leu Ser Gly Ile Asn Asn Ile Ala Phe
        35                  40                  45

Ser Asn
    50
```

```
<210> SEQ ID NO 8
<211> LENGTH: 489
<212> TYPE: PRT
<213> ORGANISM: Homo sapiens

<400> SEQUENCE: 8

Met Ser Trp Lys Val Val Ile Ile Phe Ser Leu Leu Ile Thr Pro Gln
1               5                   10                  15

His Gly Leu Lys Glu Ser Tyr Leu Glu Glu Ser Cys Ser Thr Ile Thr
            20                  25                  30

Glu Gly Tyr Leu Ser Val Leu Arg Thr Gly Trp Tyr Thr Asn Val Phe
        35                  40                  45

Thr Leu Glu Val Gly Asp Val Glu Asn Leu Thr Cys Ala Asp Gly Pro
    50                  55                  60

Ser Leu Ile Lys Thr Glu Leu Glu Leu Thr Lys Ser Ala Leu Arg Glu
65                  70                  75                  80

Leu Lys Thr Val Ser Ala Asp Gln Leu Ala Arg Glu Glu Gln Ile Glu
                85                  90                  95

Asn Pro Arg Arg Arg Arg Phe Val Leu Gly Ala Ile Ala Leu Gly Val
            100                 105                 110

Ala Thr Ala Ala Ala Val Thr Ala Gly Val Ala Ile Ala Lys Thr Ile
        115                 120                 125
```

-continued

Arg Leu Glu Ser Glu Val Thr Ala Ile Lys Asn Ala Leu Lys Lys Thr
130                 135                 140

Asn Glu Ala Val Ser Thr Leu Gly Asn Gly Val Arg Val Leu Ala Thr
145                 150                 155                 160

Ala Val Arg Glu Leu Lys Asp Phe Val Ser Lys Asn Leu Thr Arg Ala
        165                 170                 175

Ile Asn Lys Asn Lys Cys Asp Ile Asp Asp Leu Lys Met Ala Val Ser
            180                 185                 190

Phe Ser Gln Phe Asn Arg Arg Phe Leu Asn Val Val Arg Gln Phe Ser
        195                 200                 205

Asp Asn Ala Gly Ile Thr Pro Ala Ile Ser Leu Asp Leu Met Thr Asp
210                 215                 220

Ala Glu Leu Ala Arg Ala Val Ser Asn Met Pro Thr Ser Ala Gly Gln
225                 230                 235                 240

Ile Lys Leu Met Leu Glu Asn Arg Ala Met Val Arg Arg Lys Gly Phe
                245                 250                 255

Gly Ile Leu Ile Gly Val Tyr Gly Ser Ser Val Ile Tyr Met Val Gln
            260                 265                 270

Leu Pro Ile Phe Gly Val Ile Asp Thr Pro Cys Trp Ile Val Lys Ala
        275                 280                 285

Ala Pro Ser Cys Ser Lys Lys Gly Asn Tyr Ala Cys Leu Leu Arg
290                 295                 300

Glu Asp Gln Gly Trp Tyr Cys Gln Asn Ala Gly Ser Thr Val Tyr Tyr
305                 310                 315                 320

Pro Asn Glu Lys Asp Cys Glu Thr Arg Gly Asp His Val Phe Cys Asp
                325                 330                 335

Thr Ala Ala Gly Ile Asn Val Ala Glu Gln Ser Lys Glu Cys Asn Ile
            340                 345                 350

Asn Ile Ser Thr Thr Asn Tyr Pro Cys Lys Val Ser Thr Gly Arg His
        355                 360                 365

Pro Ile Ser Met Val Ala Leu Ser Pro Leu Gly Ala Leu Val Ala Cys
370                 375                 380

Tyr Lys Gly Val Ser Cys Ser Ile Gly Ser Asn Arg Val Gly Ile Ile
385                 390                 395                 400

Lys Gln Leu Asn Lys Gly Cys Ser Tyr Ile Thr Asn Gln Asp Ala Asp
                405                 410                 415

Thr Val Thr Ile Asp Asn Thr Val Tyr Gln Leu Ser Lys Val Glu Gly
            420                 425                 430

Glu Gln His Val Ile Lys Gly Arg Pro Val Ser Ser Phe Asp Pro
        435                 440                 445

Val Lys Phe Pro Glu Asp Gln Phe Asn Val Ala Leu Asp Gln Val Phe
450                 455                 460

Glu Asn Ile Glu Asn Ser Gln Ala Leu Val Asp Gln Ser Asn Arg Ile
465                 470                 475                 480

Leu Ser Ser Ala Glu Lys Gly Asn Thr
                485

<210> SEQ ID NO 9
<211> LENGTH: 489
<212> TYPE: PRT
<213> ORGANISM: Homo sapiens

<400> SEQUENCE: 9

Met Ser Trp Lys Val Met Ile Ile Ile Ser Leu Leu Ile Thr Pro Gln

-continued

```
1               5                   10                  15
His Gly Leu Lys Glu Ser Tyr Leu Glu Ser Cys Ser Thr Ile Thr
                20                  25              30
Glu Gly Tyr Leu Ser Val Leu Arg Thr Gly Trp Tyr Thr Asn Val Phe
                35                  40                  45
Thr Leu Glu Val Gly Asp Val Glu Asn Leu Thr Cys Thr Asp Gly Pro
        50                  55                  60
Ser Leu Ile Lys Thr Glu Leu Asp Leu Thr Lys Ser Ala Leu Arg Glu
65                  70                  75                  80
Leu Lys Thr Val Ser Ala Asp Gln Leu Ala Arg Glu Glu Gln Ile Glu
                    85                  90                  95
Asn Pro Arg Gln Ser Arg Phe Val Leu Gly Ala Ile Ala Leu Gly Val
                100                 105                 110
Ala Thr Ala Ala Ala Val Thr Ala Gly Ile Ala Ile Ala Lys Thr Ile
                115                 120                 125
Arg Leu Glu Ser Glu Val Asn Ala Ile Lys Gly Ala Leu Lys Lys Thr
        130                 135                 140
Asn Glu Ala Val Ser Thr Leu Gly Asn Gly Val Arg Val Leu Ala Thr
145                 150                 155                 160
Ala Val Arg Glu Leu Lys Glu Phe Val Ser Lys Asn Leu Thr Ser Ala
                    165                 170                 175
Ile Asn Lys Asn Lys Cys Asp Ile Ala Asp Leu Lys Met Ala Val Ser
                180                 185                 190
Phe Ser Gln Phe Asn Arg Arg Phe Leu Asn Val Val Arg Gln Phe Ser
            195                 200                 205
Asp Asn Ala Gly Ile Thr Pro Ala Ile Ser Leu Asp Leu Met Thr Asp
        210                 215                 220
Ala Glu Leu Ala Arg Ala Val Ser Tyr Met Pro Thr Ser Ala Gly Gln
225                 230                 235                 240
Ile Lys Leu Met Leu Glu Asn Arg Ala Met Val Arg Arg Lys Gly Phe
                245                 250                 255
Gly Ile Leu Ile Gly Val Tyr Gly Ser Ser Val Ile Tyr Met Val Gln
                260                 265                 270
Leu Pro Ile Phe Gly Val Ile Asp Thr Pro Cys Trp Ile Ile Lys Ala
            275                 280                 285
Ala Pro Ser Cys Ser Glu Lys Asp Gly Asn Tyr Ala Cys Leu Leu Arg
        290                 295                 300
Glu Asp Gln Gly Trp Tyr Cys Lys Asn Ala Gly Ser Thr Val Tyr Tyr
305                 310                 315                 320
Pro Asn Glu Lys Asp Cys Glu Thr Arg Gly Asp His Val Phe Cys Asp
                325                 330                 335
Thr Ala Ala Gly Ile Asn Val Ala Glu Gln Ser Arg Glu Cys Asn Ile
                340                 345                 350
Asn Ile Ser Thr Thr Asn Tyr Pro Cys Lys Val Ser Thr Gly Arg His
        355                 360                 365
Pro Ile Ser Met Val Ala Leu Ser Pro Leu Gly Ala Leu Val Ala Cys
        370                 375                 380
Tyr Lys Gly Val Ser Cys Ser Ile Gly Ser Asn Arg Val Gly Ile Ile
385                 390                 395                 400
Lys Gln Leu Pro Lys Gly Cys Ser Tyr Ile Thr Asn Gln Asp Ala Asp
                405                 410                 415
Thr Val Thr Ile Asp Asn Thr Val Tyr Gln Leu Ser Lys Val Glu Gly
                420                 425                 430
```

```
Glu Gln His Val Ile Lys Gly Arg Pro Val Ser Ser Phe Asp Pro
        435                 440                 445

Ile Arg Phe Pro Glu Asp Gln Phe Asn Val Ala Leu Asp Gln Val Phe
    450                 455                 460

Glu Ser Ile Glu Asn Ser Gln Ala Leu Val Asp Gln Ser Asn Lys Ile
465                 470                 475                 480

Leu Asn Ser Ala Glu Lys Gly Asn Thr
            485

<210> SEQ ID NO 10
<211> LENGTH: 24
<212> TYPE: PRT
<213> ORGANISM: Homo sapiens

<400> SEQUENCE: 10

Ile Met Ile Thr Thr Ile Ile Val Ile Ile Val Ile Leu Leu Ser
1               5                   10                  15

Leu Ile Ala Val Gly Leu Leu Leu
            20

<210> SEQ ID NO 11
<211> LENGTH: 26
<212> TYPE: PRT
<213> ORGANISM: Homo sapiens

<400> SEQUENCE: 11

Ile Met Ile Thr Thr Ile Ile Val Ile Val Ile Leu Leu Ser
1               5                   10                  15

Leu Ile Ala Val Gly Leu Leu Leu Tyr Cys
            20                  25

<210> SEQ ID NO 12
<211> LENGTH: 26
<212> TYPE: PRT
<213> ORGANISM: Homo sapiens

<400> SEQUENCE: 12

Ile Met Ile Thr Ala Ile Ile Ile Val Ile Ile Val Val Leu Leu Ser
1               5                   10                  15

Leu Ile Ala Ile Gly Leu Leu Leu Tyr Cys
            20                  25

<210> SEQ ID NO 13
<211> LENGTH: 24
<212> TYPE: PRT
<213> ORGANISM: Homo sapiens

<400> SEQUENCE: 13

Ile Met Ile Thr Ala Ile Ile Ile Val Ile Ile Val Val Leu Leu Ser
1               5                   10                  15

Leu Ile Ala Ile Gly Leu Leu Leu
            20

<210> SEQ ID NO 14
<211> LENGTH: 26
<212> TYPE: PRT
<213> ORGANISM: Homo sapiens

<400> SEQUENCE: 14

Tyr Cys Lys Ala Arg Ser Thr Pro Val Thr Leu Ser Lys Asp Gln Leu
1               5                   10                  15
```

Ser Gly Ile Asn Asn Ile Ala Phe Ser Asn
            20                  25

<210> SEQ ID NO 15
<211> LENGTH: 24
<212> TYPE: PRT
<213> ORGANISM: Homo sapiens

<400> SEQUENCE: 15

Lys Ala Arg Ser Thr Pro Val Thr Leu Ser Lys Asp Gln Leu Ser Gly
1               5                   10                  15

Ile Asn Asn Ile Ala Phe Ser Asn
            20

<210> SEQ ID NO 16
<211> LENGTH: 26
<212> TYPE: PRT
<213> ORGANISM: Homo sapiens

<400> SEQUENCE: 16

Tyr Cys Lys Ala Lys Asn Thr Pro Val Thr Leu Ser Lys Asp Gln Leu
1               5                   10                  15

Ser Gly Ile Asn Asn Ile Ala Phe Ser Lys
            20                  25

<210> SEQ ID NO 17
<211> LENGTH: 24
<212> TYPE: PRT
<213> ORGANISM: Homo sapiens

<400> SEQUENCE: 17

Lys Ala Lys Asn Thr Pro Val Thr Leu Ser Lys Asp Gln Leu Ser Gly
1               5                   10                  15

Ile Asn Asn Ile Ala Phe Ser Lys
            20

<210> SEQ ID NO 18
<211> LENGTH: 4
<212> TYPE: PRT
<213> ORGANISM: Artificial Sequence
<220> FEATURE:
<223> OTHER INFORMATION: Synthetic construct

<400> SEQUENCE: 18

Arg Gln Ser Arg
1

<210> SEQ ID NO 19
<211> LENGTH: 4
<212> TYPE: PRT
<213> ORGANISM: Artificial Sequence
<220> FEATURE:
<223> OTHER INFORMATION: Synthetic construct

<400> SEQUENCE: 19

Arg Arg Arg Arg
1

<210> SEQ ID NO 20
<211> LENGTH: 539
<212> TYPE: PRT
<213> ORGANISM: Homo sapiens

<400> SEQUENCE: 20

```
Met Ser Trp Lys Val Val Ile Ile Phe Ser Leu Leu Ile Thr Pro Gln
1               5                   10                  15

His Gly Leu Lys Glu Ser Tyr Leu Glu Glu Ser Cys Ser Thr Ile Thr
                20                  25                  30

Glu Gly Tyr Leu Ser Val Leu Arg Thr Gly Trp Tyr Thr Asn Val Phe
            35                  40                  45

Thr Leu Glu Val Gly Asp Val Glu Asn Leu Thr Cys Ala Asp Gly Pro
        50                  55                  60

Ser Leu Ile Lys Thr Glu Leu Glu Leu Thr Lys Ser Ala Leu Arg Glu
65                  70                  75                  80

Leu Lys Thr Val Ser Ala Asp Gln Leu Ala Arg Glu Glu Gln Ile Glu
                85                  90                  95

Asn Pro Arg Gln Ser Arg Phe Val Leu Gly Ala Ile Ala Leu Gly Val
            100                 105                 110

Ala Thr Ala Ala Ala Val Thr Ala Gly Val Ala Ile Ala Lys Thr Ile
        115                 120                 125

Arg Leu Glu Ser Glu Val Thr Ala Ile Lys Asn Ala Leu Lys Lys Thr
    130                 135                 140

Asn Glu Ala Val Ser Thr Leu Gly Asn Gly Val Arg Val Leu Ala Thr
145                 150                 155                 160

Ala Val Arg Glu Leu Lys Asp Phe Val Ser Lys Asn Leu Thr Arg Ala
                165                 170                 175

Ile Asn Lys Asn Lys Cys Asp Ile Asp Asp Leu Lys Met Ala Val Ser
            180                 185                 190

Phe Ser Gln Phe Asn Arg Arg Phe Leu Asn Val Val Arg Gln Phe Ser
        195                 200                 205

Asp Asn Ala Gly Ile Thr Pro Ala Ile Ser Leu Asp Leu Met Thr Asp
210                 215                 220

Ala Glu Leu Ala Arg Ala Val Ser Asn Met Pro Thr Ser Ala Gly Gln
225                 230                 235                 240

Ile Lys Leu Met Leu Glu Asn Arg Ala Met Val Arg Arg Lys Gly Phe
                245                 250                 255

Gly Ile Leu Ile Gly Val Tyr Gly Ser Ser Val Ile Tyr Met Val Gln
            260                 265                 270

Leu Pro Ile Phe Gly Val Ile Asp Thr Pro Cys Trp Ile Val Lys Ala
        275                 280                 285

Ala Pro Ser Cys Ser Lys Lys Lys Gly Asn Tyr Ala Cys Leu Leu Arg
    290                 295                 300

Glu Asp Gln Gly Trp Tyr Cys Gln Asn Ala Gly Ser Thr Val Tyr Tyr
305                 310                 315                 320

Pro Asn Glu Lys Asp Cys Glu Thr Arg Gly Asp His Val Phe Cys Asp
                325                 330                 335

Thr Ala Ala Gly Ile Asn Val Ala Glu Gln Ser Lys Glu Cys Asn Ile
            340                 345                 350

Asn Ile Ser Thr Thr Asn Tyr Pro Cys Lys Val Ser Thr Gly Arg His
        355                 360                 365

Pro Ile Ser Met Val Ala Leu Ser Pro Leu Gly Ala Leu Val Ala Cys
    370                 375                 380

Tyr Lys Gly Val Ser Cys Ser Ile Gly Ser Asn Arg Val Gly Ile Ile
385                 390                 395                 400

Lys Gln Leu Asn Lys Gly Cys Ser Tyr Ile Thr Asn Gln Asp Ala Asp
                405                 410                 415
```

-continued

```
Thr Val Thr Ile Asp Asn Thr Val Tyr Gln Leu Ser Lys Val Glu Gly
            420                 425                 430

Glu Gln His Val Ile Lys Gly Arg Pro Val Ser Ser Phe Asp Pro
        435                 440                 445

Val Lys Phe Pro Glu Asp Gln Phe Asn Val Ala Leu Asp Gln Val Phe
    450                 455                 460

Glu Asn Ile Glu Asn Ser Gln Ala Leu Val Asp Gln Ser Asn Arg Ile
465                 470                 475                 480

Leu Ser Ser Ala Glu Lys Gly Asn Thr Gly Phe Ile Val Ile Ile
                485                 490                 495

Leu Ile Ala Val Leu Gly Ser Ser Met Ile Leu Val Ser Ile Phe Ile
                500                 505                 510

Ile Ile Lys Lys Thr Lys Lys Gln Thr Gly Ala Pro Pro Glu Leu Ser
        515                 520                 525

Gly Val Thr Asn Asn Gly Phe Ile Pro His Ser
        530                 535

<210> SEQ ID NO 21
<211> LENGTH: 539
<212> TYPE: PRT
<213> ORGANISM: Homo sapiens

<400> SEQUENCE: 21

Met Ser Trp Lys Val Val Ile Ile Phe Ser Leu Leu Ile Thr Pro Gln
1               5                   10                  15

His Gly Leu Lys Glu Ser Tyr Leu Glu Glu Ser Cys Ser Thr Ile Thr
            20                  25                  30

Glu Gly Tyr Leu Ser Val Leu Arg Thr Gly Trp Tyr Thr Asn Val Phe
        35                  40                  45

Thr Leu Glu Val Gly Asp Val Glu Asn Leu Thr Cys Ala Asp Gly Pro
    50                  55                  60

Ser Leu Ile Lys Thr Glu Leu Asp Leu Thr Lys Ser Ala Leu Arg Glu
65                  70                  75                  80

Leu Arg Thr Val Ser Ala Asp Gln Leu Ala Arg Glu Glu Gln Ile Glu
                85                  90                  95

Asn Pro Arg Gln Ser Arg Phe Val Leu Gly Ala Ile Ala Leu Gly Val
            100                 105                 110

Ala Thr Ala Ala Ala Val Thr Ala Gly Val Ala Ile Ala Lys Thr Ile
        115                 120                 125

Arg Leu Glu Ser Glu Val Thr Ala Ile Lys Asn Ala Leu Lys Lys Thr
    130                 135                 140

Asn Glu Ala Val Ser Thr Leu Gly Asn Gly Val Arg Val Leu Ala Thr
145                 150                 155                 160

Ala Val Arg Glu Leu Lys Asp Phe Val Ser Lys Asn Leu Thr Arg Ala
                165                 170                 175

Ile Asn Lys Asn Lys Cys Asp Ile Ala Asp Leu Lys Met Ala Val Ser
            180                 185                 190

Phe Ser Gln Phe Asn Arg Arg Phe Leu Asn Val Val Arg Gln Phe Ser
        195                 200                 205

Asp Asn Ala Gly Ile Thr Pro Ala Ile Ser Leu Asp Leu Met Thr Asp
    210                 215                 220

Ala Glu Leu Ala Arg Ala Val Ser Asn Met Pro Thr Ser Ala Gly Gln
225                 230                 235                 240

Ile Lys Leu Met Leu Glu Asn Arg Ala Met Val Arg Arg Lys Gly Phe
                245                 250                 255
```

Gly Ile Pro Ile Gly Val Tyr Gly Ser Ser Val Ile Tyr Met Val Gln
            260                 265                 270

Leu Pro Ile Phe Gly Val Ile Asp Thr Pro Cys Trp Ile Val Lys Ala
            275                 280                 285

Ala Pro Ser Cys Ser Glu Lys Lys Gly Asn Tyr Ala Cys Leu Leu Arg
290                 295                 300

Glu Asp Gln Gly Trp Tyr Cys Gln Asn Ala Gly Ser Thr Val Tyr Tyr
305                 310                 315                 320

Pro Asn Glu Lys Asp Cys Glu Thr Arg Gly Asp His Val Phe Cys Asp
                325                 330                 335

Thr Ala Ala Gly Ile Asn Val Ala Glu Gln Ser Lys Glu Cys Asn Ile
            340                 345                 350

Asn Ile Ser Thr Thr Asn Tyr Pro Cys Lys Val Ser Thr Gly Arg His
            355                 360                 365

Pro Ile Ser Met Val Ala Leu Ser Pro Leu Gly Ala Leu Val Ala Cys
            370                 375                 380

Tyr Lys Gly Val Ser Cys Ser Ile Gly Ser Asn Arg Val Gly Ile Ile
385                 390                 395                 400

Lys Gln Leu Asn Lys Gly Cys Ser Tyr Ile Thr Asn Gln Asp Ala Asp
                405                 410                 415

Thr Val Thr Ile Asp Asn Thr Val Tyr Gln Leu Ser Lys Val Glu Gly
            420                 425                 430

Glu Gln His Val Ile Lys Gly Arg Pro Val Ser Ser Ser Phe Asp Pro
            435                 440                 445

Val Lys Phe Pro Glu Asp Gln Phe Asn Val Ala Leu Asp Gln Val Phe
            450                 455                 460

Glu Ser Ile Glu Asn Ser Gln Ala Leu Val Asp Gln Ser Asn Arg Ile
465                 470                 475                 480

Leu Ser Ser Ala Glu Lys Gly Asn Thr Gly Phe Ile Ile Val Ile Ile
                485                 490                 495

Leu Thr Ala Val Leu Gly Ser Thr Met Ile Leu Val Ser Val Phe Ile
            500                 505                 510

Ile Ile Lys Lys Thr Lys Lys Pro Thr Gly Ala Pro Pro Glu Leu Ser
            515                 520                 525

Gly Val Thr Asn Asn Gly Phe Ile Pro His Asn
            530                 535

<210> SEQ ID NO 22
<211> LENGTH: 539
<212> TYPE: PRT
<213> ORGANISM: Homo sapiens

<400> SEQUENCE: 22

Met Ser Trp Lys Val Met Ile Ile Ile Ser Leu Leu Ile Thr Pro Gln
1               5                   10                  15

His Gly Leu Lys Glu Ser Tyr Leu Glu Glu Ser Cys Ser Thr Ile Thr
            20                  25                  30

Glu Gly Tyr Leu Ser Val Leu Arg Thr Gly Trp Tyr Thr Asn Val Phe
        35                  40                  45

Thr Leu Glu Val Gly Asp Val Glu Asn Leu Thr Cys Thr Asp Gly Pro
    50                  55                  60

Ser Leu Ile Lys Thr Glu Leu Asp Leu Thr Lys Ser Ala Leu Arg Glu
65                  70                  75                  80

Leu Lys Thr Val Ser Ala Asp Gln Leu Ala Arg Glu Glu Gln Ile Glu

-continued

```
                85                  90                  95
Asn Pro Arg Gln Ser Arg Phe Val Leu Gly Ala Ile Ala Leu Gly Val
                   100                 105                 110
Ala Thr Ala Ala Ala Val Thr Ala Gly Ile Ala Ile Ala Lys Thr Ile
                   115                 120                 125
Arg Leu Glu Ser Glu Val Asn Ala Ile Lys Gly Ala Leu Lys Gln Thr
                   130                 135                 140
Asn Glu Ala Val Ser Thr Leu Gly Asn Gly Val Arg Val Leu Ala Thr
145                 150                 155                 160
Ala Val Arg Glu Leu Lys Glu Phe Val Ser Lys Asn Leu Thr Ser Ala
                   165                 170                 175
Ile Asn Lys Asn Lys Cys Asp Ile Ala Asp Leu Lys Met Ala Val Ser
                   180                 185                 190
Phe Ser Gln Phe Asn Arg Arg Phe Leu Asn Val Val Arg Gln Phe Ser
                   195                 200                 205
Asp Asn Ala Gly Ile Thr Pro Ala Ile Ser Leu Asp Leu Met Thr Asp
                   210                 215                 220
Ala Glu Leu Ala Arg Ala Val Ser Tyr Met Pro Thr Ser Ala Gly Gln
225                 230                 235                 240
Ile Lys Leu Met Leu Glu Asn Arg Ala Met Val Arg Arg Lys Gly Phe
                   245                 250                 255
Gly Ile Leu Ile Gly Val Tyr Gly Ser Ser Val Ile Tyr Met Val Gln
                   260                 265                 270
Leu Pro Ile Phe Gly Val Ile Asp Thr Pro Cys Trp Ile Ile Lys Ala
                   275                 280                 285
Ala Pro Ser Cys Ser Glu Lys Asn Gly Asn Tyr Ala Cys Leu Leu Arg
                   290                 295                 300
Glu Asp Gln Gly Trp Tyr Cys Lys Asn Ala Gly Ser Thr Val Tyr Tyr
305                 310                 315                 320
Pro Asn Glu Lys Asp Cys Glu Thr Arg Gly Asp His Val Phe Cys Asp
                   325                 330                 335
Thr Ala Ala Gly Ile Asn Val Ala Glu Gln Ser Arg Glu Cys Asn Ile
                   340                 345                 350
Asn Ile Ser Thr Thr Asn Tyr Pro Cys Lys Val Ser Thr Gly Gly His
                   355                 360                 365
Pro Ile Ser Met Val Ala Leu Ser Pro Leu Gly Ala Leu Val Ala Cys
                   370                 375                 380
Tyr Lys Gly Val Ser Cys Ser Ile Gly Ser Asn Arg Val Gly Ile Ile
385                 390                 395                 400
Lys Gln Leu Pro Lys Gly Cys Ser Tyr Ile Thr Asn Gln Asp Ala Asp
                   405                 410                 415
Thr Val Thr Ile Asp Asn Thr Val Tyr Gln Leu Ser Lys Val Glu Gly
                   420                 425                 430
Glu Gln His Val Ile Lys Gly Arg Pro Val Ser Ser Ser Phe Asp Pro
                   435                 440                 445
Ile Arg Phe Pro Glu Asp Gln Phe Asn Val Ala Leu Asp Gln Val Phe
                   450                 455                 460
Glu Ser Ile Glu Asn Ser Gln Ala Leu Val Asp Gln Ser Asn Arg Ile
465                 470                 475                 480
Leu Asn Ser Ala Glu Lys Gly Asn Thr Gly Phe Ile Ile Val Ile Ile
                   485                 490                 495
Leu Val Ala Val Leu Gly Leu Thr Met Ile Ser Val Ser Ile Ile Ile
                   500                 505                 510
```

```
Ile Ile Lys Lys Thr Lys Lys Pro Lys Gly Ala Pro Pro Glu Leu Asn
            515                 520                 525

Gly Val Thr Asn Gly Gly Phe Ile Pro His Ser
    530                 535
```

<210> SEQ ID NO 23
<211> LENGTH: 539
<212> TYPE: PRT
<213> ORGANISM: Homo sapiens

<400> SEQUENCE: 23

```
Met Ser Trp Lys Val Met Ile Ile Ser Leu Leu Ile Thr Pro Gln
1               5                   10                  15

His Gly Leu Lys Glu Ser Tyr Leu Glu Glu Ser Cys Ser Thr Ile Thr
                20                  25                  30

Glu Gly Tyr Leu Ser Val Leu Arg Thr Gly Trp Tyr Thr Asn Val Phe
                35                  40                  45

Thr Leu Glu Val Gly Asp Val Glu Asn Leu Thr Cys Thr Asp Gly Pro
    50                  55                  60

Ser Leu Ile Lys Thr Glu Leu Asp Leu Thr Lys Ser Ala Leu Arg Glu
65                  70                  75                  80

Leu Lys Thr Val Ser Ala Asp Gln Leu Ala Arg Glu Glu Gln Ile Glu
                85                  90                  95

Asn Pro Arg Gln Ser Arg Phe Val Leu Gly Ala Ile Ala Leu Gly Val
                100                 105                 110

Ala Thr Ala Ala Ala Val Thr Ala Gly Ile Ala Ile Ala Lys Thr Ile
                115                 120                 125

Arg Leu Glu Ser Glu Val Asn Ala Ile Lys Gly Ala Leu Lys Lys Thr
                130                 135                 140

Asn Glu Ala Val Ser Thr Leu Gly Asn Gly Val Arg Val Leu Ala Thr
145                 150                 155                 160

Ala Val Arg Glu Leu Lys Glu Phe Val Ser Lys Asn Leu Thr Ser Ala
                165                 170                 175

Ile Asn Lys Asn Lys Cys Asp Ile Ala Asp Leu Lys Met Ala Val Ser
                180                 185                 190

Phe Ser Gln Phe Asn Arg Arg Phe Leu Asn Val Val Arg Gln Phe Ser
                195                 200                 205

Asp Asn Ala Gly Ile Thr Pro Ala Ile Ser Leu Asp Leu Met Thr Asp
                210                 215                 220

Ala Glu Leu Ala Arg Ala Val Ser Tyr Met Pro Thr Ser Ala Gly Gln
225                 230                 235                 240

Ile Lys Leu Met Leu Glu Asn Arg Ala Met Val Arg Arg Lys Gly Phe
                245                 250                 255

Gly Ile Leu Ile Gly Val Tyr Gly Ser Ser Val Ile Tyr Met Val Gln
                260                 265                 270

Leu Pro Ile Phe Gly Val Ile Asp Thr Pro Cys Trp Ile Ile Lys Ala
                275                 280                 285

Ala Pro Ser Cys Ser Glu Lys Asp Gly Asn Tyr Ala Cys Leu Leu Arg
                290                 295                 300

Glu Asp Gln Gly Trp Tyr Cys Lys Asn Ala Gly Ser Thr Val Tyr Tyr
305                 310                 315                 320

Pro Asn Glu Lys Asp Cys Glu Thr Arg Gly Asp His Val Phe Cys Asp
                325                 330                 335

Thr Ala Ala Gly Ile Asn Val Ala Glu Gln Ser Arg Glu Cys Asn Ile
```

```
                    340                 345                 350
Asn Ile Ser Thr Thr Asn Tyr Pro Cys Lys Val Ser Thr Gly Arg His
                355                 360                 365

Pro Ile Ser Met Val Ala Leu Ser Pro Leu Gly Ala Leu Val Ala Cys
    370                 375                 380

Tyr Lys Gly Val Ser Cys Ser Ile Gly Ser Asn Arg Val Gly Ile Ile
385                 390                 395                 400

Lys Gln Leu Pro Lys Gly Cys Ser Tyr Ile Thr Asn Gln Asp Ala Asp
                405                 410                 415

Thr Val Thr Ile Asp Asn Thr Val Tyr Gln Leu Ser Lys Val Glu Gly
        420                 425                 430

Glu Gln His Val Ile Lys Gly Arg Pro Val Ser Ser Phe Asp Pro
            435                 440                 445

Ile Arg Phe Pro Glu Asp Gln Phe Asn Val Ala Leu Asp Gln Val Phe
    450                 455                 460

Glu Ser Ile Glu Asn Ser Gln Ala Leu Val Asp Gln Ser Asn Lys Ile
465                 470                 475                 480

Leu Asn Ser Ala Glu Lys Gly Asn Thr Gly Phe Ile Ile Val Ile Ile
                485                 490                 495

Leu Ile Ala Val Leu Gly Leu Thr Met Ile Ser Val Ser Ile Ile Ile
        500                 505                 510

Ile Ile Lys Lys Thr Arg Lys Pro Thr Gly Ala Pro Pro Glu Leu Asn
            515                 520                 525

Gly Val Thr Asn Gly Gly Phe Ile Pro His Ser
530                 535
```

<210> SEQ ID NO 24
<211> LENGTH: 539
<212> TYPE: PRT
<213> ORGANISM: Homo sapiens

<400> SEQUENCE: 24

```
Met Ser Trp Lys Val Val Ile Ile Phe Ser Leu Leu Ile Thr Pro Gln
1               5                   10                  15

His Gly Leu Lys Glu Ser Tyr Leu Glu Glu Ser Cys Ser Thr Ile Thr
            20                  25                  30

Glu Gly Tyr Leu Ser Val Leu Arg Thr Gly Trp Tyr Thr Asn Val Phe
        35                  40                  45

Thr Leu Glu Val Gly Asp Val Glu Asn Leu Thr Cys Ala Asp Gly Pro
    50                  55                  60

Ser Leu Ile Lys Thr Glu Leu Glu Leu Thr Lys Ser Ala Leu Arg Glu
65                  70                  75                  80

Leu Lys Thr Val Ser Ala Asp Gln Leu Ala Arg Glu Glu Gln Ile Glu
                85                  90                  95

Asn Pro Arg Gln Ser Arg Phe Val Leu Gly Ala Ile Ala Leu Gly Val
            100                 105                 110

Ala Thr Ala Ala Ala Val Thr Ala Gly Val Ala Ile Ala Lys Thr Ile
        115                 120                 125

Arg Leu Glu Ser Glu Val Thr Ala Ile Lys Asn Ala Leu Lys Lys Thr
    130                 135                 140

Asn Glu Ala Val Ser Thr Leu Gly Asn Gly Val Arg Val Leu Ala Thr
145                 150                 155                 160

Ala Val Arg Glu Leu Lys Asp Phe Val Ser Lys Asn Leu Thr Arg Ala
                165                 170                 175
```

-continued

```
Ile Asn Lys Asn Lys Cys Asp Ile Asp Asp Leu Lys Met Ala Val Ser
            180                 185                 190

Phe Ser Gln Phe Asn Arg Arg Phe Leu Asn Val Val Arg Gln Phe Ser
        195                 200                 205

Asp Asn Ala Gly Ile Thr Pro Ala Ile Ser Leu Asp Leu Met Thr Asp
    210                 215                 220

Ala Glu Leu Ala Arg Ala Val Ser Asn Met Pro Thr Ser Ala Gly Gln
225                 230                 235                 240

Ile Lys Leu Met Leu Glu Asn Arg Ala Met Val Arg Arg Lys Gly Phe
                245                 250                 255

Gly Ile Leu Ile Gly Val Tyr Gly Ser Ser Val Ile Tyr Met Val Gln
            260                 265                 270

Leu Pro Ile Phe Gly Val Ile Asp Thr Pro Cys Trp Ile Val Lys Ala
        275                 280                 285

Ala Pro Ser Cys Ser Glu Lys Lys Gly Asn Tyr Ala Cys Leu Leu Arg
    290                 295                 300

Glu Asp Gln Gly Trp Tyr Cys Gln Asn Ala Gly Ser Thr Val Tyr Tyr
305                 310                 315                 320

Pro Asn Glu Lys Asp Cys Glu Thr Arg Gly Asp His Val Phe Cys Asp
                325                 330                 335

Thr Ala Ala Gly Ile Asn Val Ala Glu Gln Ser Lys Glu Cys Asn Ile
            340                 345                 350

Asn Ile Ser Thr Thr Asn Tyr Pro Cys Lys Val Ser Thr Gly Arg His
        355                 360                 365

Pro Ile Ser Met Val Ala Leu Ser Pro Leu Gly Ala Leu Val Ala Cys
    370                 375                 380

Tyr Lys Gly Val Ser Cys Ser Ile Gly Ser Asn Arg Val Gly Ile Ile
385                 390                 395                 400

Lys Gln Leu Asn Lys Gly Cys Ser Tyr Ile Thr Asn Gln Asp Ala Asp
                405                 410                 415

Thr Val Thr Ile Asp Asn Thr Val Tyr Gln Leu Ser Lys Val Glu Gly
            420                 425                 430

Glu Gln His Val Ile Lys Gly Arg Pro Val Ser Ser Ser Phe Asp Pro
        435                 440                 445

Val Lys Phe Pro Glu Asp Gln Phe Asn Val Ala Leu Asp Gln Val Phe
    450                 455                 460

Glu Asn Ile Glu Asn Ser Gln Ala Leu Val Asp Gln Ser Asn Arg Ile
465                 470                 475                 480

Leu Ser Ser Ala Glu Lys Gly Asn Thr Gly Phe Ile Ile Val Ile Ile
                485                 490                 495

Leu Ile Ala Val Leu Gly Ser Ser Met Ile Leu Val Ser Ile Phe Ile
            500                 505                 510

Ile Ile Lys Lys Thr Lys Lys Gln Thr Gly Ala Pro Pro Glu Leu Ser
        515                 520                 525

Gly Val Thr Asn Asn Gly Phe Ile Pro His Ser
    530                 535
```

<210> SEQ ID NO 25
<211> LENGTH: 539
<212> TYPE: PRT
<213> ORGANISM: Homo sapiens

<400> SEQUENCE: 25

```
Met Ser Trp Lys Val Val Ile Ile Phe Ser Leu Leu Ile Thr Pro Gln
1               5                   10                  15
```

```
His Gly Leu Lys Glu Ser Tyr Leu Glu Glu Ser Cys Ser Thr Ile Thr
            20                  25                  30

Glu Gly Tyr Leu Ser Val Leu Arg Thr Gly Trp Tyr Thr Asn Val Phe
            35                  40                  45

Thr Leu Glu Val Gly Asp Val Glu Asn Leu Thr Cys Ala Asp Gly Pro
 50                  55                  60

Ser Leu Ile Lys Thr Glu Leu Asp Leu Thr Lys Ser Ala Leu Arg Glu
 65                  70                  75                  80

Leu Lys Thr Val Ser Ala Asp Gln Leu Ala Arg Glu Glu Gln Ile Glu
                 85                  90                  95

Asn Pro Arg Gln Ser Arg Phe Val Leu Gly Ala Ile Ala Leu Gly Val
            100                 105                 110

Ala Thr Ala Ala Ala Val Thr Ala Gly Val Ala Ile Ala Lys Thr Ile
            115                 120                 125

Arg Leu Glu Ser Glu Val Thr Ala Ile Lys Asn Ala Leu Lys Lys Thr
 130                 135                 140

Asn Glu Ala Val Ser Thr Leu Gly Asn Gly Val Arg Val Leu Ala Thr
145                 150                 155                 160

Ala Val Arg Glu Leu Lys Asp Phe Val Ser Lys Asn Leu Thr Arg Ala
                165                 170                 175

Ile Asn Lys Asn Lys Cys Asp Ile Asp Asp Leu Lys Met Ala Val Ser
            180                 185                 190

Phe Ser Gln Phe Asn Arg Arg Phe Leu Asn Val Val Arg Gln Phe Ser
            195                 200                 205

Asp Asn Ala Gly Ile Thr Pro Ala Ile Ser Leu Asp Leu Met Thr Asp
 210                 215                 220

Ala Glu Leu Ala Arg Ala Val Ser Asn Met Pro Thr Ser Ala Gly Gln
225                 230                 235                 240

Ile Lys Leu Met Leu Glu Asn Arg Ala Met Val Arg Arg Lys Gly Phe
                245                 250                 255

Gly Ile Leu Ile Gly Val Tyr Gly Ser Ser Val Ile Tyr Met Val Gln
            260                 265                 270

Leu Pro Ile Phe Gly Val Ile Asp Thr Pro Cys Trp Ile Val Lys Ala
            275                 280                 285

Ala Pro Ser Cys Ser Glu Lys Lys Gly Asn Tyr Ala Cys Leu Leu Arg
            290                 295                 300

Glu Asp Gln Gly Trp Tyr Cys Gln Asn Ala Gly Ser Thr Val Tyr Tyr
305                 310                 315                 320

Pro Asn Glu Lys Asp Cys Glu Thr Arg Gly Asp His Val Phe Cys Asp
                325                 330                 335

Thr Ala Gly Ile Asn Val Ala Glu Gln Ser Lys Glu Cys Asn Ile
            340                 345                 350

Asn Ile Ser Thr Thr Asn Tyr Pro Cys Lys Val Ser Thr Gly Arg His
            355                 360                 365

Pro Ile Ser Met Val Ala Leu Ser Pro Leu Gly Ala Leu Val Ala Cys
 370                 375                 380

Tyr Lys Gly Val Ser Cys Ser Ile Gly Ser Asn Arg Val Gly Ile Ile
385                 390                 395                 400

Lys Gln Leu Asn Lys Gly Cys Ser Tyr Ile Thr Asn Gln Asp Ala Asp
                405                 410                 415

Thr Val Thr Ile Asp Asn Thr Val Tyr Gln Leu Ser Lys Val Glu Gly
            420                 425                 430
```

```
Glu Gln His Val Ile Lys Gly Arg Pro Val Ser Ser Phe Asp Pro
            435                 440                 445

Val Lys Phe Pro Glu Asp Gln Phe Asn Val Ala Leu Asp Gln Val Phe
    450                 455                 460

Glu Asn Ile Glu Asn Ser Gln Ala Leu Val Asp Gln Ser Asn Arg Ile
465                 470                 475                 480

Leu Ser Ser Ala Glu Lys Gly Asn Thr Gly Phe Ile Val Ile Ile
                485                 490                 495

Leu Ile Ala Val Leu Gly Ser Ser Met Ile Leu Val Ser Val Leu Ile
                500                 505                 510

Ile Ile Lys Lys Thr Lys Lys Pro Thr Gly Ala Pro Pro Glu Leu Ser
            515                 520                 525

Gly Val Thr Asn Asn Gly Phe Ile Pro His Ser
            530                 535
```

<210> SEQ ID NO 26
<211> LENGTH: 539
<212> TYPE: PRT
<213> ORGANISM: Homo sapiens

<400> SEQUENCE: 26

```
Met Ser Trp Lys Val Ile Ile Phe Ser Leu Leu Ile Thr Pro Gln
1               5                   10                  15

His Gly Leu Lys Glu Ser Tyr Leu Glu Glu Ser Cys Ser Thr Ile Thr
            20                  25                  30

Glu Gly Tyr Leu Ser Val Leu Arg Thr Gly Trp Tyr Thr Asn Val Phe
        35                  40                  45

Thr Leu Glu Val Gly Asp Val Glu Asn Leu Thr Cys Ala Asp Gly Pro
    50                  55                  60

Ser Leu Ile Lys Thr Glu Leu Asp Leu Thr Lys Ser Ala Leu Arg Glu
65                  70                  75                  80

Leu Lys Thr Val Ser Ala Asp Gln Leu Ala Arg Glu Glu Gln Ile Glu
                85                  90                  95

Asn Pro Arg Gln Ser Arg Phe Val Leu Gly Ala Ile Ala Leu Gly Val
            100                 105                 110

Ala Thr Ala Ala Ala Val Thr Ala Gly Val Ala Ile Ala Lys Thr Ile
        115                 120                 125

Arg Leu Glu Ser Glu Val Thr Ala Ile Lys Asn Ala Leu Lys Lys Thr
    130                 135                 140

Asn Glu Ala Val Ser Thr Leu Gly Asn Gly Val Arg Val Leu Ala Thr
145                 150                 155                 160

Ala Val Arg Glu Leu Lys Asp Phe Val Ser Lys Asn Leu Thr Arg Ala
                165                 170                 175

Ile Asn Lys Asn Lys Cys Asp Ile Asp Asp Leu Lys Met Ala Val Ser
            180                 185                 190

Phe Ser Gln Phe Asn Arg Arg Phe Leu Asn Val Val Arg Gln Phe Ser
        195                 200                 205

Asp Asn Ala Gly Ile Thr Pro Ala Ile Ser Leu Asp Leu Met Thr Asp
    210                 215                 220

Ala Glu Leu Ala Arg Ala Val Ser Asn Met Pro Thr Ser Ala Gly Gln
225                 230                 235                 240

Ile Lys Leu Met Leu Glu Asn Arg Ala Met Val Arg Arg Lys Gly Phe
                245                 250                 255

Gly Ile Leu Ile Gly Val Tyr Gly Ser Ser Val Ile Tyr Met Val Gln
            260                 265                 270
```

Leu Pro Ile Phe Gly Val Ile Asp Thr Pro Cys Trp Ile Val Lys Ala
            275                 280                 285

Ala Pro Ser Cys Ser Glu Lys Lys Gly Asn Tyr Ala Cys Leu Leu Arg
        290                 295                 300

Glu Asp Gln Gly Trp Tyr Cys Gln Asn Ala Gly Ser Thr Val Tyr Tyr
305                 310                 315                 320

Pro Asn Glu Lys Asp Cys Glu Thr Arg Gly Asp His Val Phe Cys Asp
                325                 330                 335

Thr Ala Ala Gly Ile Asn Val Ala Glu Gln Ser Lys Glu Cys Asn Ile
            340                 345                 350

Asn Ile Ser Thr Thr Asn Tyr Pro Cys Lys Val Ser Thr Gly Arg His
        355                 360                 365

Pro Ile Ser Met Val Ala Leu Ser Pro Leu Gly Ala Leu Val Ala Cys
    370                 375                 380

Tyr Lys Gly Val Ser Cys Ser Ile Gly Ser Asn Arg Val Gly Ile Ile
385                 390                 395                 400

Lys Gln Leu Asn Lys Gly Cys Ser Tyr Ile Thr Asn Gln Asp Ala Asp
                405                 410                 415

Thr Val Thr Ile Asp Asn Thr Val Tyr Gln Leu Ser Lys Val Glu Gly
            420                 425                 430

Glu Gln His Val Ile Lys Gly Arg Pro Val Ser Asn Ser Phe Asp Pro
        435                 440                 445

Val Lys Phe Pro Glu Asp Gln Phe Asn Val Ala Leu Asp Gln Val Phe
    450                 455                 460

Glu Asn Ile Glu Asn Ser Gln Ala Leu Val Asp Gln Ser Asn Arg Ile
465                 470                 475                 480

Leu Ser Ser Ala Glu Lys Gly Asn Thr Gly Phe Ile Ile Val Ile Ile
                485                 490                 495

Leu Ile Ala Val Leu Gly Ser Ser Met Ile Leu Val Ser Ile Phe Ile
            500                 505                 510

Ile Ile Lys Lys Thr Lys Lys Pro Thr Gly Ala Pro Pro Glu Leu Ser
        515                 520                 525

Gly Val Thr Asn Asn Gly Phe Ile Pro His Ser
    530                 535

<210> SEQ ID NO 27
<211> LENGTH: 539
<212> TYPE: PRT
<213> ORGANISM: Homo sapiens

<400> SEQUENCE: 27

Met Ser Trp Lys Val Val Ile Phe Ser Leu Leu Ile Thr Pro Gln
1               5                   10                  15

His Gly Leu Lys Glu Ser Tyr Leu Glu Glu Ser Cys Ser Thr Ile Thr
            20                  25                  30

Glu Gly Tyr Leu Ser Val Leu Arg Thr Gly Trp Tyr Thr Asn Val Phe
        35                  40                  45

Thr Leu Glu Val Gly Asp Val Glu Asn Leu Thr Cys Ala Asp Gly Pro
    50                  55                  60

Ser Leu Ile Lys Thr Glu Leu Asp Leu Thr Lys Ser Ala Leu Arg Glu
65                  70                  75                  80

Leu Lys Thr Val Ser Ala Asp Gln Leu Ala Arg Glu Glu Gln Ile Glu
                85                  90                  95

Asn Pro Arg Gln Ser Arg Phe Val Leu Gly Ala Ile Ala Leu Gly Val

```
                  100                 105                 110
Ala Thr Ala Ala Val Thr Ala Gly Val Ala Ile Ala Lys Thr Ile
            115                 120                 125
Arg Leu Glu Ser Glu Val Thr Ala Ile Lys Asn Ala Leu Lys Lys Thr
            130                 135                 140
Asn Glu Ala Val Ser Thr Leu Gly Asn Gly Val Arg Val Leu Ala Thr
145                 150                 155                 160
Ala Val Arg Glu Leu Lys Asp Phe Val Ser Lys Asn Leu Thr Arg Ala
                165                 170                 175
Ile Asn Lys Asn Lys Cys Asp Ile Asp Asp Leu Lys Met Ala Val Ser
                180                 185                 190
Phe Ser Gln Phe Asn Arg Arg Phe Leu Asn Val Val Arg Gln Phe Ser
            195                 200                 205
Asp Asn Ala Gly Ile Thr Pro Ala Ile Ser Leu Asp Leu Met Thr Asp
210                 215                 220
Ala Glu Leu Ala Arg Ala Val Ser Asn Met Pro Thr Ser Ala Gly Gln
225                 230                 235                 240
Ile Lys Leu Met Leu Glu Asn Arg Ala Met Val Arg Arg Lys Gly Phe
            245                 250                 255
Gly Ile Leu Ile Gly Val Tyr Gly Ser Ser Val Ile Tyr Met Val Gln
            260                 265                 270
Leu Pro Ile Phe Gly Val Ile Asp Thr Pro Cys Trp Ile Val Lys Ala
            275                 280                 285
Ala Pro Ser Cys Ser Glu Lys Lys Gly Asn Tyr Ala Cys Leu Leu Arg
            290                 295                 300
Glu Asp Gln Gly Trp Tyr Cys Gln Asn Ala Gly Ser Thr Val Tyr Tyr
305                 310                 315                 320
Pro Asn Glu Lys Asp Cys Glu Thr Arg Gly Asp His Val Phe Cys Asp
                325                 330                 335
Thr Ala Ala Gly Ile Asn Val Ala Glu Gln Ser Lys Glu Cys Asn Ile
                340                 345                 350
Asn Ile Ser Thr Thr Asn Tyr Pro Cys Lys Val Ser Thr Gly Arg His
            355                 360                 365
Pro Ile Ser Met Val Ala Leu Ser Pro Leu Gly Ala Leu Val Ala Cys
            370                 375                 380
Tyr Lys Gly Val Ser Cys Ser Ile Gly Ser Asn Arg Val Gly Ile Ile
385                 390                 395                 400
Lys Gln Leu Asn Lys Gly Cys Ser Tyr Ile Thr Asn Gln Asp Ala Asp
                405                 410                 415
Thr Val Thr Ile Asp Asn Thr Val Tyr Gln Leu Ser Lys Val Glu Gly
                420                 425                 430
Glu Gln His Val Ile Lys Gly Arg Pro Val Ser Ser Phe Asp Pro
            435                 440                 445
Val Lys Phe Pro Glu Asp Gln Phe Asn Val Ala Leu Asp Gln Val Phe
            450                 455                 460
Glu Asn Ile Glu Asn Ser Gln Ala Leu Val Asp Gln Ser Asn Arg Ile
465                 470                 475                 480
Leu Ser Ser Ala Glu Lys Gly Asn Thr Gly Phe Ile Ile Val Ile Ile
                485                 490                 495
Leu Ile Ala Val Leu Gly Ser Ser Met Ile Leu Val Ser Val Phe Ile
            500                 505                 510
Ile Ile Lys Lys Thr Lys Lys Pro Thr Gly Ala Pro Pro Glu Leu Ser
            515                 520                 525
```

```
Gly Val Thr Asn Asn Gly Phe Ile Pro His Ser
        530                 535

<210> SEQ ID NO 28
<211> LENGTH: 539
<212> TYPE: PRT
<213> ORGANISM: Homo sapiens

<400> SEQUENCE: 28

Met Ser Trp Lys Val Val Ile Ile Phe Ser Leu Leu Ile Thr Pro Gln
1               5                   10                  15

His Gly Leu Lys Glu Ser Tyr Leu Glu Glu Ser Cys Ser Thr Ile Thr
            20                  25                  30

Glu Gly Tyr Leu Ser Val Leu Arg Thr Gly Trp Tyr Thr Asn Val Phe
        35                  40                  45

Thr Leu Glu Val Gly Asp Val Glu Asn Leu Thr Cys Ala Asp Gly Pro
    50                  55                  60

Ser Leu Ile Lys Thr Glu Leu Asp Leu Thr Lys Ser Ala Leu Arg Glu
65                  70                  75                  80

Leu Lys Thr Val Ser Ala Asp Gln Leu Ala Arg Glu Glu Gln Ile Glu
                85                  90                  95

Asn Pro Arg Gln Ser Arg Phe Val Leu Gly Ala Ile Ala Leu Gly Val
            100                 105                 110

Ala Thr Ala Ala Ala Val Thr Ala Gly Val Ala Ile Ala Lys Thr Ile
        115                 120                 125

Arg Leu Glu Ser Glu Val Thr Ala Ile Lys Asn Ala Leu Lys Lys Thr
    130                 135                 140

Asn Glu Ala Val Ser Thr Leu Gly Asn Gly Val Arg Val Leu Ala Thr
145                 150                 155                 160

Ala Val Arg Glu Leu Lys Asp Phe Val Ser Lys Asn Leu Thr Arg Ala
                165                 170                 175

Ile Asn Lys Asn Lys Cys Asp Ile Asp Asp Leu Lys Met Ala Val Ser
            180                 185                 190

Phe Ser Gln Phe Asn Arg Arg Phe Leu Asn Val Val Arg Gln Phe Ser
        195                 200                 205

Asp Asn Ala Gly Ile Thr Pro Ala Ile Ser Leu Asp Leu Met Thr Asp
    210                 215                 220

Ala Glu Leu Ala Arg Ala Val Ser Asn Met Pro Thr Ser Ala Gly Gln
225                 230                 235                 240

Ile Lys Leu Met Leu Glu Asn Arg Ala Met Val Arg Arg Lys Gly Phe
                245                 250                 255

Gly Ile Leu Ile Gly Val Tyr Gly Ser Ser Val Ile Tyr Met Val Gln
            260                 265                 270

Leu Pro Ile Phe Gly Val Ile Asp Thr Pro Cys Trp Ile Val Lys Ala
        275                 280                 285

Ala Pro Ser Cys Ser Glu Lys Arg Gly Asn Tyr Ala Cys Leu Leu Arg
    290                 295                 300

Glu Asp Gln Gly Trp Tyr Cys Gln Asn Ala Gly Ser Thr Val Tyr Tyr
305                 310                 315                 320

Pro Asn Glu Lys Asp Cys Glu Thr Arg Gly Asp His Val Phe Cys Asp
                325                 330                 335

Thr Ala Ala Gly Ile Asn Val Ala Glu Gln Ser Lys Glu Cys Asn Ile
            340                 345                 350

Asn Ile Ser Thr Thr Asn Tyr Pro Cys Lys Val Ser Thr Gly Arg His
```

-continued

```
                355                 360                 365
        Pro Ile Ser Met Val Ala Leu Ser Pro Leu Gly Ala Leu Val Ala Cys
            370                 375                 380

Tyr Lys Gly Val Ser Cys Ser Ile Gly Ser Asn Arg Val Gly Ile Ile
        385                 390                 395                 400

Lys Gln Leu Asn Lys Gly Cys Ser Tyr Ile Thr Asn Gln Asp Ala Asp
                        405                 410                 415

Thr Val Thr Ile Asp Asn Thr Val Tyr Gln Leu Ser Lys Val Glu Gly
                    420                 425                 430

Glu Gln His Val Ile Lys Gly Arg Pro Val Ser Ser Phe Asp Pro
                435                 440                 445

Val Lys Phe Pro Glu Asp Gln Phe Asn Val Ala Leu Asp Gln Val Phe
            450                 455                 460

Glu Asn Ile Glu Asn Ser Gln Ala Leu Val Asp Gln Ser Asn Arg Ile
        465                 470                 475                 480

Leu Ser Ser Ala Glu Lys Gly Asn Thr Gly Phe Ile Ile Val Ile Ile
                        485                 490                 495

Leu Ile Ala Val Leu Gly Ser Ser Met Ile Leu Val Ser Val Phe Ile
                    500                 505                 510

Ile Ile Lys Lys Thr Lys Lys Pro Thr Gly Ala Pro Pro Glu Leu Ser
                515                 520                 525

Gly Val Thr Asn Asn Gly Phe Ile Pro His Ser
            530                 535

<210> SEQ ID NO 29
<211> LENGTH: 539
<212> TYPE: PRT
<213> ORGANISM: Homo sapiens

<400> SEQUENCE: 29

Met Ser Trp Lys Val Ile Ile Phe Ser Leu Leu Ile Thr Pro Gln
        1               5                   10                  15

His Gly Leu Lys Glu Ser Tyr Leu Glu Glu Ser Cys Ser Thr Ile Thr
                        20                  25                  30

Glu Gly Tyr Leu Ser Val Leu Arg Thr Gly Trp Tyr Thr Asn Val Phe
                    35                  40                  45

Thr Leu Glu Val Gly Asp Val Glu Asn Leu Thr Cys Ala Asp Gly Pro
                50                  55                  60

Ser Leu Ile Lys Thr Glu Leu Asp Leu Thr Lys Ser Ala Leu Arg Glu
        65                  70                  75                  80

Leu Lys Thr Val Ser Ala Asp Gln Leu Ala Arg Glu Glu Gln Ile Glu
                        85                  90                  95

Asn Pro Arg Gln Ser Arg Phe Val Leu Gly Ala Ile Ala Phe Gly Val
                    100                 105                 110

Ala Thr Ala Ala Ala Val Thr Ala Gly Val Ala Ile Ala Lys Thr Ile
                115                 120                 125

Arg Leu Glu Ser Glu Val Thr Ala Ile Lys Asn Ala Leu Lys Lys Thr
            130                 135                 140

Asn Glu Ala Val Ser Thr Leu Gly Asn Gly Val Arg Val Leu Ala Thr
        145                 150                 155                 160

Ala Val Arg Glu Leu Lys Asp Phe Val Ser Lys Asn Leu Thr Arg Ala
                        165                 170                 175

Ile Asn Lys Asn Lys Cys Asp Ile Asp Asp Leu Lys Met Ala Val Ser
                    180                 185                 190
```

```
Phe Ser Gln Phe Asn Arg Arg Phe Leu Asn Val Val Arg Gln Phe Ser
            195                 200                 205

Asp Asn Ala Gly Ile Thr Pro Ala Ile Ser Leu Asp Leu Met Thr Asp
210                 215                 220

Ala Glu Leu Ala Arg Ala Val Ser Asn Met Pro Thr Ser Ala Gly Gln
225                 230                 235                 240

Ile Lys Leu Met Leu Glu Asn Arg Ala Met Val Arg Arg Lys Gly Phe
                245                 250                 255

Gly Ile Leu Ile Gly Val Tyr Gly Ser Val Ile Tyr Met Val Gln
                260                 265                 270

Leu Pro Ile Phe Gly Val Ile Asp Thr Pro Cys Trp Ile Val Lys Ala
            275                 280                 285

Ala Pro Ser Cys Ser Glu Lys Lys Gly Asn Tyr Ala Cys Leu Leu Arg
290                 295                 300

Glu Asp Gln Gly Trp Tyr Cys Gln Asn Ala Gly Ser Thr Val Tyr Tyr
305                 310                 315                 320

Pro Asn Glu Lys Asp Cys Glu Thr Arg Gly Asp His Val Phe Cys Asp
                325                 330                 335

Thr Ala Ala Gly Ile Asn Val Ala Glu Gln Ser Lys Glu Cys Asn Ile
            340                 345                 350

Asn Ile Ser Thr Thr Asn Tyr Pro Cys Lys Val Ser Thr Gly Arg His
                355                 360                 365

Pro Ile Ser Met Val Ala Leu Ser Pro Leu Gly Ala Leu Val Ala Cys
            370                 375                 380

Tyr Lys Gly Val Ser Cys Ser Ile Gly Ser Asn Arg Val Gly Ile Ile
385                 390                 395                 400

Lys Gln Leu Asn Lys Gly Cys Ser Tyr Ile Thr Asn Gln Asp Ala Asp
                405                 410                 415

Thr Val Thr Ile Asp Asn Thr Val Tyr Gln Leu Ser Lys Val Glu Gly
            420                 425                 430

Glu Gln His Val Ile Lys Gly Arg Pro Val Ser Ser Phe Asp Pro
                435                 440                 445

Val Lys Phe Pro Glu Asp Gln Phe Asn Val Ala Leu Asp Gln Val Phe
450                 455                 460

Glu Asn Ile Glu Asn Ser Gln Ala Leu Val Asp Gln Ser Asn Arg Ile
465                 470                 475                 480

Leu Ser Ser Ala Glu Lys Gly Asn Thr Gly Phe Ile Ile Val Ile Ile
                485                 490                 495

Leu Ile Ala Val Leu Gly Ser Ser Met Ile Leu Val Ser Ile Phe Ile
            500                 505                 510

Ile Ile Lys Lys Thr Lys Lys Pro Thr Gly Ala Pro Pro Glu Leu Ser
            515                 520                 525

Gly Val Thr Asn Asn Gly Phe Ile Pro His Ser
530                 535

<210> SEQ ID NO 30
<211> LENGTH: 539
<212> TYPE: PRT
<213> ORGANISM: Homo sapiens

<400> SEQUENCE: 30

Met Ser Trp Lys Val Val Ile Ile Phe Ser Leu Leu Ile Thr Pro Gln
1               5                   10                  15

His Gly Leu Lys Glu Ser Tyr Leu Glu Glu Ser Cys Ser Thr Ile Thr
            20                  25                  30
```

```
Glu Gly Tyr Leu Ser Val Leu Arg Thr Gly Trp Tyr Thr Asn Val Phe
         35                  40                  45
Thr Leu Glu Val Gly Asp Val Glu Asn Leu Thr Cys Ala Asp Gly Pro
 50                  55                  60
Ser Leu Ile Lys Thr Glu Leu Asp Leu Thr Lys Ser Ala Leu Arg Glu
 65                  70                  75                  80
Leu Lys Thr Val Ser Ala Asp Gln Leu Ala Arg Glu Glu Gln Ile Glu
                 85                  90                  95
Asn Pro Arg Gln Ser Arg Phe Val Leu Gly Ala Ile Ala Leu Gly Val
                100                 105                 110
Ala Thr Ala Ala Ala Val Thr Ala Gly Val Ala Ile Ala Lys Thr Ile
                115                 120                 125
Arg Leu Glu Ser Glu Val Thr Ala Ile Lys Asn Ala Leu Lys Lys Thr
        130                 135                 140
Asn Glu Ala Val Ser Thr Leu Gly Asn Gly Val Arg Val Leu Ala Thr
145                 150                 155                 160
Ala Val Arg Glu Leu Lys Asp Phe Val Ser Lys Asn Leu Thr Arg Ala
                165                 170                 175
Ile Asn Lys Asn Lys Cys Asp Ile Asp Asp Leu Lys Met Ala Val Ser
                180                 185                 190
Phe Ser Gln Phe Asn Arg Arg Phe Leu Asn Val Val Arg Gln Phe Ser
        195                 200                 205
Asp Asn Ala Gly Ile Thr Pro Ala Ile Ser Leu Asp Leu Met Thr Asp
210                 215                 220
Ala Glu Leu Ala Arg Ala Val Ser Asn Met Pro Thr Ser Ala Gly Gln
225                 230                 235                 240
Ile Lys Leu Met Leu Glu Asn Arg Ala Met Val Arg Arg Lys Gly Phe
                245                 250                 255
Gly Ile Leu Ile Gly Val Tyr Gly Ser Ser Val Ile Tyr Met Val Gln
                260                 265                 270
Leu Pro Ile Phe Gly Val Ile Asp Thr Pro Cys Trp Ile Val Lys Ala
        275                 280                 285
Ala Pro Ser Cys Ser Glu Lys Arg Gly Asn Tyr Ala Cys Leu Leu Arg
        290                 295                 300
Glu Asp Gln Gly Trp Tyr Cys Gln Asn Ala Gly Ser Thr Val Tyr Tyr
305                 310                 315                 320
Pro Asn Glu Lys Asp Cys Glu Thr Arg Gly Asp His Val Phe Cys Asp
                325                 330                 335
Thr Ala Ala Gly Ile Asn Val Ala Glu Gln Ser Lys Glu Cys Asn Ile
                340                 345                 350
Asn Ile Ser Thr Thr Asn Tyr Pro Cys Lys Val Ser Thr Gly Arg His
        355                 360                 365
Pro Ile Ser Met Val Ala Leu Ser Pro Leu Gly Ala Leu Val Ala Cys
        370                 375                 380
Tyr Lys Gly Val Ser Cys Ser Ile Gly Ser Asn Arg Val Gly Ile Ile
385                 390                 395                 400
Lys Gln Leu Ser Lys Gly Cys Ser Tyr Ile Thr Asn Gln Asp Ala Asp
                405                 410                 415
Thr Val Thr Ile Asp Asn Thr Val Tyr Gln Leu Ser Lys Val Glu Gly
                420                 425                 430
Glu Gln His Val Ile Lys Gly Arg Pro Val Ser Ser Ser Phe Asp Pro
        435                 440                 445
```

```
Val Lys Phe Pro Glu Asp Gln Phe Asn Val Ala Leu Asp Gln Val Phe
    450                 455                 460

Glu Asn Ile Glu Asn Ser Gln Ala Leu Val Asp Gln Ser Asn Arg Ile
465                 470                 475                 480

Leu Ser Ser Ala Glu Lys Gly Asn Thr Gly Phe Ile Ile Val Ile Ile
                485                 490                 495

Leu Ile Ala Val Leu Gly Ser Ser Met Ile Leu Val Ser Ile Phe Ile
                500                 505                 510

Ile Ile Lys Lys Thr Lys Lys Pro Thr Gly Ala Pro Pro Glu Leu Ser
            515                 520                 525

Gly Val Thr Asn Asn Gly Phe Ile Pro His Ser
    530                 535
```

<210> SEQ ID NO 31
<211> LENGTH: 14880
<212> TYPE: DNA
<213> ORGANISM: Homo sapiens

<400> SEQUENCE: 31

| | | |
|---|---|---|
| acgcgaaaaa atgcgtacaa caaacttgca taaaccaaaa aaatgggca aataagaatt | 60 |
| tgataagtac cacttaaatt taactcccct gcttagcgat gggttcgaat tcgctatcga | 120 |
| tgataaaagt acgtctacaa atctatttg ataatgatga agtagcgcta ctaaaaataa | 180 |
| cgtgttatac ggataaacta atacatctaa cgaatgcgct agcgaaagcg gtaatacata | 240 |
| cgataaaact aaatggtata gtatttgtac atgtaataac gtcgtcggat atatgtccga | 300 |
| ataataatat agtagtaaaa tcgaatttta cgacgatgcc ggtactacaa aatggtggtt | 360 |
| atatatggga aatgatggaa ctaacgcatt gttcgcaacc gaatggtcta ctagatgata | 420 |
| attgtgaaat aaaattttcg aaaaaactat cggattcgac gatgacgaat tatatgaatc | 480 |
| aactatcgga actactaggt tttgatctaa atccgtaaat tataattaat atcaactagc | 540 |
| aaatcaatgt cactaacacc attagttaat ataaaactta acagaagaca aaaatggggc | 600 |
| aaataaatca attcagccaa cccaaccatg gatacgacgc ataatgataa tacgccgcaa | 660 |
| cgtctaatga taacggatat gcgtccgcta tcgctagaaa cgataataac gtcgctaacg | 720 |
| cgtgatataa taacgcataa attttatatat ctaataaatc atgaatgtat agtacgtaaa | 780 |
| ctagatgaac gtcaagcgac gtttacgttt ctagtaaatt atgaaatgaa actactacat | 840 |
| aaagtaggtt cgacgaaata taaaaaatat acggaatata atacgaaata tggtacgttt | 900 |
| ccgatgccga tatttataaa tcatgatggt tttctagaat gtataggtat aaaaccgacg | 960 |
| aaacatacgc cgataatata taaatatgat ctaaatccgt aaatttcaac acaatattca | 1020 |
| cacaatctaa aacaacaact ctatgcataa ctatactcca tagtccagat ggagcctgaa | 1080 |
| aattatagta atttaaaatt aaggagagat ataagataga agatggggca aatacaaaga | 1140 |
| tggctcttag caaagtcaag ttgaatgata cactcaacaa agatcaactt ctgtcatcca | 1200 |
| gcaaatacac catccaacgg agcacaggag atagtattga tactcctaat tatgatgtgc | 1260 |
| agaaacacat caataagtta tgtggcatgt tattaatcac agaagatgct aatcataaat | 1320 |
| tcactgggtt aataggtatg ttatatgcga tgtctaggtt aggaagagaa gacaccataa | 1380 |
| aaatactcag agatgcggga tatcatgtaa aagcaaatgg agtagatgta acaacacatc | 1440 |
| gtcaagacat taatgaaaaa gaatgaaat ttgaagtgtt aacattggca agcttaacaa | 1500 |
| ctgaaattca aatcaacatt gagatagaat ctagaaaatc ctacaaaaaa atgctaaaag | 1560 |
| aaatgggaga ggtagctcca gaatacaggc atgactctcc tgattgtggg atgataatat | 1620 |

```
tatgtatagc agcattagta ataactaaat tagcagcagg ggacagatct ggtcttacag   1680
ccgtgattag gagagctaat aatgtcctaa aaaatgaaat gaaacgttac aaaggcttac   1740
tacccaagga catagccaac agcttctatg aagtgtttga aaaacatccc cactttatag   1800 atgttttgt tcattttggt atagcacaat cttctaccag aggtggcagt agagttgaag    1860 ggattttgc aggattgttt atgaatgcct atggtgcagg gcaagtgatg ttacggtggg    1920
gagtcttagc aaaatcagtt aaaaatatta tgttaggaca tgctagtgtg caagcagaaa   1980
tggaacaagt tgttgaggtt tatgaatatg cccaaaaatt gggtggtgaa gcaggattct   2040
accatatatt gaacaaccca aaagcatcat tattatcttt gactcaattt cctcacttct   2100
ccagtgtagt attaggcaat gctgctggcc taggcataat gggagagtac agaggtacac   2160
cgaggaatca agatctatat gatgcagcaa aggcatatgc tgaacaactc aaagaaaatg   2220
gtgtgattaa ctacagtgta ctagacttga cagcagaaga actagaggct atcaaacatc   2280
agcttaatcc aaaagataat gatgtagagc tttgagttaa taaaaaatgg ggcaaataaa   2340
tcatcatgga aaagtttgct cctgaattcc atggagaaga tgcaaacaac agggctacta   2400
aattcctaga atcaataaag ggcaaattca catcacccaa agatcccaag aaaaaagata   2460
gtatcatatc tgtcaactca atagatatag aagtaaccaa agaaagccct ataacatcaa   2520
attcaactat tatcaaccca acaaatgaga cagatgatac tgcagggaac aagcccaatt   2580
atcaaagaaa acctctagta agtttcaaag aagaccctac accaagtgat aatccctttt   2640
ctaaactata caaagaaacc atagaaacat ttgataacaa tgaagaagaa tccagctatt   2700
catacgaaga aataaatgat cagacaaacg ataatataac agcaagatta gataggattg   2760
atgaaaaatt aagtgaaata ctaggaatgc ttcacacatt agtagtggca agtgcaggac   2820
ctacatctgc tcgggatggt ataagagatg ccatgattgg tttaagagaa gaaatgatag   2880
aaaaaatcag aactgaagca ttaatgacca atgacagatt agaagctatg gcaagactca   2940
ggaatgagga aagtgaaaag atggcaaaag acacatcaga tgaagtgtct ctcaatccaa   3000
catcagagaa attgaacaac ctattggaag ggaatgatag tgacaatgat ctatcacttg   3060
aagatttctg attagttacc actcttcaca tcaacacaca ataccaacag aagaccaaca   3120
aactaaccaa cccaatcatc aaccaaaca tccatccgcc aatcagccaa acagccaaca   3180
aaacaaccag ccaatccaaa actaaccacc cggaaaaaat ctataatata gttacaaaaa   3240
aaggaaaggg tggggcaaat atggaaacat acgtgaacaa gcttcacgaa ggctccacat   3300
acacagctgc tgttcaatac aatgtcttag aaaaagacga tgaccctgca tcacttacaa   3360
tatgggtgcc catgttccaa tcatctatgc cagcagattt acttataaaa gaactagcta   3420
atgtcaacat actagtgaaa caatatccac acccaagggg accttcacta agagtcatga   3480
taaactcaag aagtgcagtg ctagcacaaa tgcccagcaa atttaccata tgcgctaatg   3540
tgtccttgga tgaaagaagc aaactagcat atgatgtaac cacaccctgt gaaatcaagg   3600
catgtagtct aacatgccta aaatcaaaaa atatgttgac tacagttaaa gatctcacta   3660
tgaagacact caaccctaca catgatatta ttgctttatg tgaatttgaa aacatagtaa   3720
catcaaaaaa agtcataata ccaacatacc taagatccat cagtgtcaga aataaagatc   3780
tgaacacact tgaaaatata acaaccactg aattcaaaaa tgctatcaca aatgcaaaaa   3840 tcatcccta ctcaggatta ctattagtca tcacagtgac tgcaacaaa ggagcattca    3900 aatacataaa gccacaaagt caattcatag tagatcttgg agcttaccta gaaaaagaaa   3960
```

```
gtatatatta tgttaccaca aattggaagc acacagctac acgatttgca atcaaaccca    4020
tggaagatta acctttttcc tctacatcag tgtgttaatt catacaaact ttctacctac    4080
attcttcact tcaccatcac aatcacaaac actctgtggt tcaaccaatc aaacaaaact    4140
tatctgaagt cccagatcat cccaagtcat tgtttatcag atctagtact caaataagtt    4200
aataaaaaat atacacatgg acgtccatgg ggcaaatgca acatgtcca aaaacaagga    4260 ccaacgcacc gctaagacat tagaaaggac ctgggacact ctcaatcatt tattattcat    4320
atcatcgtgc ttatataagt taaatcttaa atctgtagca caaatcacat tatccattct    4380
ggcaatgata atctcaactt cacttataat tgcagccatc atattcatag cctcggcaaa    4440
ccacaaagtc acaccaacaa ctgcaatcat acaagatgca acaagccaga tcaagaacac    4500 aacccccaaca tacctcaccc agaatcctca gcttggaatc agtccctcta atccgtctga    4560
aattacatca caaatcacca ccatactagc ttcaacaaca ccaggagtca agtcaaccct    4620
gcaatccaca acagtcaaga ccaaaaacac aacaacaact caaacacaac ccagcaagcc    4680
caccacaaaa caacgccaaa acaaaccacc aagcaaaccc aataatgatt ttcactttga    4740
agtgttcaac tttgtaccct gcagcatatg cagcaacaat ccaacctgct gggctatctg    4800
caaaagaata ccaaacaaaa aaccaggaaa gaaaaccact accaagccca caaaaaaacc    4860
aaccctcaag acaaccaaaa aagatcccaa acctcaaacc actaaatcaa aggaagtacc    4920
caccaccaag cccacagaag agccaaccat caacaccacc aaaacaaaca tcataactac    4980
actactcacc tccaacacca caggaaatcc agaactcaca agtcaaatgg aaaccttcca    5040
ctcaacttcc tccgaaggca atccaagccc ttctcaagtc tctacaacat ccgagtaccc    5100
atcacaacct tcatctccac ccaacacacc acgccagtag ttacttaaaa acatattatc    5160
acaaaaggcc ttgaccaacc gcggagaatc aaaataaact ctggggcaaa taacaatgtc    5220
ctggaaagtg gtgatcattt tttcattgct aataacacct caacacggtc ttaaagagag    5280
ctacttggaa gaatcatgta gcactataac tgaggggtat ctcagtgttc tgaggacagg    5340
ttggtatacc aacgttttta cattagaggt gggtgatgta gaaaacctca catgtgctga    5400
tggacctagc ctaataaaaa cagaattaga actgaccaaa agtgcactaa gagagctcaa    5460
aacagtctct gctgaccaat ggcgagaga ggaacaaatt gagaatccca gaagaagaag    5520
atttgttcta ggagcaatag cactcggtgt tgcaacagca gctgcagtta cagcaggtgt    5580
tgcaattgcc aaaaccatcc ggcttgagag tgaagtcaca gcaattaaga atgcccttaa    5640
aaagaccaat gaagcagtat ctacattggg gaatggagtt cgagtgttgg caactgcagt    5700
aagagagctg aaagattttg tgagcaagaa tttaactcgt gcaatcaaca aaaacaagtg    5760
cgacattgat gacctaaaaa tggccgttag cttcagtcaa ttcaacagaa ggtttctaaa    5820
tgttgtgcgg caatttttcag acaatgctgg aataacacca gcaatatctt tggacttaat    5880
gacagatgct gaactagcca gggccgtctc caacatgccg acatctgcag acaaataaa    5940 attgatgttg gagaaccgtg caatggtgcg aagaaagggg tttggaatcc tgataggggt    6000
ctacgggagc tccgtaattt acatggtgca gctgccaatc tttggcgtca tagacacgcc    6060
ttgctggata gtaaaagcag ccccctcttg ttccaaaaaa agggaaaact atgcttgcct    6120
tttaagagaa gatcaagggt ggtattgtca gaatgcaggg tcaactgttt actacccaaa    6180
tgagaaagac tgtgaaacaa gaggagacca tgtcttttgc gacacagcag caggaattaa    6240
tgttgctgag caatcaaaag agtgcaatat caacatatcc actacaaatt acccatgcaa    6300
agtcagcaca ggaagacatc ctatcagtat ggttgcactg tctcctcttg ggctctagt    6360
```

```
tgcttgctac aaaggagtaa gctgttccat tggcagcaat agagtaggga tcatcaagca    6420
gctgaacaaa ggttgctcct atataaccaa ccaagatgca gacacagtga caatagacaa    6480
cactgtatat cagctaagca aagttgaggg tgaacagcat gttataaaag gcagaccagt    6540
gtcaagcagc tttgatccag tcaagttccc tgaagatcaa ttcaatgttg cacttgacca    6600 agttttgag  aacattgaaa acagccaggc cttggtggat caatcaaaca ggatcctaag    6660
cagtgcagag aaagggaaca ctatcatgat aactactata attatagtga ttatagtaat    6720
attgttatca ttaattgctg ttggactgct cctatactgt aaggccagaa gcacaccagt    6780
cacactaagc aaggatcaac tgagtggtat aaataatatt gcatttagta actgaataaa    6840
aatagcacct aatcatgttc ttacaatggt ttactatctg ctcatagaca acccatctat    6900
cattggattt tcttaaaatc tgaacttcat cgaaactctt atctataaac catctcactt    6960
acactattta agtagattcc tagtttatag ttatataaaa acacaattga atgccagtcg    7020
accttaccat ctgtaaaaat gaaaactggg gcaaatatgt cacgaaggaa tccttgcaaa    7080
tttgaaattc gaggtcattg cttaaatggt aagaggtgtc attttagtca taattatttt    7140
gaatggccac cccatgcact gcttgtaaga caaaacttta tgttaaacag aatacttaag    7200
tctatggata aaagtataga taccttatca gaaataagtg gagctgcaga gttggacaga    7260
acagaagagt atgctcttgg tgtagttgga gtgctagaga gttatatagg atcaataaac    7320
aatataacta acaatcagc  atgtgttgcc atgagcaaac tcctcactga actcaatagt    7380
gatgatatca aaaagctgag ggacaatgaa gagctaaatt cacccaagat aagagtgtac    7440
aatactgtca tatcatatat tgaaagcaac aggaaaaaca ataaacaaac tatccatctg    7500
ttaaaaagat tgccagcaga cgtattgaag aaaaccatca aaaacacatt ggatatccat    7560
aagagcataa ccatcaacaa cccaaaagaa tcaactgtta gtgatacaaa tgaccatgcc    7620
aaaaataatg atactacctg acaaatatcc ttgtagtata acttccatac taataacaag    7680
tagatgtaga gttactatgt ataatcaaaa gaacacacta tatttcaatc aaaacaaccc    7740
aaataaccat atgtactcac cgaatcaaac attcaatgaa atccattgga cctctcaaga    7800
attgattgac acaattcaaa attttctaca acatctaggt attattgagg atatatatac    7860
aatatatata ttagtgtcat aacactcaat tctaacactc accacatcgt tacattatta    7920
attcaaacaa ttcaagttgt gggacaaaat ggatcccatt attaatgaaa ttctgctaa     7980 tgtttatcta accgatagtt atttaaaagg tgttatctct ttctcagagt gtaatgcttt    8040
aggaagttac atattcaatg gtccttatct caaaaatgat tataccaact taattagtag    8100
acaaaatcca ttaatagaac acatgaatct aagaaactaa atataacac  agtccttaat    8160 atctaagtat cataaaggtg aaataaaatt agaagaacct acttattttc agtcattact    8220
tatgacatac aagagtatga cctcgtcaga acagattgct accactaatt tacttaaaaa    8280
gataataaga agagctatag aaataagtga tgtcaaagtc tatgctatat tgaataaact    8340
agggcttaaa gaaaaggaca agattaaatc caacaatgga caagatgaag acaactcagt    8400 tattcgacc  ataatcaaag atgatatact ttcagctgtt aaagataatc aatctcatct    8460
taaagcagac aaaaatcact ctacaaaaca aaaagacaca atcaaaacaa cactcttgaa    8520
gaaattgatg tgttcaatgc aacatcctcc atcatggtta atacattggt ttaacttata    8580
cacaaaatta aacaacatat taacacagta tcgatcaaat gaggtaaaaa accatgggtt    8640
tacattgata gataatcaaa ctcttagtgg attttcaattt attttgaacc aatatggttg    8700
```

```
tatagtttat cataaggaac tcaaaagaat tactgtgaca acctataatc aattcttgac    8760
atggaaagat attagcctta gtagattaaa tgtttgttta attacatgga ttagtaactg    8820
cttgaacaca ttaaataaaa gcttaggctt aagatgcgga ttcaataatg ttatcttgac    8880
acaactattc ctttatggag attgtatact aaagctattt cacaatgagg ggttctacat    8940
aataaaagag gtagagggat ttattatgtc tctaatttta aatataacag aagaagatca    9000
attcagaaaa cgattttata atagtatgct caacaacatc acagatgctg ctaataaagc    9060
tcagaaaaat ctgctatcaa gagtatgtca tacattatta gataagacag tgtccgataa    9120
tataataaat ggcagatgga taattctatt aagtaagttc cttaaattaa ttaagcttgc    9180
aggtgacaat aaccttaaca atctgagtga actatatttt ttgttcagaa tatttggaca    9240
cccaatggta gatgaaagac aagccatgga tgctgttaaa attaattgca atgagaccaa    9300
attttacttg ttaagcagtc tgagtatgtt aagaggtgcc tttatatata gaattataaa    9360
agggtttgta aataattaca acagatggcc tactttaaga aatgctattg tttacccctt    9420
aagatggtta acttactata aactaaacac ttatccttct tgttggaac ttacagaaag    9480 agatttgatt gtgttatcag gactacgttt ctatcgtgag tttcggttgc ctaaaaaagt    9540
ggatcttgaa atgattataa atgataaagc tatatcacct cctaaaaatt tgatatggac    9600
tagtttccct agaaattaca tgccatcaca catacaaaac tatatagaac atgaaaaatt    9660 aaaatttttcc gagagtgata atcaagaag agtattagag tattatttaa gagataacaa    9720
attcaatgaa tgtgatttat acaactgtgt agttaatcaa agttatctca acaaccctaa    9780
tcatgtggta tcattgacag gcaaagaaag agaactcagt gtaggtagaa tgtttgcaat    9840
gcaaccggga atgttcagac aggttcaaat attggcagag aaaatgatag ctgaaaacat    9900
tttacaattc tttcctgaaa gtcttacaag atatggtgat ctagaactac aaaaaatatt    9960
agaattgaaa gcaggaataa gtaacaaatc aaatcgctac aatgataatt acaacaatta    10020
cattagtaag tgctctatca tcacagatct cagcaaattc aatcaagcat ttcgatatga    10080
aacgtcatgt atttgtagtg atgtgctgga tgaactgcat ggtgtacaat ctctattttc    10140
ctggttacat ttaactattc ctcatgtcac aataatatgc acatataggc atgcacccccc    10200 ctatatagga gatcatattg tagatcttaa caatgtagat gaacaaagtg gattatatag    10260
atatcacatg ggtggcatcg aagggtggtg tcaaaaactg tggaccatag aagctatatc    10320
actattggat ctaatatctc tcaaagggaa attctcaatt actgctttaa ttaatggtga    10380
caatcaatca atagatataa gcaaaccaat cagactcatg gaaggtcaaa ctcatgctca    10440
agcagattat ttgctagcat taaatagcct taaattactg tataaagagt atgcaggcat    10500
aggccacaaa ttaaaaggaa ctgagactta tatcacga gatatgcaat ttatgagtaa    10560
aacaattcaa cataacggtg tatattaccc agctagtata aagaaagtcc taagagtggg    10620
accgtggata aacactatac ttgatgattt caaagtgagt ctagaatcta taggtagttt    10680
gacacaagaa ttagaatata gaggtgaaag tctattatgc agtttaatat ttagaaatgt    10740
atggttatat aatcagattg ctctacaatt aaaaaatcat gcattatgta acaataaact    10800
atatttggac atattaaagg ttctgaaaca cttaaaaacc ttttttaatc ttgataatat    10860
tgatacagca ttaacattgt atatgaattt acccatgtta tttggtggtg gtgatcccaa    10920
cttgttatat cgaagtttct atagaagaac tcctgacttc ctcacagagg ctatagttca    10980
ctctgtgttc atacttagtt attatacaaa ccatgactta aaagataaac ttcagatct    11040 gtcagatgat agattgaata agttcttaac atgcataatc acgtttgaca aaaaccctaa    11100
```

```
tgctgaattc gtaacattga tgagagatcc tcaagcttta gggtctgaga gacaagctaa    11160
aattactagc gaaatcaata gactggcagt tacagaggtt ttgagtacag ctccaaacaa    11220
aatattctcc aaaagtgcac aacattatac tactacagag atagatctaa atgatattat    11280
gcaaaatata gaacctacat atcctcatgg gctaagagtt gtttatgaaa gtttacccttt   11340 ttataaagca gagaaaatag taaatcttat atcaggtaca aaatctataa ctaacatact    11400
ggaaaaaact tctgccatag acttaacaga tattgatgaa gccactgaga tgatgaggaa    11460
aaacataact ttgcttataa ggatacttcc attggattgt aacagagata aagagagat    11520 attgagtatg gaaaacctaa gtattactga attaagcaaa tatgttaggg aaagatcttg    11580
gtctttatcc aatatagttg gtgttacatc acccagtatc atgtatacaa tggacatcaa    11640
atatactaca agcactatat ctagtggcat aattatagag aaatataatg ttaacagttt    11700
aacacgtggt gagagaggac ccactaaacc atgggttggt tcatctacac aagagaaaaa    11760
aacaatgcca gtttataata gacaagtctt aaccaaaaaa cagagagatc aaatagatct    11820
attagcaaaa ttggattggg tgtatgcatc tatagataac aaggatgaat tcatggaaga    11880
actcagcata ggaaccctttg ggttaacata tgaaaaggcc aagaaattat ttccacaata   11940
tttaagtgtc aattatttgc atcgccttac agtcagtagt agaccatgtg aattccctgc    12000
atcaatacca gctatagaa caacaaatta tcactttgac actagcccta ttaatcgcat    12060
attaacagaa aagtatggtg atgaagatat tgacatagta ttccaaaact gtataagctt    12120
tggccttagt ttaatgtcag tagtagaaca atttactaat gtatgtccta acagaattat    12180
tctcatacct aagcttaatg agatacattt gatgaaacct cccatattca caggtgatgt    12240
tgatattcac aagttaaaac aagtgataca aaaacagcat atgttttac cagacaaaat    12300 aagtttgact caatatgtgg aattattctt aagtaataaa acactcaaat ctggatctca    12360
tgttaattct aatttaatat tggcacataa aatatctgac tattttcata atacttacat    12420
tttaagtact aatttagctg gacattggat tctgattata caactatga aagattctaa    12480 aggtatttt gaaaaagatt ggggagaggg atatataact gatcatatgt ttattaattt    12540
gaaagttttc ttcaatgctt ataagaccta tctcttgtgt tttcataaag gttatggcaa    12600
agcaaagctg gagtgtgata tgaacacttc agatcttcta tgtgtattgg aattaataga    12660
cagtagttat tggaagtcta tgtctaaggt atttttagaa caaaaagtta tcaaatacat    12720
tcttagccaa gatgcaagtt tacatagagt aaaaggatgt catagcttca aattatggtt    12780
tcttaaacgt cttaatgtag cagaattcac agttttgccct tggggttgtta acatagatta   12840 tcatccaaca catatgaaag caatattaac ttatatagat cttgttagaa tgggattgat    12900
aaatatagat agaatacaca ttaaaaataa acacaaattc aatgatgaat tttatacttc    12960
taatctcttc tacattaatt ataacttctc agataatact catctattaa ctaaacatat    13020
aaggattgct aattctgaat tagaaaataa ttacaacaaa ttatatcatc ctacaccaga    13080
aaccctagag aatatactag ccaatccgat taaaagtaat gacaaaaaga cactgaatga    13140
ctattgtata ggtaaaaatg ttgactcaat aatgttacca ttgttatcta ataagaagct    13200
tattaaatcg tctgcaatga ttagaaccaa ttacagcaaa caagatttgt ataatttatt    13260
ccctatggtt gtgattgata gaattataga tcattcaggc aatacagcca aatccaacca    13320 acttacact actacttccc accaaatatc tttagtgcac aatagcacat cactttactg    13380
catgcttcct tggcatcata ttaatagatt caatttgta tttagttcta caggttgtaa    13440
```

```
aattagtata gagtatattt taaaagatct taaaattaaa gatcccaatt gtatagcatt    13500
cataggtgaa ggagcaggga atttattatt gcgtacagta gtggaacttc atcctgacat    13560
aagatatatt tacagaagtc tgaaagattg caatgatcat agtttaccta ttgagttttt    13620
aaggctgtac aatggacata tcaacattga ttatggtgaa aatttgacca ttcctgctac    13680
agatgcaacc aacaacattc attggtctta tttacatata aagtttgctg aacctatcag    13740 tcttttgtc tgtgatgccg aattgtctgt aacagtcaac tggagtaaaa ttataataga    13800
atggagcaag catgtaagaa agtgcaagta ctgttcctca gttaataaat gtatgttaat    13860
agtaaaatat catgctcaag atgatattga tttcaaatta gacaatataa ctatattaaa    13920
aacttatgta tgcttaggca gtaagttaaa gggatcggag gtttacttag tccttacaat    13980
aggtcctgcg aatatattcc cagtatttaa tgtagtacaa aatgctaaat tgatactatc    14040
aagaaccaaa aatttcatca tgcctaagaa agctgataaa gagtctattg atgcaaatat    14100
taaaagtttg atacccttc tttgttaccc tataacaaaa aaaggaatta atactgcatt    14160
gtcaaaacta aagagtgttg ttagtggaga tatactatca tattctatag ctggacgtaa    14220
tgaagttttc agcaataaac ttataaatca taagcatatg aacatcttaa aatggttcaa    14280
tcatgtttta aatttcagat caacagaact aaactataac catttatata tggtagaatc    14340
tacatatcct tacctaagtg aattgttaaa cagcttgaca accaatgaac ttaaaaaact    14400
gattaaaatc acaggtagtc tgttatacaa ctttcataat gaataatgaa taaagatctt    14460
ataataaaaa ttcccatagc tatacactaa cactgtattc aattatagtt attaaaaatt    14520
aaaaatcgta cgatttttta aataactttt agtgaactaa tcctaaagtt atcattttaa    14580
tcttggagga ataaatttaa accctaatct aattggttta tatgtgtatt aactaaatta    14640
cgagatatta gttttgaca cttttttct cgtgggtcgg catggcatct ccacctcctc    14700
gcggtccgac ctgggcatcc gaaggaggac gcacgtccac tcggatggct aagggagctg    14760
ctaacaaagc ccgaaaggaa gctgagttgg ctgctgccac cgctgagcaa taactagcat    14820 aacccctgg ggcctctaaa cgggtcttga ggggtttttt gctgaaagga ggaactatat    14880
```

<210> SEQ ID NO 32
<211> LENGTH: 6
<212> TYPE: PRT
<213> ORGANISM: Artificial Sequence
<220> FEATURE:
<223> OTHER INFORMATION: Synthetic construct

<400> SEQUENCE: 32

Gly Gly Gly Gly Gly Gly
1               5

<210> SEQ ID NO 33
<211> LENGTH: 5
<212> TYPE: PRT
<213> ORGANISM: Artificial Sequence
<220> FEATURE:
<223> OTHER INFORMATION: Synthetic construct

<400> SEQUENCE: 33

Gly Gly Gly Gly Thr
1               5

<210> SEQ ID NO 34
<211> LENGTH: 6
<212> TYPE: PRT
<213> ORGANISM: Artificial Sequence

```
<220> FEATURE:
<223> OTHER INFORMATION: Synthetic construct

<400> SEQUENCE: 34

Gly Gly Gly Pro Pro Pro
1               5

<210> SEQ ID NO 35
<211> LENGTH: 7
<212> TYPE: PRT
<213> ORGANISM: Artificial Sequence
<220> FEATURE:
<223> OTHER INFORMATION: Synthetic construct

<400> SEQUENCE: 35

Gly Gly Gly Ala Pro Pro Pro
1               5
```